United States Patent
Graziano et al.

(10) Patent No.: US 10,273,409 B2
(45) Date of Patent: *Apr. 30, 2019

(54) LIQUID CRYSTAL DISPLAYS AND LIQUID CRYSTALLINE MEDIA WITH HOMEOTROPIC ALIGNMENT

(71) Applicant: MERCK PATENT GESELLSCHAFT MIT BESCHRANKTER HAFTUNG, Darmstadt (DE)

(72) Inventors: Archetti Graziano, Darmstadt (DE); Andreas Taugerbeck, Darmstadt (DE)

(73) Assignee: MERCK PATENT GESELLSCHAFT MIT BESCHRANKTER HAFTUNG, Darmstadt (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/666,176

(22) Filed: Aug. 1, 2017

(65) Prior Publication Data

US 2018/0022997 A1    Jan. 25, 2018

Related U.S. Application Data

(62) Division of application No. 13/825,680, filed as application No. PCT/EP2011/004340 on Aug. 29, 2011.

(30) Foreign Application Priority Data

Sep. 25, 2010   (DE) .................. 10 2010 046 593

(51) Int. Cl.
*G02F 1/1334* (2006.01)
*C09K 19/12* (2006.01)
*C09K 19/42* (2006.01)
*C09K 19/54* (2006.01)
*C09K 19/30* (2006.01)
*C09K 19/36* (2006.01)
*G02F 1/1333* (2006.01)
*G02F 1/1337* (2006.01)
*C09K 19/04* (2006.01)
*C09K 19/56* (2006.01)

(52) U.S. Cl.
CPC .......... *C09K 19/12* (2013.01); *C09K 19/0403* (2013.01); *C09K 19/3003* (2013.01); *C09K 19/3068* (2013.01); *C09K 19/36* (2013.01); *C09K 19/42* (2013.01); *C09K 19/54* (2013.01); *C09K 19/56* (2013.01); *G02F 1/1333* (2013.01); *G02F 1/133711* (2013.01); *C09K 2019/0448* (2013.01)

(58) Field of Classification Search
CPC ........ C09K 19/12; C09K 19/42; C09K 19/54; C09K 19/3003; C09K 19/3068; C09K 19/36; C09K 19/0403; C09K 19/56; C09K 2019/0448; G02F 1/1333; G02F 1/1334; G02F 1/133711

USPC ..................................... 252/299.01
See application file for complete search history.

(56) References Cited

U.S. PATENT DOCUMENTS

| | | |
|---|---|---|
| 3,953,491 A | 4/1976 | Steinstrasser |
| 3,972,589 A | 8/1976 | Skelly et al. |
| 4,482,472 A | 11/1984 | Carr |
| 4,564,694 A | 1/1986 | Hirai |
| 4,620,938 A | 11/1986 | Romer et al. |
| 5,484,552 A | 1/1996 | Wartenberg et al. |
| 5,698,134 A | 12/1997 | Jubb et al. |
| 5,961,881 A | 10/1999 | Andou et al. |
| 6,007,740 A | 12/1999 | Andou et al. |
| 6,139,925 A | 10/2000 | Darius et al. |
| 6,168,839 B1 | 1/2001 | Fujita |
| 6,187,223 B1 | 2/2001 | Andou et al. |
| 6,444,278 B1 | 9/2002 | Reiffenrath |
| 6,861,107 B2 | 3/2005 | Klasen-Memmer et al. |
| 7,731,865 B2 | 6/2010 | Bernatz et al. |
| 7,740,769 B2 | 6/2010 | Sasada |
| 8,114,310 B2 | 2/2012 | Bernatz et al. |
| 8,778,466 B2 | 7/2014 | Bernatz |
| 9,868,904 B2* | 1/2018 | Graziano ............... C09K 19/42 |
| 2002/0004108 A1 | 1/2002 | Iwakabe |

(Continued)

FOREIGN PATENT DOCUMENTS

| | | |
|---|---|---|
| CN | 1245483 A | 2/2000 |
| CN | 1646662 A | 7/2005 |

(Continued)

OTHER PUBLICATIONS

Kayarad, Kayamer, Kayacure 1st. Edition—Radiation Curable Products pp. 1-10 (from EP11764088 printed Jan. 15, 2018).

(Continued)

*Primary Examiner* — Geraldina Visconti

(74) *Attorney, Agent, or Firm* — Millen, White, Zelano and Branigan, P.C.

(57) ABSTRACT

The present invention relates to liquid-crystalline media (LC media) having negative or positive dielectric anisotropy comprising self-aligning mesogens (SAMs) which effect homeotropic (vertical) alignment of the LC media at a surface or the cell walls of a liquid-crystal display (LC display). The invention therefore also encompasses LC displays having homeotropic alignment of the liquid-crystalline medium (LC medium) without conventional imide alignment layers. The LC media may be supplemented by a polymerizable or polymerized component, which serves for stabilization of the alignment, for adjustment of the tilt angle and/or as passivation layer.

27 Claims, No Drawings

(56) References Cited

U.S. PATENT DOCUMENTS

| | | |
|---|---|---|
| 2002/0084444 A1 | 7/2002 | Darius |
| 2003/0025865 A1 | 2/2003 | Takatori |
| 2003/0048401 A1 | 3/2003 | Hanaoka |
| 2004/0011996 A1 | 1/2004 | Klasen-Memmer et al. |
| 2004/0113119 A1 | 6/2004 | Iftime et al. |
| 2005/0092965 A1 | 5/2005 | Ishizaki et al. |
| 2005/0116200 A1 | 6/2005 | Nakanishi |
| 2006/0182897 A1 | 8/2006 | Saito et al. |
| 2006/0198967 A1 | 9/2006 | Saito et al. |
| 2007/0187644 A1 | 8/2007 | Sasada |
| 2008/0090026 A1 | 4/2008 | Bernatz et al. |
| 2008/0180608 A1 | 7/2008 | Ishizaki et al. |
| 2009/0103011 A1 | 4/2009 | Bernatz et al. |
| 2012/0032112 A1 | 2/2012 | Czanta et al. |

FOREIGN PATENT DOCUMENTS

| | | |
|---|---|---|
| DE | 195 39 141 | 4/1997 |
| DE | 199 03 746 | 8/1999 |
| DE | 101 17 224 | 2/2002 |
| DE | 10117224 A | 2/2002 |
| EP | 1911828 | 4/2008 |
| FR | 2 204 002 | 5/1974 |
| JP | 49058089 A | 6/1974 |
| JP | 1975035076 | 4/1975 |
| JP | 1982-140737 A | 8/1982 |
| JP | 1983-041827 A | 3/1983 |
| JP | 02145531 A | 6/1990 |
| JP | 06-263691 | 9/1994 |
| JP | 1997-124529 A | 5/1997 |
| JP | 10204016 A | 8/1998 |
| JP | 1999-302652 A | 11/1999 |
| JP | 2003003170 A | 1/2003 |
| JP | 2003253265 A | 9/2003 |
| JP | 2005002164 A | 1/2005 |
| JP | 2007217288 A | 8/2007 |
| JP | 2008-116931 A | 5/2008 |
| JP | 2009102639 A | 5/2009 |
| JP | 2010-170090 A | 8/2010 |
| JP | 2010170090 A | 8/2010 |
| WO | 2007100136 A1 | 9/2007 |
| WO | 2010 089092 | 8/2010 |

OTHER PUBLICATIONS

Office Action in corresponding TW Patent Application 100134454 dated Oct. 25, 2017.
English translation of Office Action in corresponding TW Patent Application 100134454 dated Oct. 25, 2017.
Jankowlak et al., A new series of nematic and smectic liquid crystals with negative dielectric anisotropy: the effect of terminal chain substitution on thermal and electro-optical properties:, Liquid Crystals, vol. 35, No. 1, pp. 65-77, 2008.
CAPLUS 1998: 208510.
JP 2013-529564; 2015-07028; Office Action.
English Translation of JP 2013-529564; 2015-07028; Office Action.
JP2010-170090; Machine Translation.
DE10117224A1; Machine Translation.
English Machine Translation of JP2005002164A published Jan. 6, 2005 to Dainippon Ink.
English Machine Translation of JP2003253265A published Sep. 10, 2003 to Dainippon Ink.
English bibliographic abstract information for JP1975035076 published Apr. 3, 1975 (assigneed unknown).
EPO third party observations in EP 2619284 dated Jan. 26, 2016.
JP third party observations in JP 2013-529564 dated Mar. 31, 2016.
International Search Report for PCT/EP2011/004330, Date of the actual completion of the international search: Dec. 6, 2011, dated Dec. 13, 2011.
Merck Patent GMBH, "Liquid-crystal mixture used in the adjustment of the resistance of liquid crystal compositions," Espacenet, Publication Date: Aug. 5, 1999; English Abstract of DE-199 03 746.
Merck Patent GMBH, "Stabilization of halogen-containing compounds, especially liquid crystal compounds, by addition of a 4-substituted 2,6-di-tertiary butyl-phenol, itself having liquid crystal-type units," Espacenet, Publication Date: Feb. 21, 2002; English Abstract of DE-101 17 224.
Matsushita Electric Ind Co Ltd., "Liquid crystal screen with room temp nematic props contg substd phenyl alkoxy benzoate(s), for use in electro-optical equipment," Thomson Innovation Record View, Publication Date: May 17, 1974; English Abstract of FR-2204 002.
Office Action and Notification for acceptance of request for Invalidation in corresponding CN 201180045589.1 dated Aug. 24, 2017.

* cited by examiner

LIQUID CRYSTAL DISPLAYS AND LIQUID CRYSTALLINE MEDIA WITH HOMEOTROPIC ALIGNMENT

The present invention relates to liquid-crystalline media (LC media) having negative or positive dielectric anisotropy comprising self-aligning mesogens (SAMs) which effect homeotropic (vertical) alignment of the LC media at a surface or the cell walls of a liquid-crystal display (LC display). The invention therefore also encompasses LC displays having homeotropic alignment of the liquid-crystalline medium (LC medium) without conventional imide alignment layers. The LC media may be supplemented by a polymerisable or polymerised component, which serves for stabilisation of the alignment, for adjustment of the tilt angle and/or as passivation layer.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\varepsilon \leq -0.5$ in order to be suitable for use in high-information display elements based on the ECB effect. Electro-optical display elements based on the ECB effect have homeotropic edge alignment (VA technology=vertically aligned).

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Considerable effort is associated with the production of VA displays having two or more domains of different preferential direction. It is an aim of this invention to simplify the production processes and the display devices themselves without giving up the advantages of VA technology, such as relatively short response times and good viewing-angle dependence.

VA displays which comprise LC media having positive dielectric anisotropy are described in S. H. Lee et al. *Appl. Phys. Lett.* (1997), 71, 2851-2853. These displays use interdigital electrodes arranged on a substrate surface (in-plane addressing electrode configuration having a comb-shaped structure), as employed, inter alia, in the commercially available IPS (in-plane switching) displays (as disclosed, for example, in DE 40 00 451 and EP 0 588 568), and have a homeotropic arrangement of the liquid-crystal medium, which changes to a planar arrangement on application of an electric field.

Further developments of the above-mentioned display can be found, for example, in K. S. Hun et al. *J. Appl. Phys.* (2008), 104, 084515 (DSIPS: 'double-side in-plane switching' for improvements of driver voltage and transmission), M. Jiao et al. *App. Phys. Lett* (2008), 92, 111101 (DFFS: 'dual fringe field switching' for improved response times) and Y. T. Kim et al. *Jap. J. App. Phys.* (2009), 48, 110205 (VAS: 'viewing angle switchable' LCD).

In addition, VA-IPS displays are also known under the name positive-VA and HT-VA.

In all such displays (referred to below in general as VA-IPS displays), an alignment layer is applied to both substrate surfaces for homeotropic alignment of the LC medium; the production of this layer has hitherto been associated with considerable effort.

It is an aim of this invention to simplify the production processes themselves without giving up the advantages of VA-IPS technology, such as relatively short response times, good viewing-angle dependence and high contrast.

Industrial application of these effects in electro-optical display elements requires LC phases, which have to satisfy a multiplicity of requirements. Particularly important here are chemical resistance to moisture, air, the materials in the substrate surfaces and physical influences, such as heat, infrared, visible and ultraviolet radiation and direct and alternating electric fields.

Furthermore, industrially usable LC phases are required to have a liquid-crystalline mesophase in a suitable temperature range and low viscosity.

VA and VA-IPS displays are generally intended to have very high specific resistance at the same time as a large working-temperature range, short response times and a low threshold voltage, with the aid of which various grey shades can be produced.

In conventional VA and VA-IPS displays, a polyimide layer on the substrate surfaces ensures homeotropic alignment of the liquid crystal. The production of a suitable alignment layer in the display requires considerable effort. In addition, interactions of the alignment layer with the LC medium may impair the electrical resistance of the display. Owing to possible interactions of this type, the number of suitable liquid-crystal components is considerably reduced.

It would therefore be desirable to achieve homeotropic alignment of the LC medium without polyimide.

The disadvantage of the active-matrix TN displays frequently used is due to their comparatively low contrast, the relatively high viewing-angle dependence and the difficulty of producing grey shades in these displays.

VA displays have significantly better viewing-angle dependences and are therefore used principally for televisions and monitors.

A further development are the so-called PS (polymer sustained) or PSA (polymer sustained alignment) displays, for which the term "polymer stabilised" is also occasionally used. The PSA displays are distinguished by the shortening of the response times without significant adverse effects on other parameters, such as, in particular, the favourable viewing-angle dependence of the contrast.

In these displays, a small amount (for example 0.3% by weight, typically <1% by weight) of one or more polymerisable compound(s) is added to the LC medium and, after introduction into the LC cell, is polymerised or crosslinked in situ, usually by UV photopolymerisation, between the electrodes with or without an applied electrical voltage. The addition of polymerisable mesogenic or liquid-crystalline compounds, also known as reactive mesogens or "RMs", to the LC mixture has proven particularly suitable. PSA technology has hitherto been employed principally for LC media having negative dielectric anisotropy.

Unless indicated otherwise, the term "PSA" is used below as representative of PS displays and PSA displays.

In the meantime, the PSA principle is being used in diverse classical LC displays. Thus, for example, PSA-VA, PSA-OCB, PSA-IPS, PSA-FFS and PSA-TN displays are known. The polymerisation of the polymerisable compound (s) preferably takes place with an applied electrical voltage in the case of PSA-VA and PSA-OCB displays, and with or without an applied electrical voltage in the case of PSA-IPS displays. As can be demonstrated in test cells, the PS(A) method results in a 'pretilt' in the cell. In the case of PSA-OCB displays, for example, it is possible for the bend structure to be stabilised so that an offset voltage is unnecessary or can be reduced. In the case of PSA-VA displays, the pretilt has a positive effect on the response times. A standard MVA or PVA pixel and electrode layout can be used for PSA-VA displays. In addition, however, it is also possible, for example, to manage with only one structured electrode side and no protrusions, which significantly simplifies production and at the same time results in very good contrast at the same time as very good light transmission.

PSA-VA displays are described, for example, in JP 10-036847 A, EP 1 170 626 A2, U.S. Pat. Nos. 6,861,107, 7,169,449, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PSA-IPS displays are described, for example, in U.S. Pat. No. 6,177,972 and Appl. Phys. Lett. 1999, 75(21), 3264. PSA-TN displays are described, for example, in Optics Express 2004, 12(7), 1221. PSA-VA-IPS displays are disclosed, for example, in WO 2010/089092 A1.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors or "TFTs"), while in the case of passive-matrix displays, individual pixels are usually addressed by the multiplex method, both methods being known from the prior art.

In particular for monitor and especially TV applications, optimisation of the response times, but also of the contrast and luminance (i.e. also transmission), of the LC display is still sought after. The PSA method can provide crucial advantages here. In particular in the case of PSA-VA displays, a shortening of the response times, which correlate with a pretilt which can be measured in test cells, can be achieved without significant adverse effects on other parameters.

In the prior art, polymerisable compounds of the following formula, for example, are used for PSA-VA:

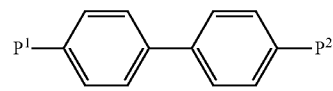

in which P denotes a polymerisable group, usually an acrylate or methacrylate group, as described, for example, in U.S. Pat. No. 7,169,449.

The effort for the production of a polyimide layer, treatment of the layer and improvement with bumps or polymer layers is relatively great. A simplifying technology which on the one hand reduces production costs and on the other hand helps to optimise the image quality (viewing-angle dependence, contrast, response times) would therefore be desirable.

Spontaneous horizontal to vertical alignment of a liquid-crystal layer with the aid of nanoparticles based on polyhedral oligomeric silsesquioxanes (simply silsesquioxanes, PSSs below) is reported by the publication Shie-Chang Jeng et al. *Optics Letters* (2009), 34, 455-457. From a concentration of about 1% by weight, virtually homeotropic alignment is observed. The pretilt can only be influenced by the concentration.

The specification US 2008/0198301 A1 likewise proposes PSS as alignment material. It is evident that the self-alignment functions on ITO and on planar-aligning polyimide.

The problem of the temperature dependence of the switching operation and the lack of a passivation layer is not mentioned in either specification. In fact, it has been shown that the degree of homeotropic alignment induced by PSS decreases rapidly with increasing temperature. In addition, a passivation layer is particularly important since the polyimide layer ensures not only alignment of the LC medium, but also electrical insulation. Without a passivation layer, problems may appear with the reliability of the display, such as R-DC ('residual DC').

A conference poster at SID 2010 (H. Y. Gim et al., P-128) describes that a phenethyl-substituted polyhedral oligomeric silsesquioxane is used in a concentration of 10% by weight in a display without a conventional alignment layer of the PSA-VA type. The LC medium having negative dielectric anisotropy is homeotropically aligned by the PSS. However, the large amount of dopant has a considerable effect on the properties of the LC medium, and the number of liquid-crystal components which can be employed for an LC display of this type is therefore very limited.

The specification JP 2010170090 A discloses a dendrimer as additive to liquid-crystal mixtures which effects vertical alignment with respect to substrates.

Liquid crystals containing amino groups have rarely been described hitherto since they have virtually never produced desirable properties. The homeotropic alignment of a liquid-crystalline phase comprising N-alkylated p-(4-alkylcyclohexyl)aniline is reported by J. H. MacMillan et al. *Mol. Cryst. Liq. Cryst.*, 1979, 55, 61-70. Predominantly homeotropic alignment of the liquid-crystal matrix on a bis-p-aminobenzoic acid ester of hydroquinone is likewise observed (D. C. Schroeder et al. *J. Am. Chem. Soc.*, 1974, 96(13), 4347-4348). Liquid crystals containing amino groups have hitherto not been employed in LC displays.

The existing approaches for achieving display applications without a polyimide layer are therefore still not entirely satisfactory.

The present invention relates firstly to an LC medium comprising a low-molecular-weight liquid-crystalline component and one or more organic compounds which contain at least one polar anchor group and at least one ring group (self-alignment additives). The liquid-crystalline component or the LC medium can have either positive or negative dielectric anisotropy. The LC medium according to the invention is preferably nematic.

In addition, the LC medium preferably comprises a polymerised or polymerisable component, where the polymerised component is obtainable by polymerisation of a polymerisable component.

This component enables the LC medium and in particular its alignment to be stabilised and a desired pretilt optionally to be established.

The present invention furthermore relates to a process for the preparation of an LC medium in which a low-molecular-weight liquid-crystalline component is mixed with one or more organic compounds which contain at least one polar anchor group and at least one ring group, and one or more polymerisable compounds and/or assistants are optionally added. The liquid-crystalline component or the LC medium can have either positive or negative dielectric anisotropy.

The present invention furthermore relates to a liquid-crystal display (LC display) comprising a liquid-crystal cell (LC cell) having two substrates and at least two electrodes, where at least one substrate is transparent to light and at least one substrate has one or two electrodes, and a layer of a liquid-crystal medium (LC medium), located between the substrates, comprising a low-molecular-weight liquid-crystalline component and one or more organic compounds, where the organic compound is contains at least one polar anchor group and at least one ring group and is suitable for effecting homeotropic (vertical) alignment of the LC medium with respect to the substrate surfaces.

In addition, the LC medium of the LC display preferably comprises a polymerised or polymerisable component, where the polymerised component is obtainable by polymerisation of one or more polymerisable compounds in the LC medium between the substrates of the LC cell, optionally with application of an electrical voltage to the electrodes of the cell or under the action of another electric field.

The invention furthermore relates to a process for the production of an LC display, preferably of the PSA-VA type, comprising an LC cell having two substrates and at least two electrodes, where at least one substrate is transparent to light and at least one substrate has one or two electrodes, comprising the process steps of:

filling of the cell with an LC medium as described above and below or in the claims, comprising an organic compound which is suitable for effecting homeotropic (vertical) alignment of the LC medium with respect to the substrate surfaces, and optionally polymerisation of a polymerisable component optionally present, optionally with application of a voltage to the electrodes of the cell or under the action of an electric field.

The organic compound which contains at least one polar anchor group and at least one ring group (the self-alignment additive) is dissolved or dispersed in the liquid crystal. It effects homeotropic alignment of the liquid crystal with respect to the substrate surfaces (such as, for example, a glass surface or an ITO- or polyimide-coated surface). Considering the investigations for this invention, it appears that the polar anchor group interacts with the substrate surface. The organic compounds on the substrate surface consequently align and induce homeotropic alignment of the liquid crystal. According to this opinion, the anchor group should be sterically accessible, i.e. should not, for example, consist of a screened OH group as in 2,6-di-tert-butylphenol.

The self-alignment additive is preferably employed in a concentration of less than 10% by weight, particularly preferably 8% by weight and very particularly 5% by weight. It is preferably employed in a concentration of at least 0.1% by weight, preferably at least 0.2% by weight. The use of 0.1 to 2.5% by weight of the self-alignment additive generally already results in completely homeotropic alignment of the LC layer at conventional cell thicknesses (3 to 4 μm).

The polar anchor group preferably contains no polymerisable group, such as, for example, acrylate groups.

The polar anchor group of the self-alignment additive preferably consists of a group which undergoes a non-covalent interaction with the glass or metal-oxide substrate surface. Suitable groups are polar groups containing polar structural elements with atoms selected from N, O, S and P. The groups should at the same time be sufficiently stable for use as LC medium. In addition, they should have only little effect on the VHR values ('voltage holding ratio') of the LC medium. The anchor group preferably contains one or more, preferably two or more, of these heteroatoms.

The polar anchor group preferably consists of one to two structural elements containing heteroatoms selected from N and O and covalent, linking structures between the heteroatoms and between one or more of the heteroatoms and the remainder of the molecule of the formula I (without the anchor group). The polar anchor group preferably contains at least one OH structure or an N atom in a primary, secondary or tertiary amino group.

The term ring group encompasses all ring systems that can be prepared, i.e. also all aromatic, heteroaromatic, alicyclic or heterocyclic ring systems, also polycyclic ring systems, where at least one part-ring should preferably contain at least 4 ring atoms. The ring system produces a steric effect, i.e. serves as space-filling group, and makes the compound more or less mesogenic, improving the solubility and compatibility in the LC medium. The type of the ring group can therefore vary greatly.

The self-alignment additive is preferably an organic compound having a relative molar mass of greater than 100 g/mol, in order that the substances are less volatile. It particularly preferably has a relative molar mass of greater than 126 g/mol in order to achieve an even more stable self-alignment effect. As upper limit, it preferably has a relative molar mass of less than 700 g/mol.

The self-alignment additive preferably has a structure of the formula:

MES-R² where
MES denotes a group containing at least one ring system, and
R² denotes a polar anchor group.

The radical MES preferably denotes a mesogenic group. Mesogenic radicals are familiar to the person skilled in the art. Mesogenic in this connection means, analogously to C. Tschierske et al. *Angew. Chem.* 2004, 116, 6340-86 or according to M. Baron *Pure Appl. Chem.* 2001, 73, 845-895, that the compound contributes to the formation of the desired mesophase in suitable concentrations and at suitable temperatures. In a preferred embodiment, the self-alignment additives have a structure of the general formula I:

$$R^1-A^1-(Z^2-A^2)_{m1}-R^2 \quad (I)$$

In formula I, the radical $R^2$ denotes a polar anchor group as defined above and below, and the radical "$R^1$-$A^1$-$(Z^2-A^2)_{m1}$-" denotes an embodiment of a mesogenic group MES. In particular, in formula (I):

$A^1$ and $A^2$ each, independently of one another, denote an aromatic, heteroaromatic, alicyclic or heterocyclic group, preferably having 4 to 25 C atoms, which may also contain fused rings, and which may also be mono- or polysubstituted by L, particularly preferably each, independently of one another, denote 1,4-phenylene, naphthalene-1,4-diyl or naphthalene-2,6-diyl, where, in addition, one or more CH groups in these groups may be replaced by N, cyclohexane-1,4-diyl, in which, in addition, one or more non-adjacent CH₂ groups may be replaced by O and/or S, 3,3'-bicyclobutylidene, 1,4-cyclohexenylene, bicyclo[1.1.1]pentane-1,3-diyl, bicyclo[2.2.2]-octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, perhydrocyclopenta[a]phenanthrene-3,17-diyl (in particular gonane-3,17-diyl),
where all these groups may be unsubstituted or mono- or polysubstituted by a group L, L in each case, independently of one another, denotes OH, —(CH₂)ₙ₁—OH, F, Cl, Br, I, —CN, —NO₂, —NCO, —NCS, —OCN, —SCN, —C(=O)N(R⁰)₂, —C(=O)R⁰, —N(R⁰)₂, —(CH₂)ₙ₁—N(R⁰)₂, optionally substituted silyl, optionally substituted aryl or cycloalkyl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, Z² in each case, independently of one another, denotes a single bond, —O—, —S—, —CO—, —CO—O—, —OCO—, —O—CO—O—, —OCH₂—, —CH₂O—, —SCH₂—, —CH₂S—, —CF₂O—, —OCF₂—, —CF₂S—, —SCF₂—, —(CH₂)ₙ₁—, —CF₂CH₂—, —CH₂CF₂—, —(CF₂)ₙ₁—, —CH=CH—, —CF=CF—, —C≡C—, —CH=CH—COO—, —OCO—CH=CH— or CR⁰R⁰⁰, preferably a single bond, R⁰ and R⁰⁰ each, independently of one another, denote H or alkyl having 1 to 12 C atoms, R¹, R², independently of one another, denote H, halogen, straight-chain, branched or cyclic alkyl having 1 to 25 C atoms, in which, in addition, one or more non-adjacent CH₂ groups may be replaced by —NR⁰—, —O—, —S—, —CO—, —CO—O—, —O—CO—, —O—CO—O— in such a way that N, O and/or S atoms are not linked directly to one another, and in which, in addition, one or more tertiary carbon atoms (CH groups) may be replaced by N, and in which, in addition, one or more H atoms may be replaced by F or Cl,
with the proviso that at least the radical $R^2$ contains one or more heteroatoms selected from N, S and/or O, preferably that at least the radical $R^2$ contains one or more groups NH, OH or SH, m1 denotes 0, 1, 2, 3, 4 or 5, and
n1 denotes 1, 2, 3 or 4.

$R^2$ thus encompasses, for example, alcohols, primary, secondary and tertiary amines, ketones, carboxylic acids, thiols, esters and (thio)ethers, and combinations thereof. The structure here may be linear, branched, cyclic or a combination thereof. For example, replacement of a CH₂ group in a radical —CH₃ by —O— produces an OH group.

The group $R^2$ in the above formulae preferably contains a polar anchor group, in particular a group of the formula (A1)

$$-Sp-[X^2—Z^3-]_kX^1 \quad (A1)$$

in which
Sp denotes a single bond or a spacer group defined like $Sp^a$ as defined below for formula M, preferably a spacer group Sp"—X", as defined for formula M below, which is connected to the radical "MES" via the group X", where Sp" very particularly denotes a single bond or an alkylene having 1 to 12 C atoms, $X^1$ denotes a group —NH₂, —NHR¹¹, —NR₁₁², —OR¹¹, —OH, —(CO)OH or a group of the formula

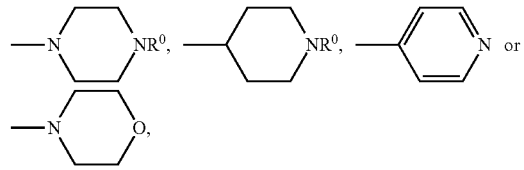

R⁰ denotes H or alkyl having 1 to 12 C atoms,
$X^2$ in each case independently denotes —NH—, —NR¹¹—, —O— or a single bond,
$Z^3$ in each case independently denotes an alkylene group having 1-15 C atoms, carbocyclic rings having 5 or 6 C atoms (for example optionally substituted benzene, cyclohexane), or combinations of one or more rings and alkylene groups, in each of which one or more hydrogen atoms are optionally replaced by —OH, —OR¹¹, —(CO)OH, —NH₂, —NHR¹¹, —NR¹¹₂ or halogen (preferably F, Cl),
R¹¹ in each case independently denotes a halogenated or unsubstituted alkyl radical having 1 to 15 C atoms, where, in addition, one or more CH₂ groups in this radical may each be replaced, independently of one another, by —C≡C—, —CH=CH—, —(CO)O—, —O(CO)—, —(CO)— or —O— in such a way that O atoms are not linked directly to one another, and where two radicals R¹¹ are optionally linked to one another to form a ring, and
k denotes 0 to 3.

The group $R^2$ in the above formulae particularly preferably contains an (N/O)-heteroatom-containing group of the sub-formula (A2)

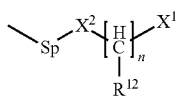 (A2)

in which Sp, $X^1$ and $X^2$ are as defined above for formula A1, and $R^{12}$ denotes H, F, Cl, CN, —OH, —NH$_2$, or a halogenated or unsubstituted alkyl radical having 1 to 15 C atoms, where, in addition, one or more CH$_2$ groups in this radical may each be replaced, independently of one another, by —C≡C—, —CH=CH—, —(CO)O—, —O(CO)—, —(CO)—, —O—, —NH— or —NR$^1$— in such a way that 0 and N atoms are not linked directly to one another, and n denotes 1, 2 or 3.

The group $R^2$ particularly preferably denotes precisely one group of the formula (A1) or (A2).

Particularly preferred nitrogen-containing groups $R^2$ are selected from —NH$_2$, —NH—(CH$_2$)$_{n3}$H, —(CH$_2$)$_n$—NH$_2$, —(CH$_2$)$_n$—NH—(CH$_2$)$_{n3}$H, —NH—(CH$_2$)$_n$—NH$_2$, —NH—(CH$_2$)$_n$—NH—(CH$_2$)$_{n3}$H, —(CH$_2$)$_{n1}$—NH—(CH$_2$)$_{n2}$—NH$_2$, —(CH$_2$)$_{n1}$—NH—(CH$_2$)$_{n2}$—NH—(CH$_2$)$_{n3}$H, —O—(CH$_2$)$_n$—NH$_2$, —(CH$_2$)$_{n1}$—O—(CH$_2$)$_n$—NH$_2$, —(CH$_2$)$_{n1}$—NH—(CH$_2$)$_{n2}$—OH, —O—(CH$_2$)$_{n1}$—NH—(CH$_2$)$_{n2}$—NH$_2$, —O—(CH$_2$)$_{n1}$—NH—(CH$_2$)$_{n2}$—OH, —(CH$_2$)$_{n1}$—NH—(CH$_2$)$_{n2}$—NH—(CH$_2$)$_{n3}$H, in which n, n1, n2 and n3 denote, independently, 1, 2, 3, 4, 5, 6, 7, 8, 9, 10, 11 or 12, in particular 1, 2, 3 or 4.

Particularly preferred nitrogen-free groups $R^2$ are selected from —OH, —(CH$_2$)$_n$—OH, —O—(CH$_2$)$_n$—OH, —[O—(CH$_2$)$_{n1}$]$_{n2}$—OH, —(CO)OH, —(CH$_2$)$_n$—(CO)OH, —O—(CH$_2$)$_n$—(CO)OH or —[O—(CH$_2$)$_{n1}$-]$_{n2}$-(CO)OH, in which n, n1 and n2 denote, independently, 1, 2, 3, 4, 5, 6, 7, 8, 9, 10, 11 or 12, in particular 1, 2, 3 or 4.

The term "aryl" denotes an aromatic carbon group or a group derived therefrom. The term "heteroaryl" denotes "aryl" as defined above containing one or more heteroatoms.

Aryl and heteroaryl groups may be monocyclic or polycyclic, i.e. they may contain one ring (such as, for example, phenyl) or two or more rings, which may also be fused (such as, for example, naphthyl) or covalently bonded (such as, for example, biphenyl), or contain a combination of fused and bonded rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups may be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent CH$_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

In connection with the present invention, the term "alkyl" denotes a straight-chain or branched, saturated or unsaturated, preferably saturated, aliphatic hydrocarbon radical having 1 to 15 (i.e. 1, 2, 3, 4, 5, 6, 7, 8, 9, 10, 11, 12, 13, 14 or 15) carbon atoms.

The term "cyclic alkyl" encompasses alkyl groups which have at least one carbocyclic part, i.e., for example, also cycloalkylalkyl, alkylcycloalkyl and alkylcycloalkylalkyl. The carbocyclic groups encompass, for example, cyclopropyl, cyclobutyl, cyclopentyl, cyclohexyl, cycloheptyl, cyclooctyl, etc.

"Halogen" in connection with the present invention stands for fluorine, chlorine, bromine or iodine, preferably for fluorine or chlorine.

Particularly preferred compounds of the formula I are selected from the following illustrative compounds, which at the same time represent particularly preferred groups MES and $R^2$ of the self-alignment additives:

I-1
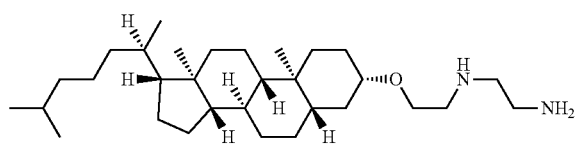

I-2
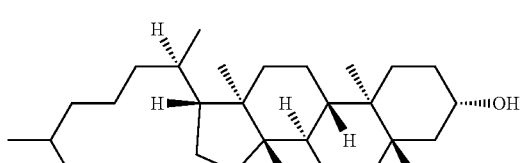

I-3

I-4
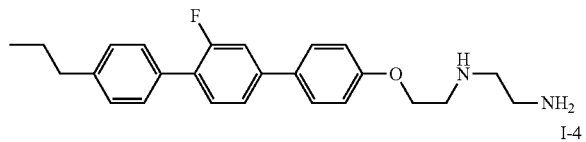

I-5
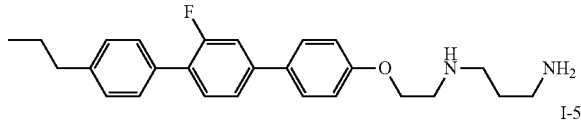

I-6
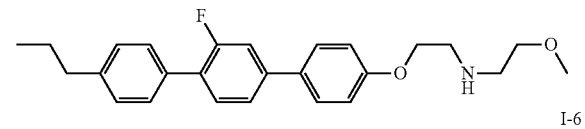

I-7
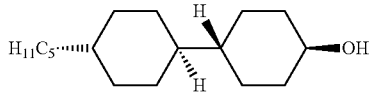

I-8
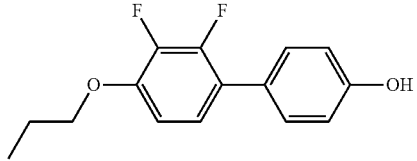

I-9
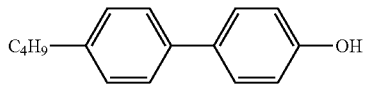

I-10
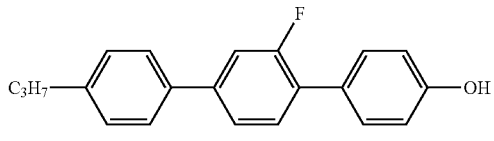

I-11
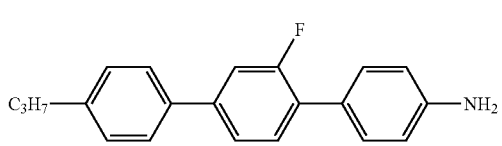

I-12
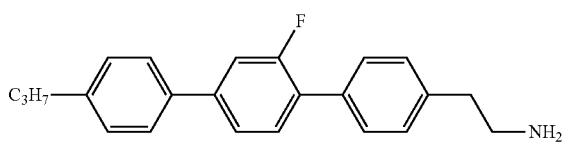

I-13
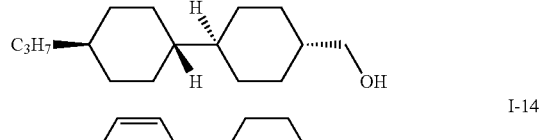

I-14
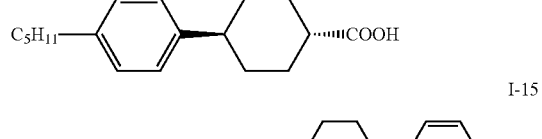

I-15
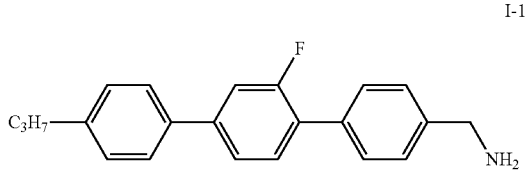

I-16
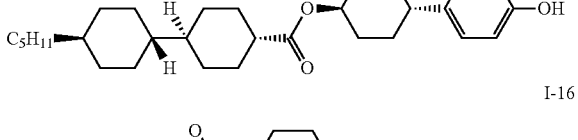

In a further preferred embodiment of the invention, use is made of organic compounds containing the polar anchor group or compounds of the formula I which, besides the polar anchor, contain one or more polymerisable groups as further functionalisation (compare group $P^a$ or $P^b$ below). Preferred polymerisable groups are groups such as acrylate, methacrylate, fluoroacrylate, oxetane, vinyloxy or epoxide groups, particularly preferably acrylate and methacrylate. The inclusion of compounds of the formula I in the polymerisation permanently immobilises the compounds, causing them to retain their function.

An advantage of the LC displays according to the invention is that the display achieves the desired homeotropic alignment without the conventional polyimide alignment layer. This alignment is generally also retained at elevated temperature. Due to the polymer stabilisation, the homeotropic alignment is additionally stabilised; improved temperature stability of the electro-optical switching is thus achieved. The polymer-stabilised displays according to the invention are distinguished by improved response times and a better contrast ratio (pretilt angle and temperature dependence of the contrast). The polymerised component optionally present can at the same time serve as a passivation layer, which increases the reliability of the display.

The organic compounds containing the polar anchor group or the compounds of the formula I do not destabilise the nematic phase of the LC medium thanks to their structure, but instead contribute to the stability. In addition, the relatively small amount of compounds of the formula I has virtually no effect on the properties of the LC media. It is therefore possible to use a broad range of liquid-crystal components in the LC display.

The LC displays according to the invention therefore preferably have no alignment layer for homeotropic alignment on the surfaces of the LC cell, i.e. they are polyimide-free. In the case where the LC displays nevertheless have alignment layers on one or both sides, these preferably consist of polyimide. The alignment layers are preferably not rubbed. The rubbing of the alignment layer, a particularly time-consuming step in production, which was hitherto necessary is thus superfluous. The unrubbed polyimide layer can serve as passivation layer.

In a particular embodiment, the LC displays according to the invention use an LC medium having negative dielectric anisotropy ($\Delta\varepsilon \leq -1.5$). In general, the display is a VA display having electrodes arranged on opposite sides of the LC cell, preferably having electrodes which are arranged in such a way that they are able to generate an electric field aligned predominantly perpendicular to the substrate surface. Typical substrates used are those which are used from the VAN mode and PSA-VA (structuring of the electrodes is therefore possible).

In a particular embodiment, the LC displays according to the invention use an LC medium having positive dielectric anisotropy ($\Delta\varepsilon \leq 1.5$). In general, the display is a VA-IPS display having electrodes arranged on one side of the LC cell, preferably having electrodes which are arranged in such a way that they are able to generate an electric field aligned predominantly planar to the substrate surface, for example interdigital electrodes (in-plane addressing electrode configuration having a comb-shaped structure).

The LC displays are provided in a conventional manner with polariser(s), which make(s) the LC medium switching operation visible.

The polymerised component of the LC cell (polymer) is obtainable by polymerisation of a polymerisable component (monomer). In general, the monomers are firstly dissolved in the LC medium and are polymerised in the LC cell after homeotropic alignment or a high tilt angle of the LC medium has been established. In order to support the desired alignment, a voltage can be applied to the LC cell. In the simplest case, such a voltage is superfluous, and the desired alignment becomes established merely through the nature of the LC medium and the cell geometry.

Suitable monomers (polymerisable component) for the LC medium are those from the prior art which are used for PSA-VA displays, in particular polymerisable compounds of the formula M mentioned below and/or of the formulae M1 to M29. The LC media according to the invention for use in PSA displays preferably comprise <5% by weight, particularly preferably <1% by weight and very particularly preferably <0.5% by weight, of polymerisable compounds, in particular polymerisable compounds of the formulae mentioned below. In order to achieve an adequate effect, 0.2% by weight or more is preferably employed. The optimum amount is dependent on the layer thickness.

Suitable monomers of the polymerisable component of the LC medium are described by the following formula M:

$$P^a—(Sp^a)_{s1}\text{-}A^2\text{-}(Z^1\text{-}A^1)_n\text{-}(Sp^b)_{s2}—P^b \quad M$$

in which the individual radicals have the following meanings:
$P^a$, $P^b$ each, independently of one another, denote a polymerisable group,
$Sp^a$, $Sp^b$ on each occurrence, identically or differently, denote a spacer group,
s1, s2 each, independently of one another, denote 0 or 1,
$A^1$, $A^2$ each, independently of one another, denote a radical selected from the following groups:
a) the group consisting of trans-1,4-cyclohexylene, 1,4-cyclohexenylene and 4,4''-bicyclohexylene, in which, in addition, one or more non-adjacent CH$_2$ groups may be replaced by —O— and/or —S— and in which, in addition, one or more H atoms may be replaced by F, b) the group consisting of 1,4-phenylene and 1,3-phenylene, in which, in addition, one or two CH groups may be replaced by N and in which, in addition, one or more H atoms may be replaced by L,
c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L,
d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo[1.1.1]pentane-1,3-diyl, bicyclo[2.2.2]octane-1,4-diyl, spiro[3.3]heptane-2,6-diyl,

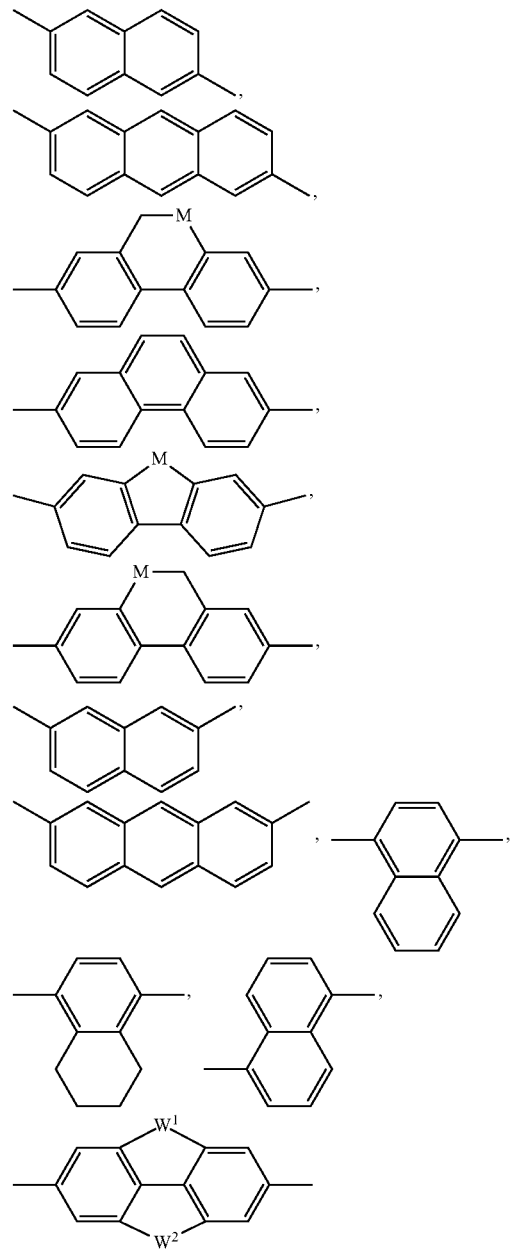

-continued

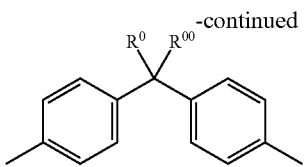

where, in addition, one or more H atoms in these radicals may be replaced by L, and/or one or more double bonds may be replaced by single bonds, and/or one or more CH groups may be replaced by N, n denotes 0, 1, 2 or 3, $Z^1$ in each case, independently of one another, denotes —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^c$R$^d$)—, —CH$_2$CF$_2$—, —CF$_2$CF$_2$— or a single bond, L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, $R^0$, $R^{00}$ each, independently of one another, denote H, F or straight-chain or branched alkyl having 1 to 12 C atoms, in which, in addition, one or more H atoms may be replaced by F, M denotes —O—, —S—, —CH$_2$—, —CHY$^1$— or —CY$^1$Y$^2$—, and $Y^1$ and $Y^2$ each, independently of one another, have one of the meanings indicated above for $R^0$ or denote Cl or CN, and preferably H, F, Cl, CN, OCF$_3$ or CF$_3$, $W^1$, $W^2$ each, independently of one another, denote —CH$_2$CH$_2$—, —CH=CH—, —CH$_2$—O—, —O—CH$_2$—, —C(R$^c$R$^d$)— or —O—, $R^c$ and $R^d$ each, independently of one another, denote H or alkyl having 1 to 6 C atoms, preferably H, methyl or ethyl.

The polymerisable group $P^{a,b}$ is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups $P^{a,b}$ are selected from the group consisting of CH$_2$=CW$^1$—CO—O—, CH$_2$=CW$^1$—CO—,

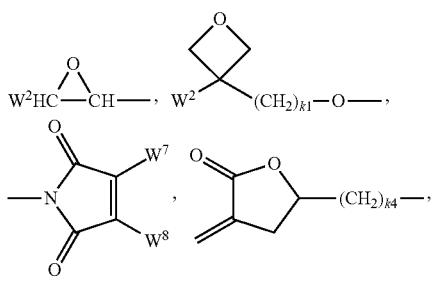

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups $P^{a,b}$ are selected from the group consisting of CH$_2$=CW$^1$—CO—O—, CH$_2$=CW$^1$—CO—,

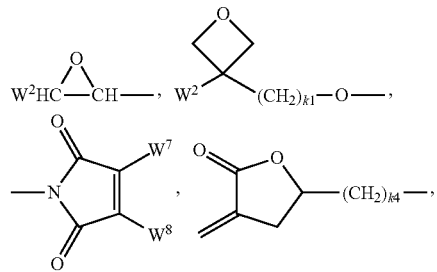

CH$_2$=CW$^2$—O—, CW$^1$=CH—CO—(O)$_{k3}$—, CW$^1$=CH—CO—NH—, CH$_2$=CW$^1$—CO—NH—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups $P^{a,b}$ are selected from the group consisting of CH$_2$=CW$^1$—CO—O—, in particular CH$_2$=CH—CO—O—, CH$_2$=C(CH$_3$)—CO—O— and CH$_2$=CF—CO—O—, furthermore CH$_2$=CH—O—, (CH$_2$=CH)$_2$CH—O—CO—, (CH$_2$=CH)$_2$CH—O—,

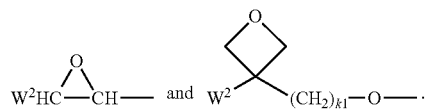

Very particularly preferred groups $P^{a,b}$ are therefore selected from the group consisting of acrylate, methacrylate, fluoroacrylate, furthermore vinyloxy, chloroacrylate, oxetane and epoxide groups, and of these preferably an acrylate or methacrylate group.

Preferred spacer groups $Sp^{a,b}$ are selected from the formula Sp"—X", so that the radical $P^{a/b}$-$Sp^{a/b}$- conforms to the formula $P^{a/b}$-Sp"—X"—, where Sp" denotes alkylene having 1 to 20, preferably 1 to 12, C atoms, which is optionally mono- or polysubstituted by F, Cl, Br, I or CN and in which, in addition, one or more non-adjacent CH$_2$ groups may each be replaced, independently of one another, by —O—, —S—, —NH—, —N(R$^0$)—, —Si(R$^{00}$R$^{000}$)—, —CO—, —CO—O—, —O—CO—, —O—CO—O—, —S—CO—, —CO—S—, —N(R$^{00}$)—CO—O—, —O—CO—N(R$^{00}$)—, —N(R$^{00}$)—CO—N(R$^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N(R$^{00}$)—, —N(R$^{00}$)—CO—, —N(R$^{00}$)—CO—N(R$^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, R$^{00}$ and R$^{000}$ each, independently of one another, denote H or alkyl having 1 to 12 C atoms, and Y$^2$ and Y$^3$ each, independently of one another, denote H, F, Cl or CN.

X" is preferably —O—, —S—, —CO—, —COO—, —OCO—, —O—COO—, —CO—NR$^0$—, —NR$^0$—CO—, —NR$^0$—CO—NR$^0$— or a single bond.

Typical spacer groups Sp" are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$—, in which p1 is an integer from 1 to 12, q1 is an integer from 1 to 3, and R$^{00}$ and R$^{000}$ have the meanings indicated above.

Particularly preferred groups -Sp"—X"— are —(CH$_2$)$_{p1}$—, —(CH$_2$)$_{p1}$—O—, —(CH$_2$)$_{p1}$—O—CO—, —(CH$_2$)$_{p1}$—O—CO—O—, in which p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Particularly preferred monomers are the following:

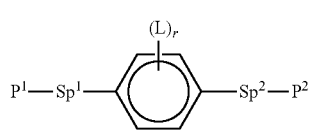

M1

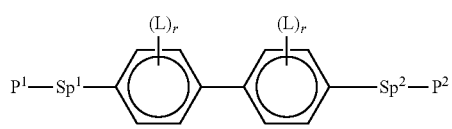

M2

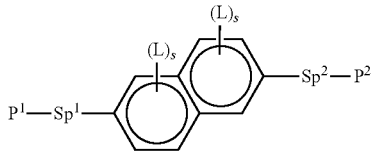

M3

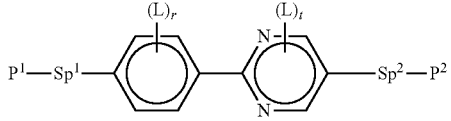

M4

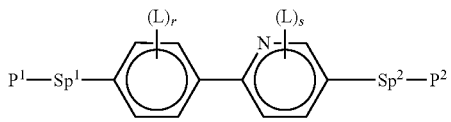

M5

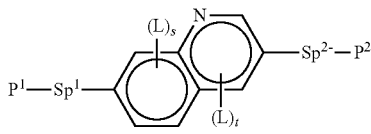

M6

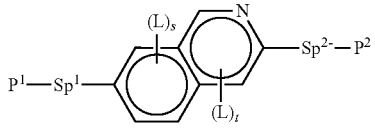

M7

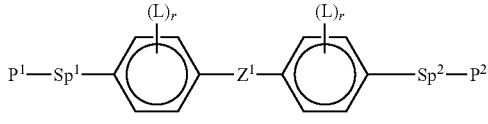

M8

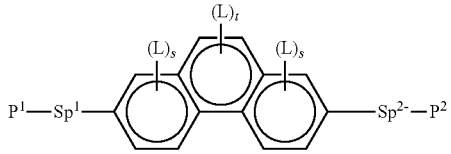

M9

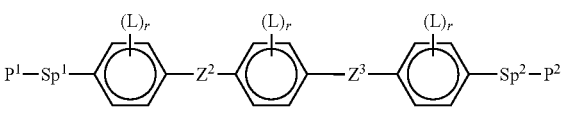

M10

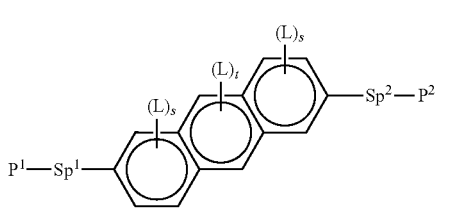

M11

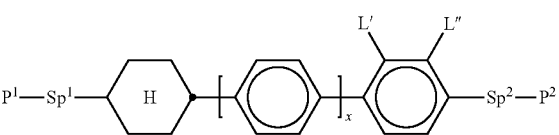

M12

-continued

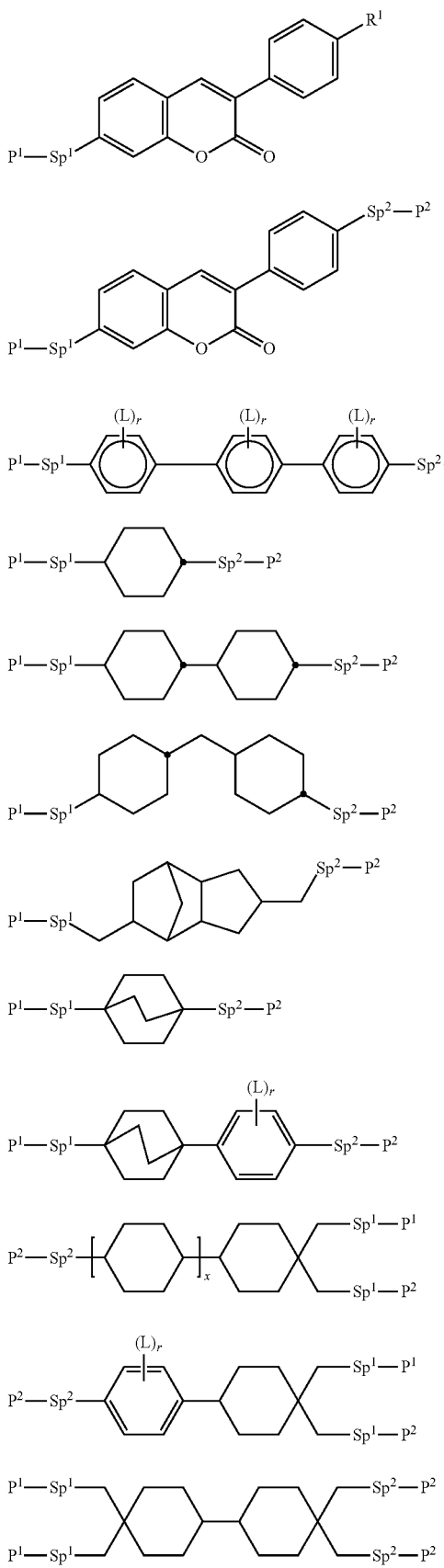

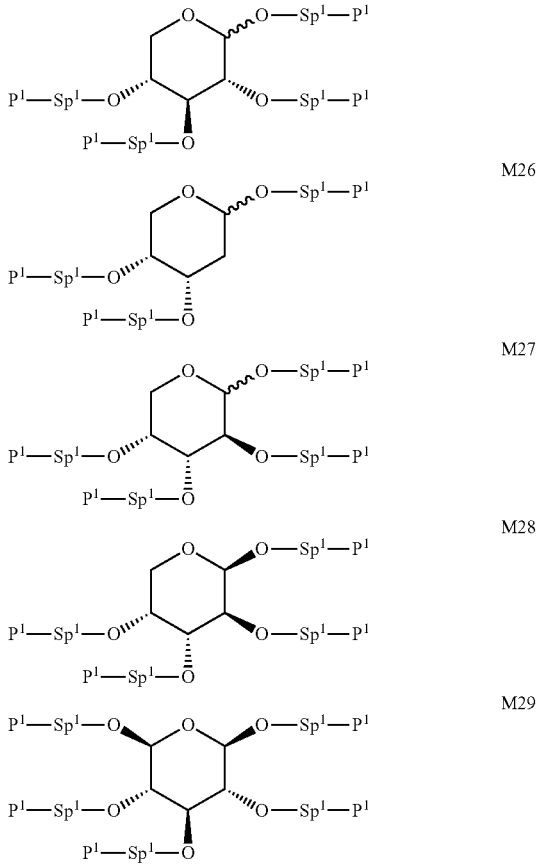

in which the individual radicals have the following meanings:

$P^1$ and $P^2$ each, independently of one another, denote a polymerisable group as defined for formula I, preferably an acrylate, methacrylate, fluoroacrylate, oxetane, vinyloxy or epoxide group, $Sp^1$ and $Sp^2$ each, independently of one another, denote a single bond or a spacer group, preferably having one of the meanings indicated above and below for $Sp^a$, and particularly preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where the linking to the adjacent ring in the last-mentioned groups takes place via the O atom, where, in addition, one or more of the radicals $P^1$-$Sp^1$- and $P^2$-$Sp^2$- may denote a radical $R^{aa}$, with the proviso that at least one of the radicals $P^1$-$Sp^1$- and $P^2$-$Sp^2$- present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)$=$C(R^{00})$—, —C≡C—, —$N(R^0)$—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), $R^0$, $R^{00}$ each, independently of one another, denote H or alkyl having 1 to 12 C atoms, $R^y$ and $R^z$ each, independently of one another, denote H, F, $CH_3$ or $CF_3$, $Z^1$ denotes —O—, —CO—, —C($R^y R^z$)— or —$CF_2CF_2$—, $Z^2$ and $Z^3$ each, independently of one another, denote —CO—O—, —O—CO—, —$CH_2$O—, —O$CH_2$—, —$CF_2$O—, —O$CF_2$— or —$(CH_2)_n$—, where n is 2, 3 or 4, L on each occurrence, identically or differently, denotes F, Cl, CN, SCN, $SF_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, and x denotes 0 or 1.

The LC medium or the polymerisable component preferably comprises one or more compounds selected from the group of the formulae M1-M21, particularly preferably from the group of the formulae M2-M15, very particularly preferably from the group of the formulae M2, M3, M9, M14 and M15.

The LC medium or the polymerisable component preferably comprises no compounds of the formula M10 in which $Z^2$ and $Z^3$ denote —(CO)O— or —O(CO)—.

For the production of PSA displays, the polymerisable compounds are polymerised or crosslinked (if a polymerisable compound contains two or more polymerisable groups) by in-situ polymerisation in the LC medium between the substrates of the LC display, optionally with application of a voltage. The polymerisation can be carried out in one step. It is also possible firstly to carry out the polymerisation with application of a voltage in a first step in order to produce a pretilt angle, and subsequently, in a second polymerisation step, to polymerise or crosslink the compounds which have not fully reacted in the first step without an applied voltage ("end curing").

Suitable and preferred polymerisation methods are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight, particularly preferably 0.001 to 1% by weight.

The polymerisable compounds according to the invention are also suitable for polymerisation without an initiator, which is associated with considerable advantages, such as, for example, lower material costs and, in particular, reduced contamination of the LC medium by possible residual amounts of the initiator or degradation products thereof. The polymerisation can thus also be carried out without addition of an initiator. The LC medium thus, in a preferred embodiment, comprises no polymerisation initiator.

The polymerisable component or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of the RMs or the polymerisable component, is preferably 10-10,000 ppm, particularly preferably 50-500 ppm.

Besides the SAMs described above and the optional polymerisable compounds (M) described above, the LC media for use in the LC displays according to the invention comprise an LC mixture ("host mixture") comprising one or more, preferably two or more, low-molecular-weight (i.e. monomeric or unpolymerised) compounds. The latter are stable or unreactive with respect to a polymerisation reaction under the conditions used for the polymerisation of the polymerisable compounds. In principle, a suitable host mixture is any dielectrically negative or positive LC mixture which is suitable for use in conventional VA and VA-IPS displays.

Suitable LC mixtures are known to the person skilled in the art and are described in the literature. LC media for VA displays having negative dielectric anisotropy are described in EP 1 378 557 A1.

Suitable LC mixtures having positive dielectric anisotropy which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521.

Preferred embodiments of the liquid-crystalline medium having negative dielectric anisotropy according to the invention are indicated below:

a) LC medium which additionally comprises one or more compounds selected from the group of the compounds of the formulae A, B and C,

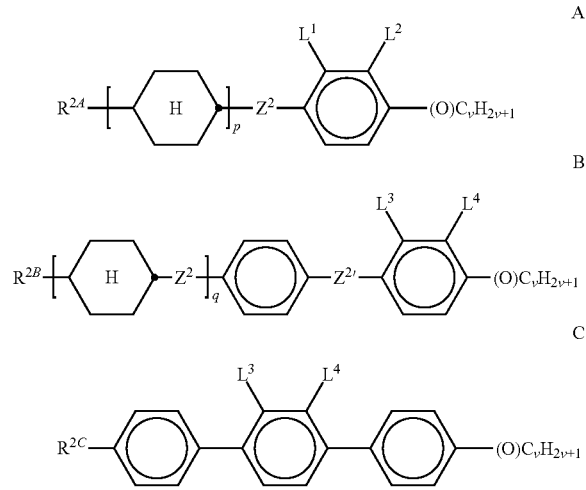

in which $R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, where, in addition, one or more CH₂ groups in these radicals may be replaced by —O—, —S—,

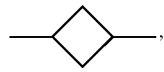

—C≡C—, —CF₂O—, —OCF₂—, —OC—O— or —O—CO— in such a way that O atoms are not linked directly to one another, $L^{1-4}$ each, independently of one another, denote F, Cl, CF₃ or CHF₂, $Z^2$ and $Z^{2'}$ each, independently of one another, denote a single bond, —CH₂CH₂—, —CH=CH—, —CF₂O—, —OCF₂—, —CH₂O—, —OCH₂—, —COO—, —OCO—, —C₂F₄—, —CF=CF—, —CH=CHCH₂O—, p denotes 1 or 2, q denotes 0 or 1, and v denotes 1 to 6.

In the compounds of the formulae A and B, $Z^2$ can have identical or different meanings. In the compounds of the formula B, $Z^2$ and $Z^{2'}$ can have identical or different meanings.

In the compounds of the formulae A, B and C, $R^{2A}$, $R^{2B}$ and $R^{2C}$ each preferably denote alkyl having 1-6 C atoms, in particular CH₃, C₂H₅, n-C₃H₇, n-C₄H₉, n-C₅H₁₁.

In the compounds of the formulae A and B, $L^1$, $L^2$, $L^3$ and $L^4$ preferably denote $L^1=L^2=F$ and $L^3=L^4=F$, furthermore $L^1=F$ and $L^2=Cl$, $L^1=Cl$ and $L^2=F$, $L^3=F$ and $L^4=Cl$, $L^3=Cl$ and $L^4=F$. $Z^2$ and $Z^{2'}$ in the formulae A and B preferably each, independently of one another, denote a single bond, furthermore a —C₂H₄— bridge.

If $Z^2$=—C₂H₄— in the formula B, $Z^{2'}$ is preferably a single bond, or if $Z^{2'}$=—C₂H₄—, $Z^2$ is preferably a single bond. In the compounds of the formulae A and B, (O)C$_v$H$_{2v+1}$ preferably denotes OC$_v$H$_{2v+1}$, furthermore C$_v$H$_{2v+1}$. In the compounds of the formula C, (O)C$_v$H$_{2v+1}$ preferably denotes C$_v$H$_{2v+1}$. In the compounds of the formula C, $L^3$ and $L^4$ preferably each denote F.

Preferred compounds of the formulae A, B and C are shown below:

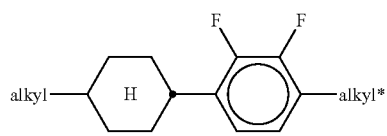

A-1

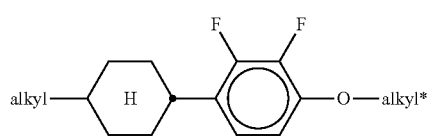

A-2

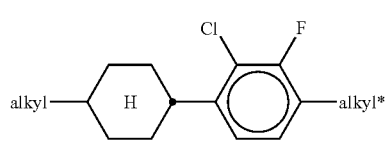

A-3

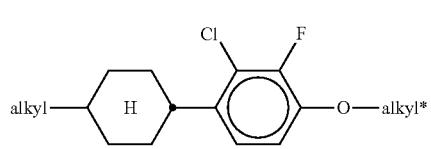

A-4

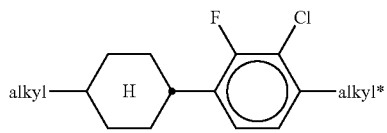

A-5

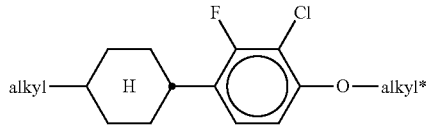

A-6

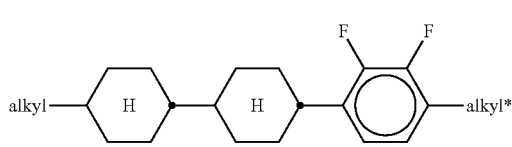

A-7

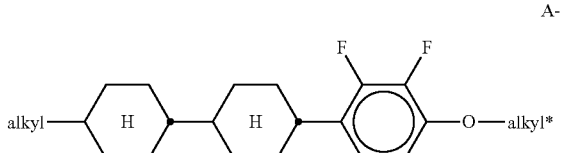

A-8

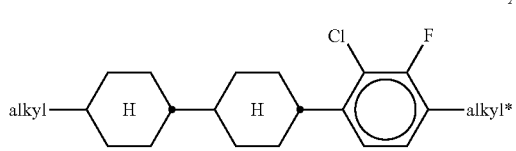

A-9

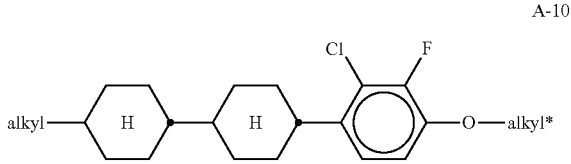

A-10

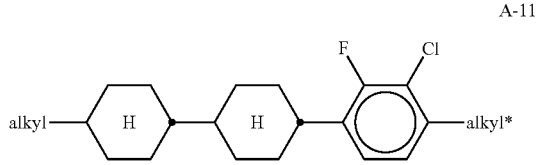

A-11

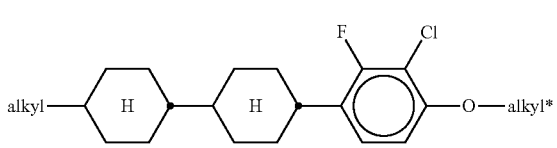

A-12

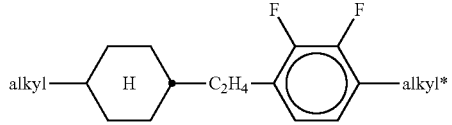

A-13

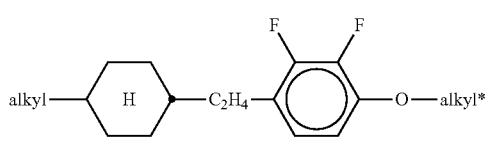

A-14

A-36
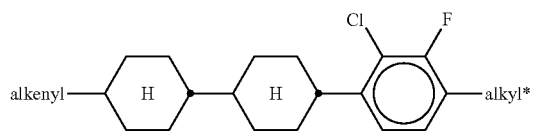
A-37
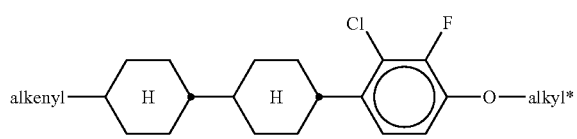
A-38
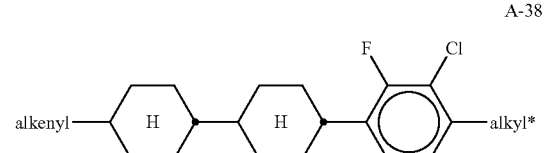
A-39
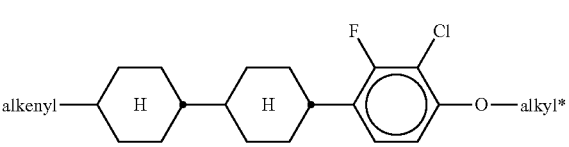
A-40
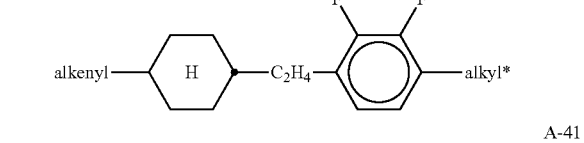
A-41
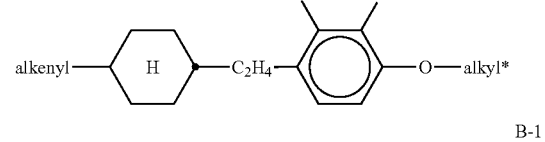
B-1
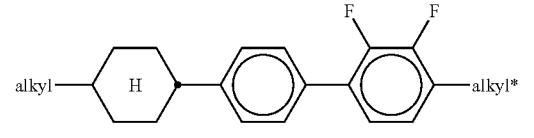
B-2
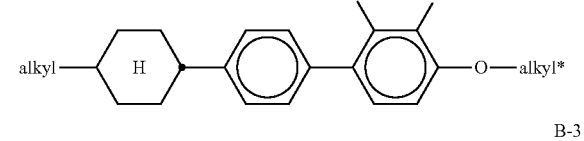
B-3
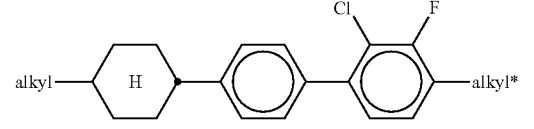
B-4
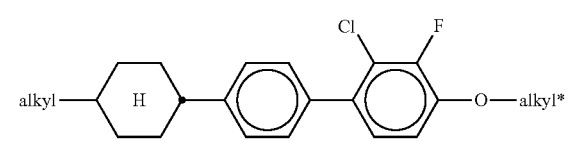
B-5
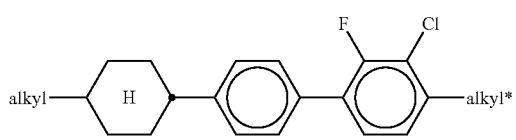
B-6
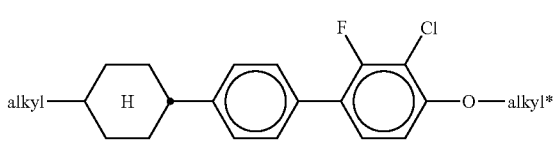
B-7
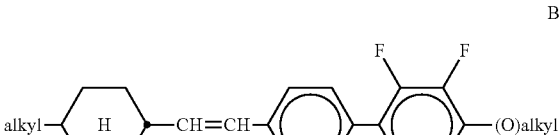
B-8
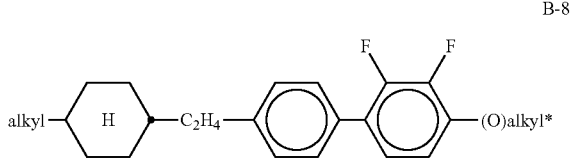
B-9
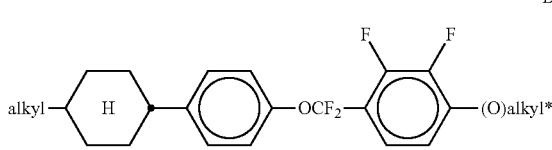
B-10
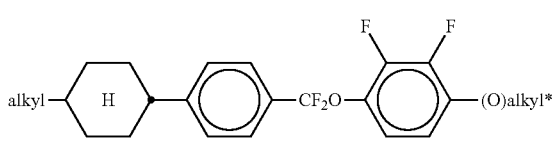
B-11
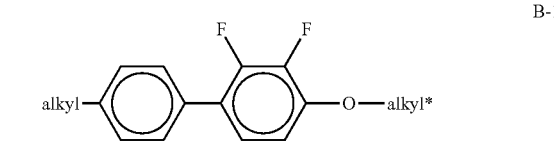
B-12
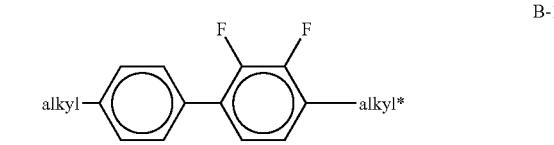
B-13
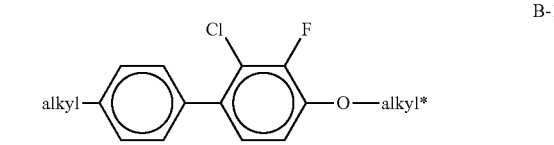
B-14
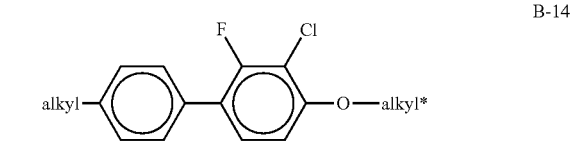

-continued

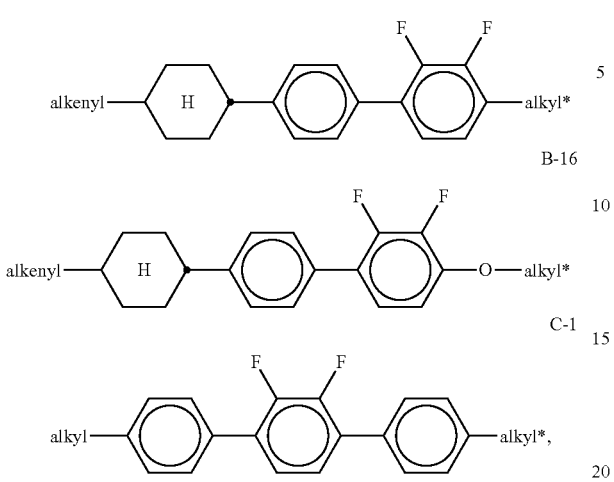

in which alkyl and alkyl* each, independently of one another, denote a straight-chain alkyl radical having 1-6 C atoms.

Particularly preferred mixtures according to the invention comprise one or more compounds of the formulae A-2, A-8, A-14, A-29, A-35, B-2, B-11, B-16 and C-1.

The proportion of compounds of the formulae A and/or B in the mixture as a whole is preferably at least 20% by weight.

Particularly preferred media according to the invention comprise at least one compound of the formula C-1,

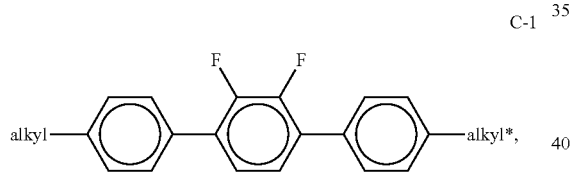

in which alkyl and alkyl* have the meanings indicated above, preferably in amounts of >3% by weight, in particular >5% by weight and particularly preferably 5-25% by weight.

b) LC medium which additionally comprises one or more compounds of the following formula:

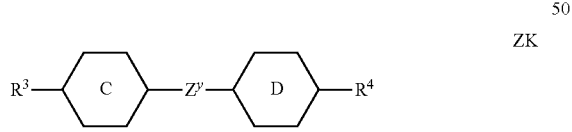

in which the individual radicals have the following meanings:

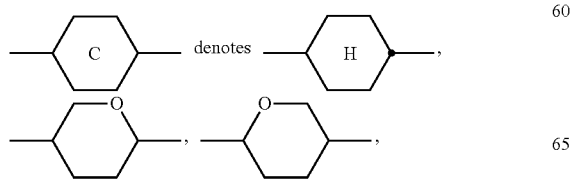

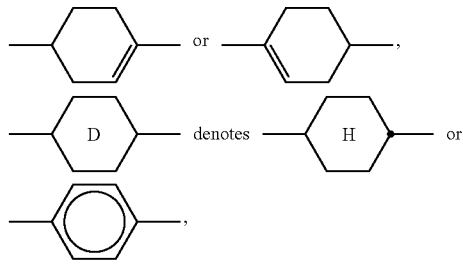

$R^3$ and $R^4$ each, independently of one another, denote alkyl having 1 to 12 C atoms, in which, in addition, one or two non-adjacent $CH_2$ groups may be replaced by —O—, —CH=CH—, —CO—, —O—CO— or —CO—O— in such a way that O atoms are not linked directly to one another, $Z^y$ denotes —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond.

The compounds of the formula ZK are preferably selected from the group consisting of the following sub-formulae:

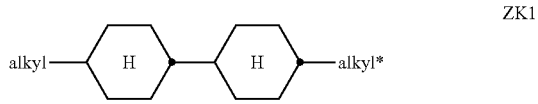

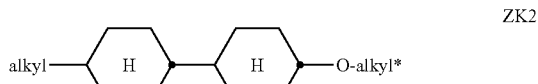

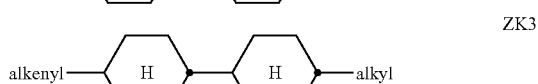

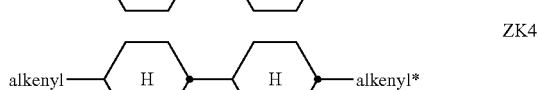

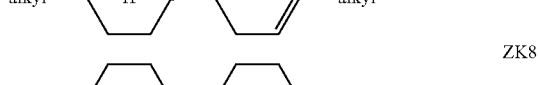

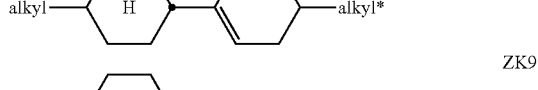

-continued

ZK10
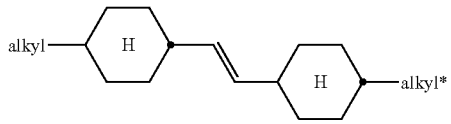

in which alkyl and alkyl* each, independently of one another, denote a straight-chain alkyl radical having 1-6 C atoms, and alkenyl and alkenyl* denote a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

c) LC medium which additionally comprises one or more compounds of the following formula:

DK
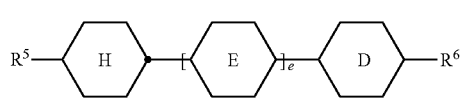

in which the individual radicals on each occurrence, identically or differently, have the following meanings:

$R^5$ and $R^6$ each, independently of one another, have one of the meanings indicated above for $R^{3/4}$,

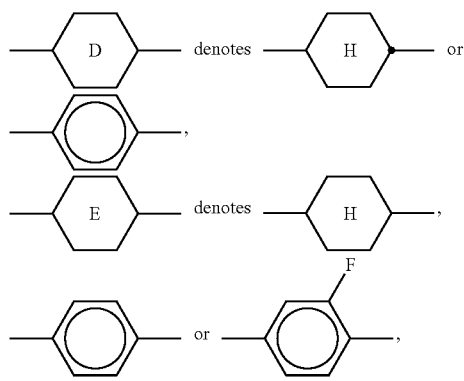

and e denotes 1 or 2.

The compounds of the formula DK are preferably selected from the group consisting of the following sub-formulae:

DK1
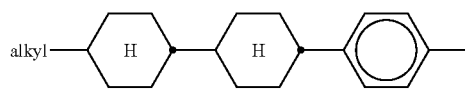

DK2
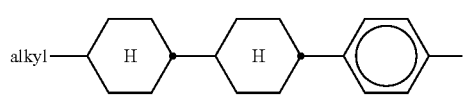

DK3
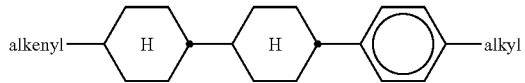

DK4
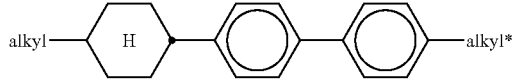

DK5
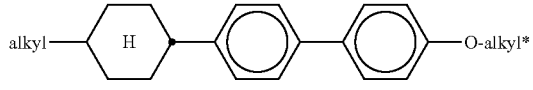

DK6
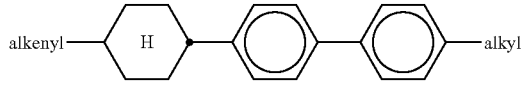

DK7
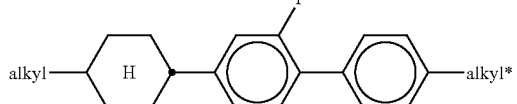

DK8
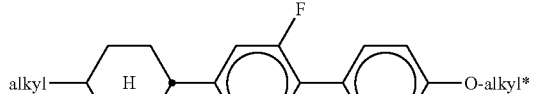

DK9
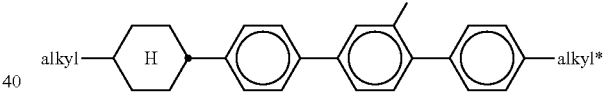

DK10
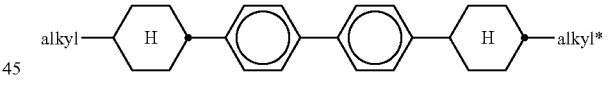

DK11
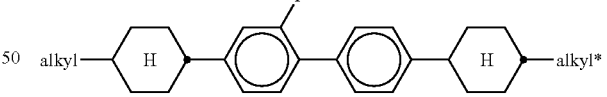

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

d) LC medium which additionally comprises one or more compounds of the following formula:

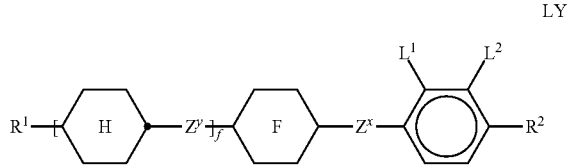

LY in which the individual radicals have the following meanings:

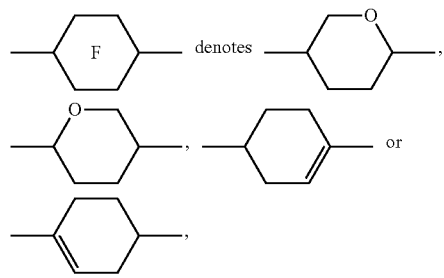

f denotes 0 or 1,

R$^1$ and R$^2$ each, independently of one another, denote alkyl having 1 to 12 C atoms, where, in addition, one or two non-adjacent CH$_2$ groups may be replaced by —O—, —CH=CH—, —CF=CF—, —CO—, —O(CO)— or —(CO)O— in such a way that O atoms are not linked directly to one another, Z$^x$ and Z$^y$ each, independently of one another, denote —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, L$^1$ and L$^2$ each, independently of one another, denote F, Cl, OCF$_3$, CF$_3$, CH$_3$, CH$_2$F, CHF$_2$.

Preferably, both radicals L$^1$ and L$^2$ denote F or one of the radicals L$^1$ and L$^2$ denotes F and the other denotes Cl.

The compounds of the formula LY are preferably selected from the group consisting of the following sub-formulae:

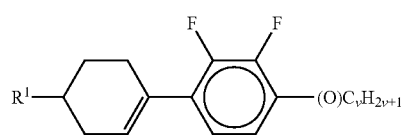

LY1

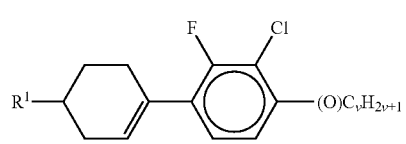

LY2

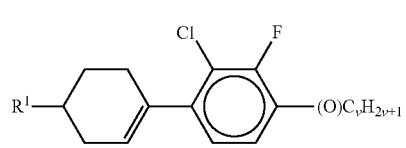

LY3

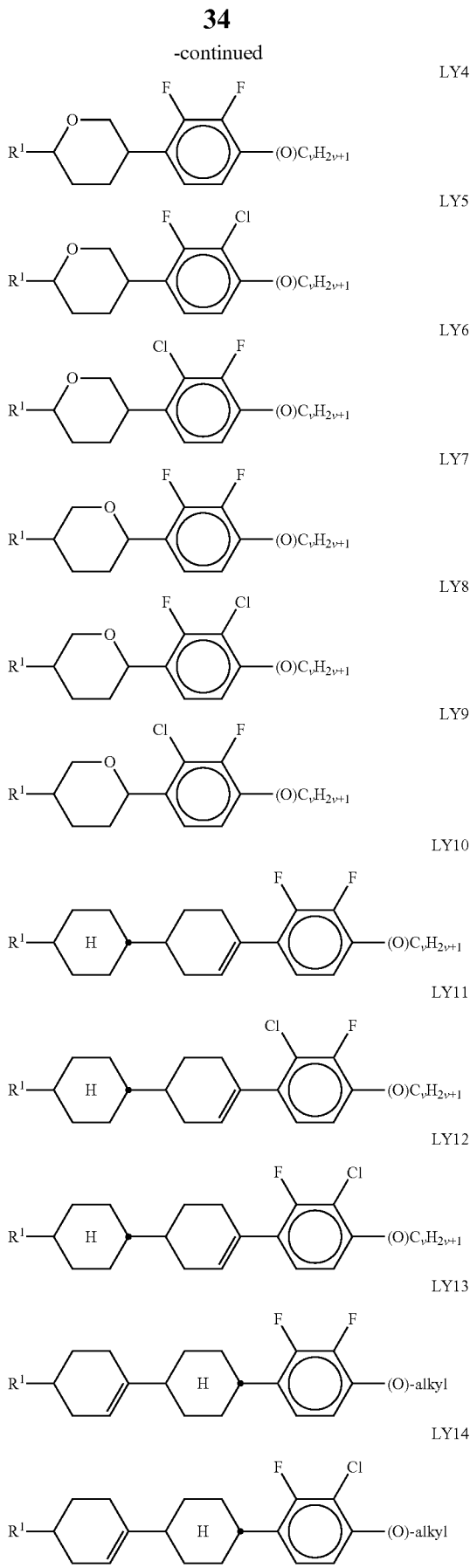

-continued

LY15
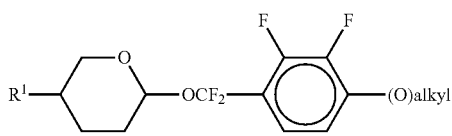

LY16
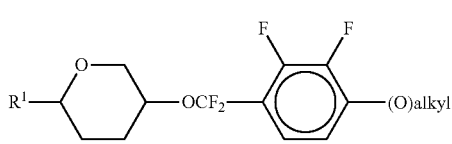

LY17
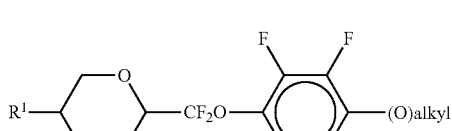

LY18
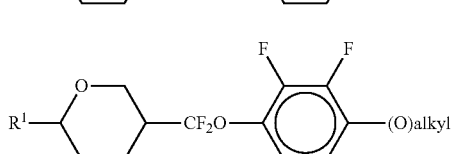

in which R¹ has the meaning indicated above, alkyl denotes a straight-chain alkyl radical having 1-6 C atoms, (O) denotes an oxygen atom or a single bond, and v denotes an integer from 1 to 6. R¹ preferably denotes straight-chain alkyl having 1 to 6 C atoms or straight-chain alkenyl having 2 to 6 C atoms, in particular CH₃, C₂H₅, n-C₃H₇, n-C₄H₉, n-C₅H₁₁, CH₂=CH—, CH₂=CHCH₂CH₂—, CH₃—CH=CH—, CH₃—CH₂—CH=CH—, CH₃—(CH₂)₂—CH=CH—, CH₃—(CH₂)₃—CH=CH— or CH₃—CH=CH—(CH₂)₂—.

e) LC medium which additionally comprises one or more compounds selected from the group consisting of the following formulae:

G1
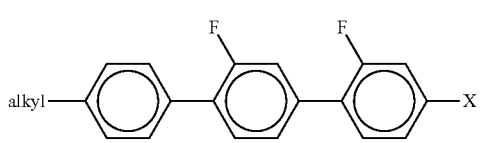

G2
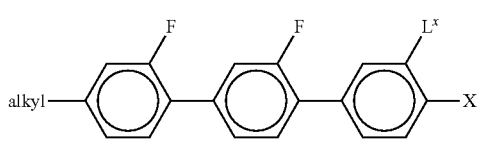

G3
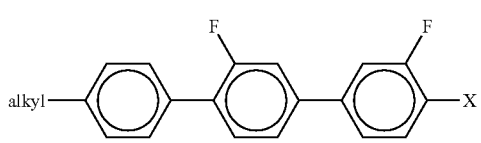

G4
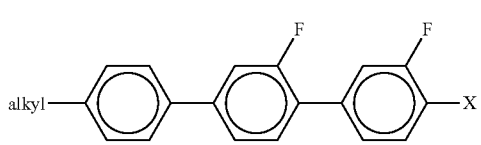

in which alkyl denotes C₁₋₆-alkyl, Lx denotes H or F, and X denotes F, Cl, OCF₃, OCHF₂ or OCH=CF₂. Particular preference is given to compounds of the formula G1 in which X denotes F.

f) LC medium which additionally comprises one or more compounds selected from the group consisting of the following formulae:

Y1
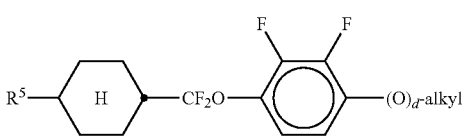

Y2
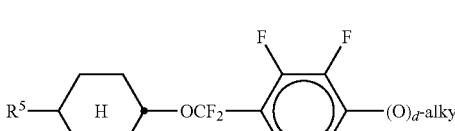

Y3
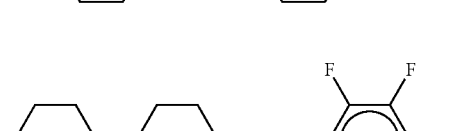

Y4
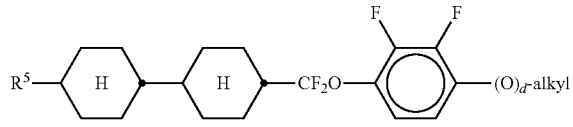

Y5
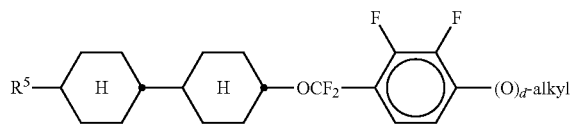

Y6
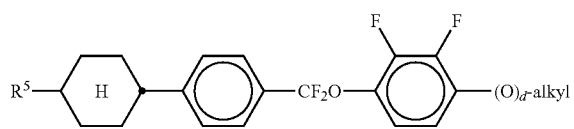

Y7
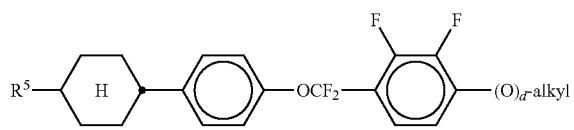

Y8
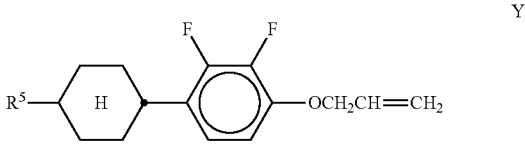

Y9
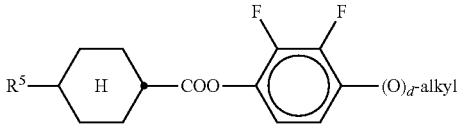

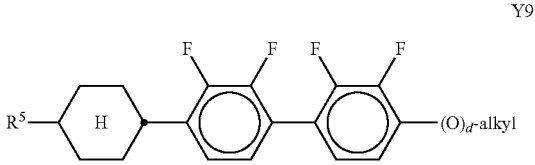

-continued

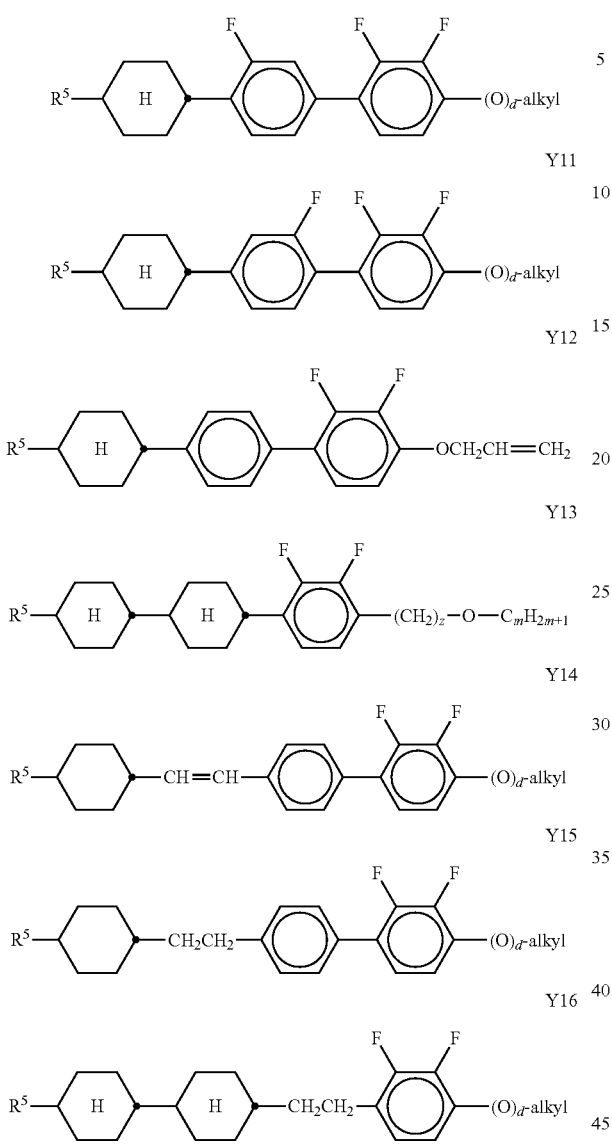

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of 5% by weight.

g) LC medium which additionally comprises one or more biphenyl compounds selected from the group consisting of the following formulae:

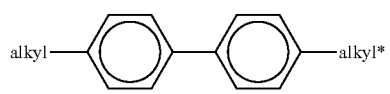

B1

-continued

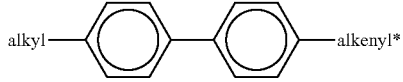

B2

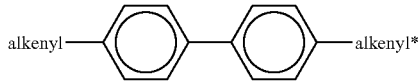

B3 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2\!=\!CH\!-\!$, $CH_2\!=\!CHCH_2CH_2\!-\!$, $CH_3\!-\!CH\!=\!CH\!-\!$, $CH_3\!-\!CH_2\!-\!CH\!=\!CH\!-\!$, $CH_3\!-\!(CH_2)_2\!-\!CH\!=\!CH\!-\!$, $CH_3\!-\!(CH_2)_3\!-\!CH\!=\!CH\!-\!$ or $CH_3\!-\!CH\!=\!CH\!-\!(CH_2)_2\!-\!$.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

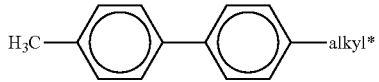

B1a

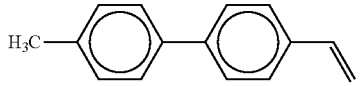

B2a

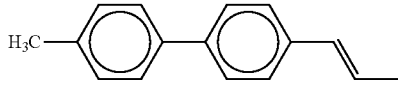

B2b

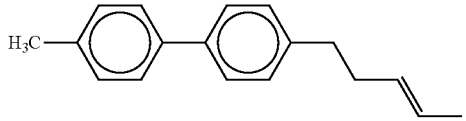

B2c in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

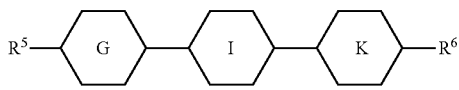

T in which $R^5$ and $R^6$ each, independently of one another, have one of the meanings indicated above for $R^1$, and

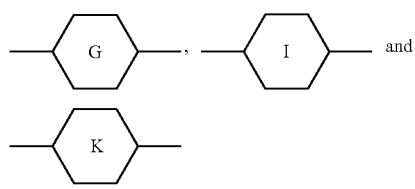
each, independently of one another, denote
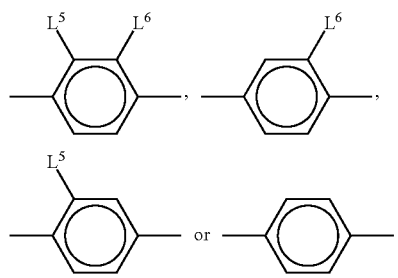
in which L⁵ denotes F or Cl, preferably F, and L⁶ denotes F, Cl, OCF$_3$, CF$_3$, CH$_3$, CH$_2$F or CHF$_2$, preferably F.
The compounds of the formula T are preferably selected from the group consisting of the following sub-formulae:
T1
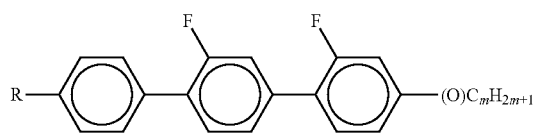
T2
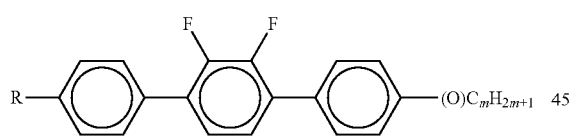
T3
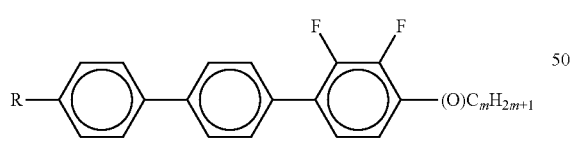
T4
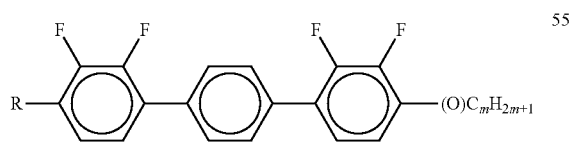
T5
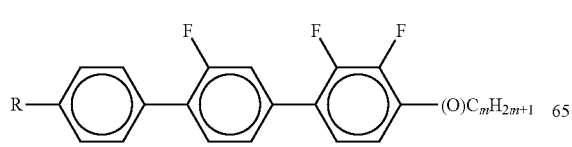
T6
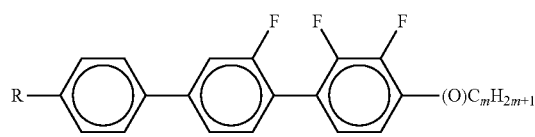
T7
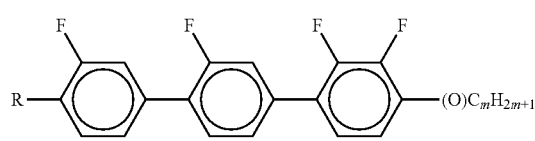
T8
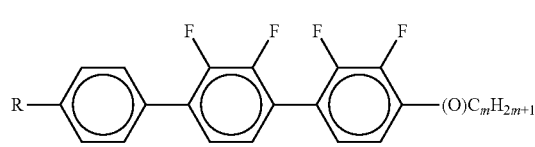
T9
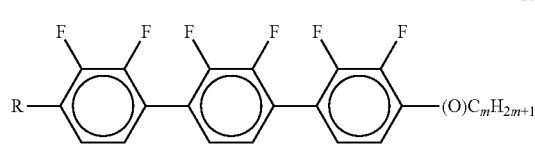
T10
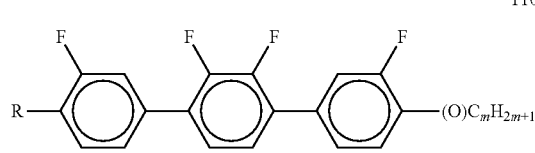
T11
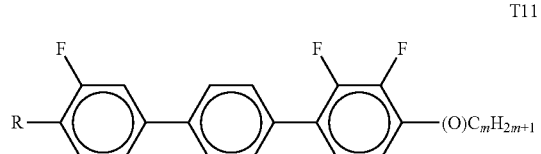
T12
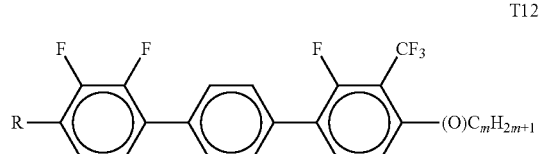
T13
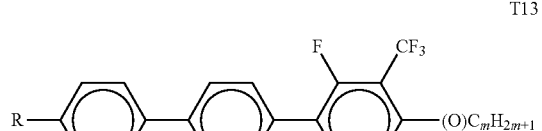
T14
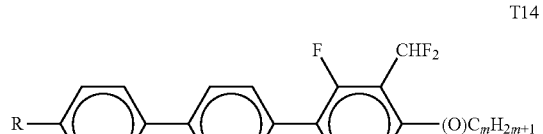
T15
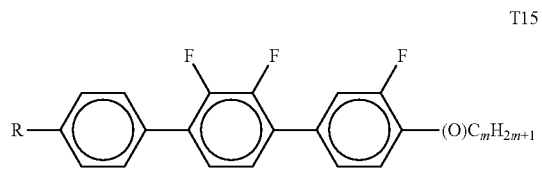

-continued

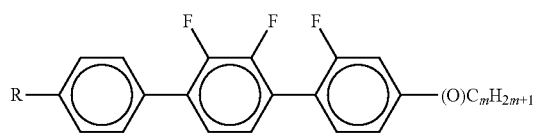
T16

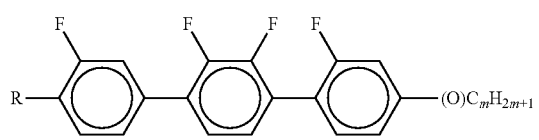
T17

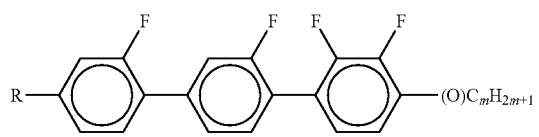
T18

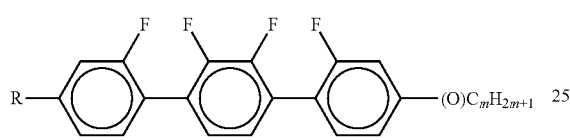
T19

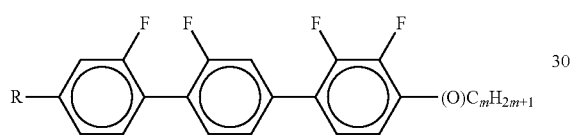
T20

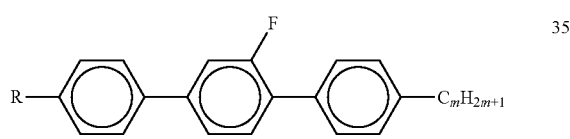
T21

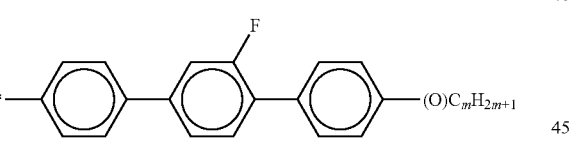
T22

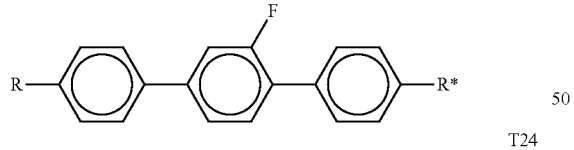
T23

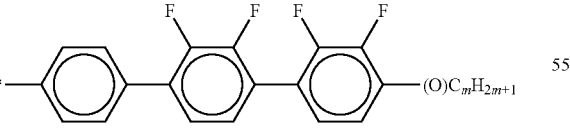
T24 in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be 0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

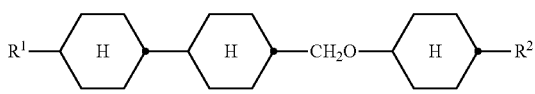
O1

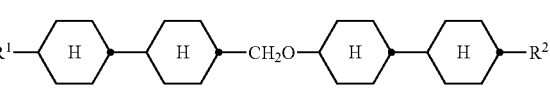
O2

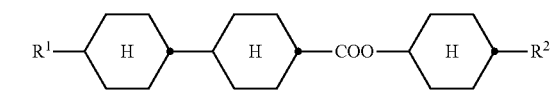
O3

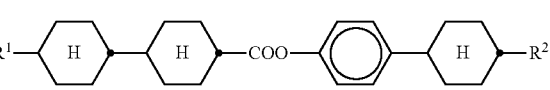
O4

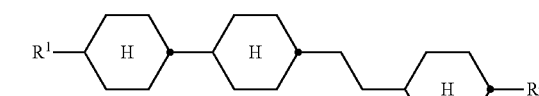
O5

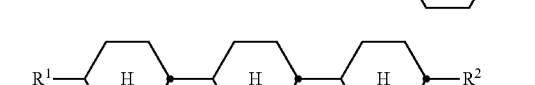
O6

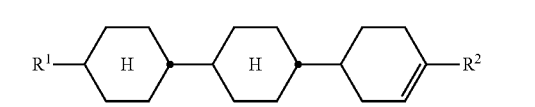
O7

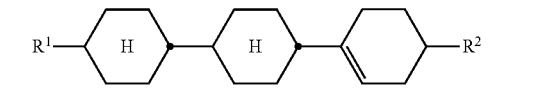
O8

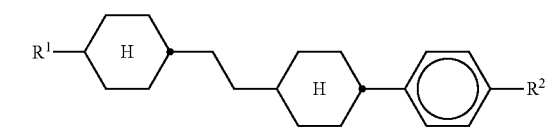
O9

-continued

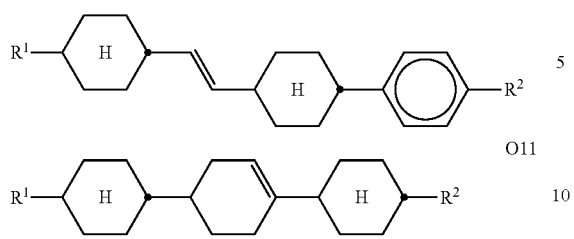

in which $R^1$ and $R^2$ have the meanings indicated above for formula LY and preferably each, independently of one another, denote straight-chain alkyl having 1 to 6 C atoms or straight-chain alkenyl having 2 to 6 C atoms.

Preferred media comprise one or more compounds selected from the formulae 01, 03 and 04.

k) LC medium which additionally comprises one or more compounds of the following formula:

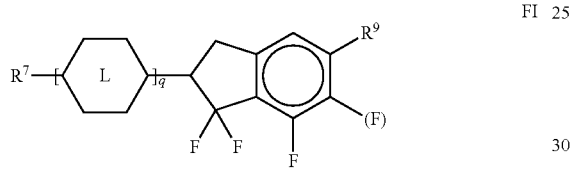 FI in which

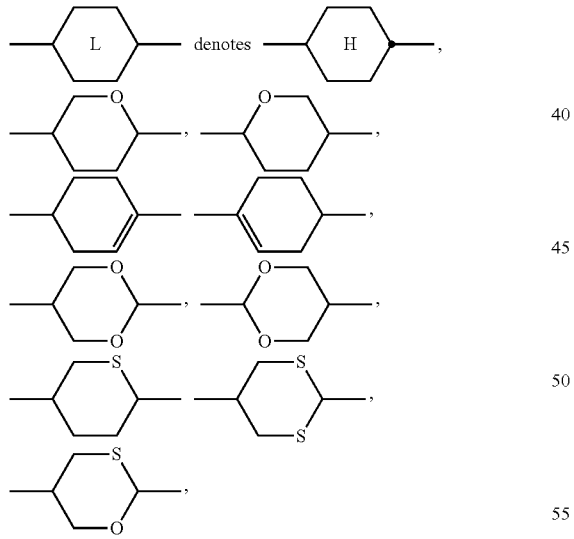

$R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

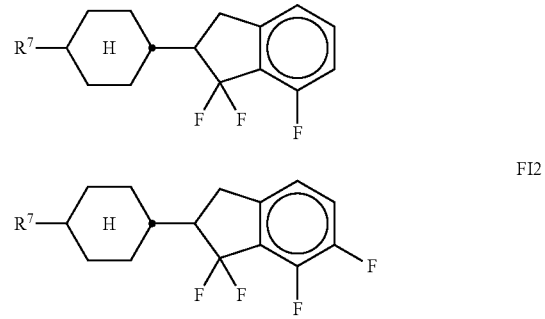

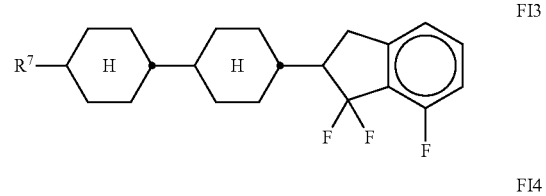

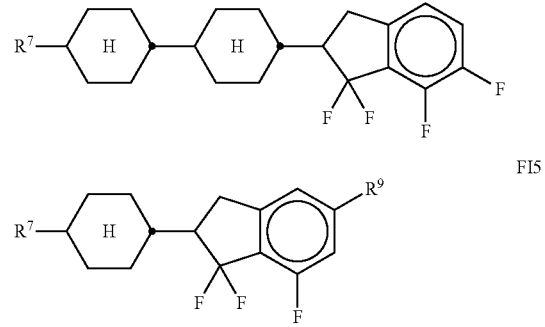

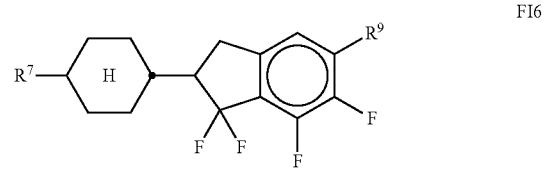

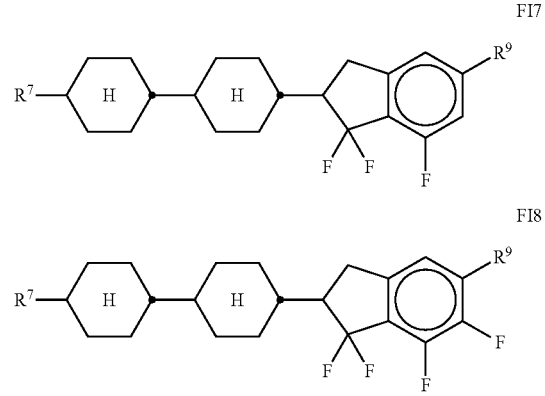

in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

m) LC medium which additionally comprises one or more compounds selected from the group consisting of the following formulae:

VK1

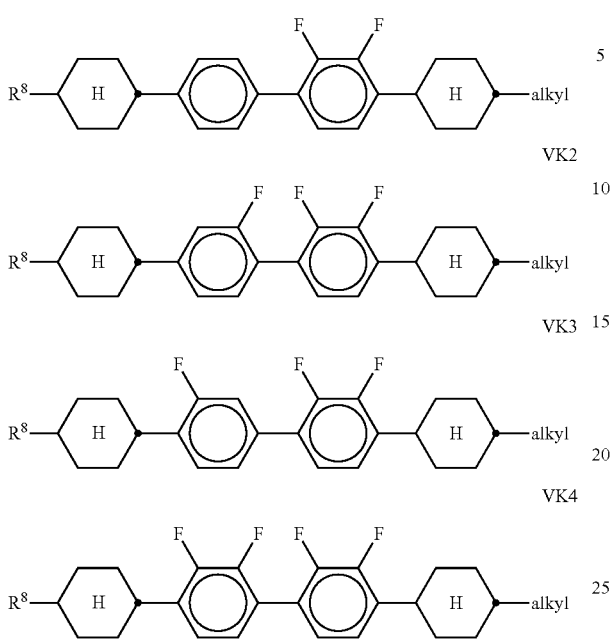

VK2

VK3

VK4 in which R⁸ has the meaning indicated for R¹ for formula LY, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the group consisting of the following formulae:

N1

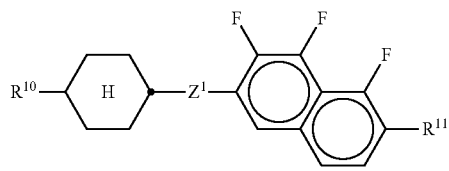

N2

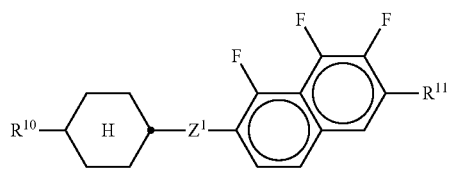

N4

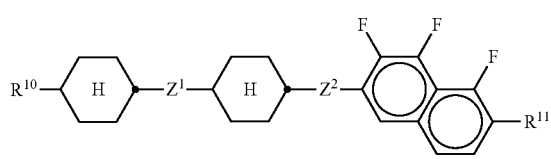

N4

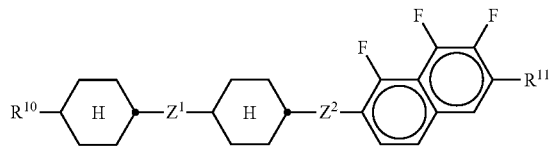

N5

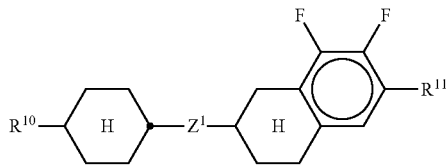

N6

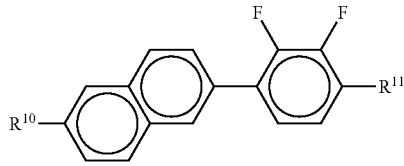

N7

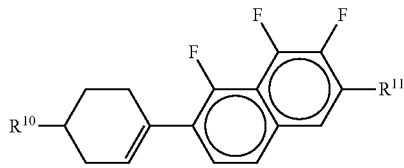

N8

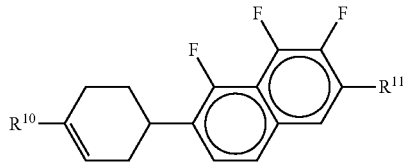

N9

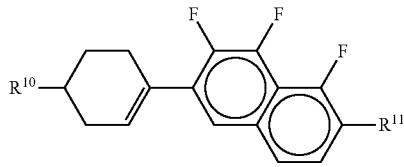

N10

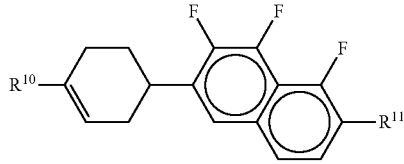

in which R¹⁰ and R¹¹ each, independently of one another, have one of the meanings indicated for R¹ for formula LY, preferably denote straight-chain alkyl or alkoxy having 1 to 6 C atoms or straight-chain alkenyl having 2 to 6 C atoms, and Z¹ and Z² each, independently of one another, denote —C₂H₄—, —CH=CH—, —(CH₂)₄—, —(CH₂)₃O—, —O(CH₂)₃—, —CH=CH—CH₂CH₂—, —CH₂CH₂CH=CH—, —CH₂O—, —OCH₂—, —CO—O—, —O—CO—, —C₂F₄—, —CF=CF—, —CF=CH—, —CH=CF—, —CH₂— or a single bond.

o) LC medium which additionally comprises one or more difluorodibenzochromans and/or chromans of the following formulae:

BC

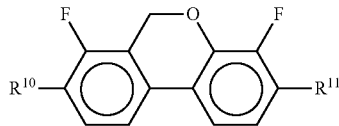

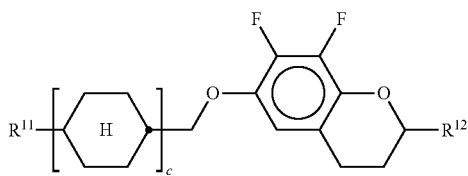
CR in which $R^{10}$ and $R^{11}$ each, independently of one another, have the meaning indicated above for $R^1$ in formula LY, and c denotes 0 or 1, preferably in amounts of 3 to 20% by weight, in particular in amounts of 3 to 15% by weight.

Particularly preferred compounds of the formulae BC and CR are selected from the group consisting of the following sub-formulae:

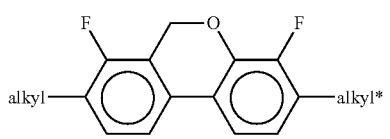
BC1

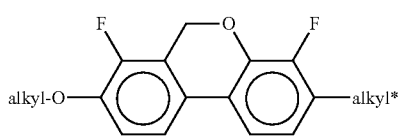
BC2

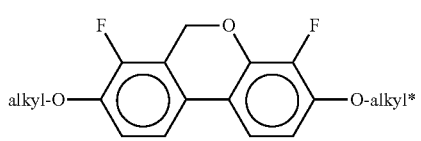
BC3

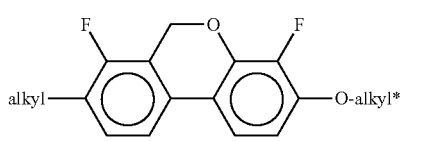
BC4

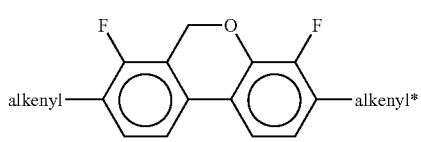
BC5

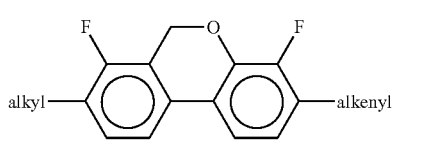
BC6

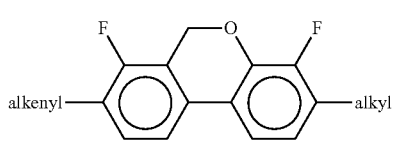
BC7

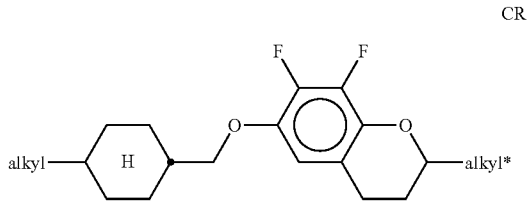
CR1

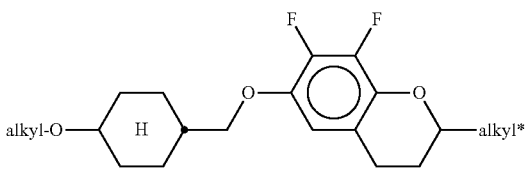
CR2

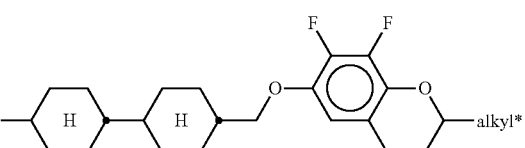
CR3

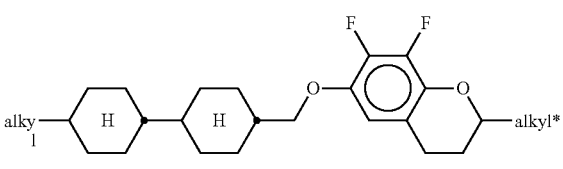
CR4

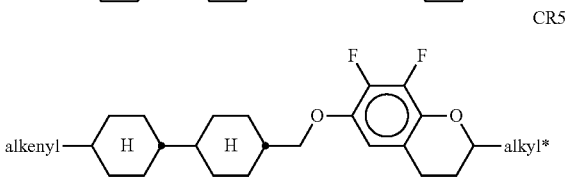
CR5 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH—$, $CH_2=CHCH_2CH_2—$, $CH_3—CH=CH—$, $CH_3—CH_2—CH=CH—$, $CH_3—(CH_2)_2—CH=CH—$, $CH_3—(CH_2)_3—CH=CH—$ or $CH_3—CH=CH—(CH_2)_2—$.

Very particular preference is given to mixtures comprising one, two or three compounds of the formula BC2.

p) LC medium which additionally comprises one or more fluorinated phenanthrenes and/or dibenzofurans of the following formulae:

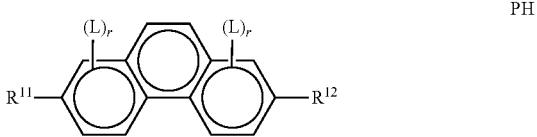
PH

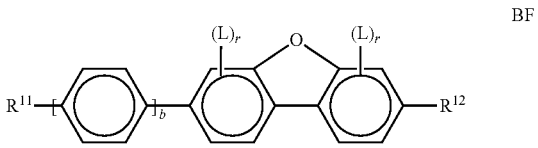
BF in which $R^{11}$ and $R^{12}$ each, independently of one another, have the meaning indicated above for $R^1$ in formula LY, b denotes 0 or 1, L denotes F, and r denotes 1, 2 or 3.

Particularly preferred compounds of the formulae PH and BF are selected from the group consisting of the following sub-formulae:

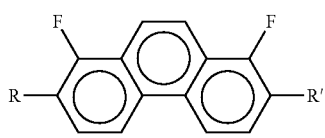
PH1

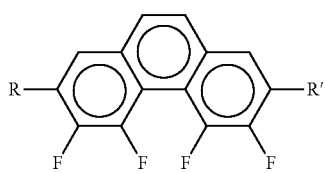
PH2

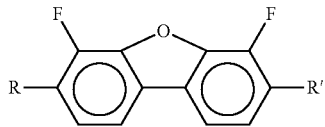
BF1

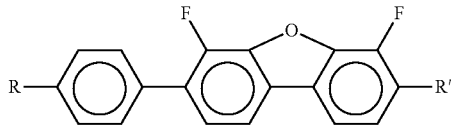
BF2 in which R and R' each, independently of one another, denote a straight-chain alkyl or alkoxy radical having 1-7 C atoms.

The liquid-crystal mixture according to the invention is dielectrically negative with a dielectric anisotropy ($\Delta\varepsilon$) of $\leq -1.5$. The compounds of the formulae IIIA, IIIB, IIIC, LY1-LY18, Y1-Y16, T1-T24, FI, VK1-VK4, N1-N10, BC, CR, PH and BF are suitable as dielectrically negative component. The dielectrically negative compounds are preferably selected from the formulae IIIA, IIIB and IIIC. The LC medium preferably has a $\Delta\varepsilon$ of $-1.5$ to $-8.0$, in particular $-2.5$ to $-6.0$.

The values of the birefringence $\Delta n$ in the liquid-crystal mixture are generally between 0.07 and 0.16, preferably between 0.08 and 0.12. The rotational viscosity $\gamma_1$ at 20° C. before the polymerisation is preferably $\leq 165$ mPa·s, in particular $\leq 140$ mPa·s.

Preferred embodiments of the liquid-crystalline medium having positive dielectric anisotropy according to the invention are indicated below:

LC medium which additionally comprises one or more compounds of the formulae II and/or III:

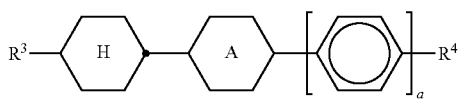
II

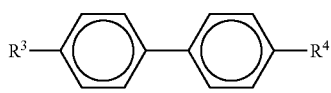
III in which
ring A denotes 1,4-phenylene or trans-1,4-cyclohexylene,
a is 0 or 1,
$R^3$ in each case, independently of one another, denotes alkyl having 1 to 9 C atoms or alkenyl having 2 to 9 C atoms, preferably alkenyl having 2 to 9 C atoms, and
$R^4$ in each case, independently of one another, denotes an unsubstituted or halogenated alkyl radical having 1 to 12 C atoms, where, in addition, one or two non-adjacent CH$_2$ groups may be replaced by —O—, —CH=CH—, —CH=CF—, —(CO)—, —O(CO)— or —(CO)O— in such a way that O atoms are not linked directly to one another, and preferably denotes alkyl having 1 to 12 C atoms or alkenyl having 2 to 9 C atoms.

The compounds of the formula II are preferably selected from the group consisting of the following formulae:

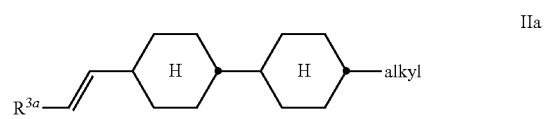
IIa

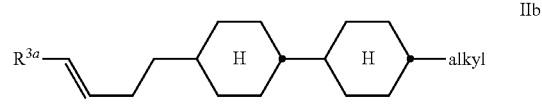
IIb

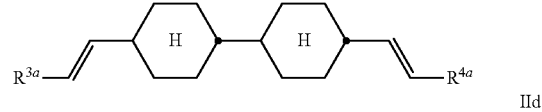
IIc

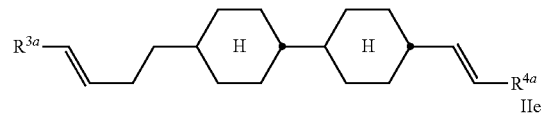
IId

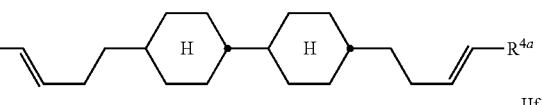
IIe

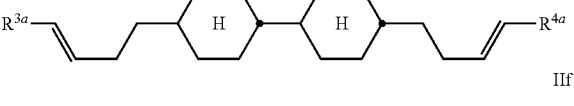
IIf

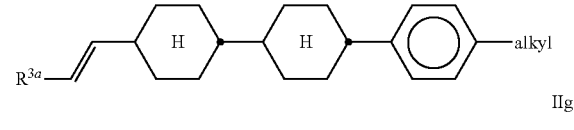
IIg

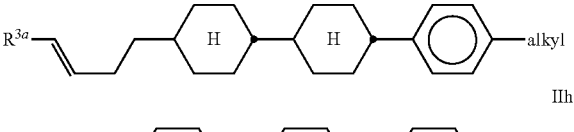
IIh

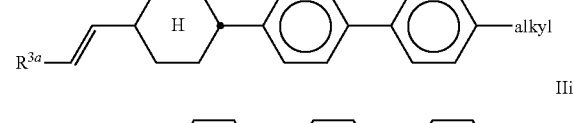
IIi

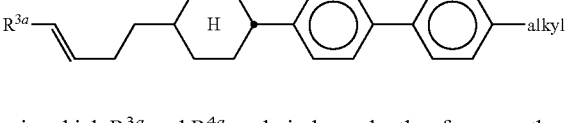

in which $R^{3a}$ and $R^{4a}$ each, independently of one another, denote H, CH$_3$, C$_2$H$_5$ or C$_3$H$_7$, and "alkyl" denotes a straight-chain alkyl group having 1 to 8, preferably 1, 2, 3, 4 or 5, C atoms. Particular preference is given to compounds of the formulae IIa and IIf, in particular those in which $R^{3a}$ denotes H or CH$_3$, preferably H, and compounds of the formula IIc, in particular those in which $R^{3a}$ and $R^{4a}$ denote H, CH$_3$ or C$_2$H$_5$.

The compounds of the formula III are preferably selected from the group consisting of the following formulae:

IIIa

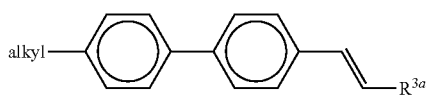

IIIb

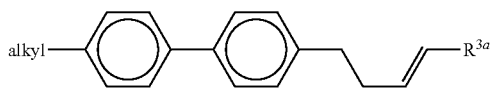

in which "alkyl" and $R^{3a}$ have the meanings indicated above, and $R^{3a}$ preferably denotes H or $CH_3$. Particular preference is given to compounds of the formula IIIb;

LC medium which additionally comprises one or more compounds selected from the group consisting of the following formulae:

IV

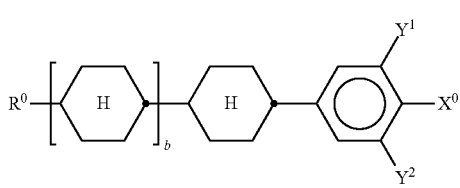

V

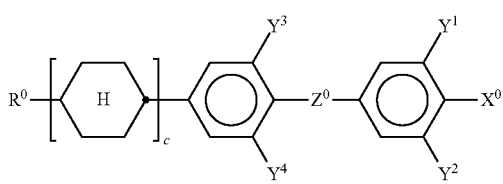

VI

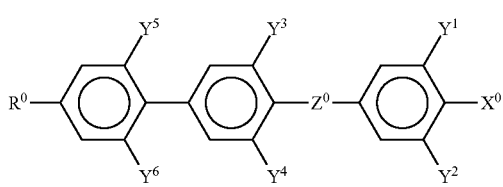

VII

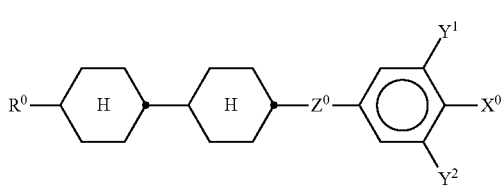

VIII

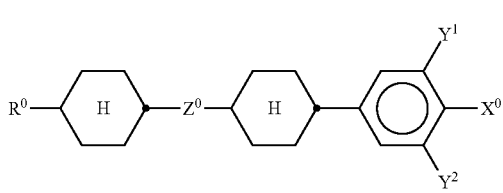

in which $R^0$ denotes an alkyl or alkoxy radical having 1 to 15 C atoms, where, in addition, one or more $CH_2$ groups in these radicals may each be replaced, independently of one another, by —C≡C—, —$CF_2O$—, —CH=CH—,

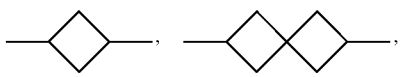

—O—, —(CO)O— or —O(CO)— in such a way that O atoms are not linked directly to one another, and in which, in addition, one or more H atoms may be replaced by halogen, $X^0$ denotes F, Cl, CN, $SF_5$, SCN, NCS, a halogenated alkyl radical, halogenated alkenyl radical, halogenated alkoxy radical or halogenated alkenyloxy radical, each having up to 6 C atoms, $Y^{1-6}$ each, independently of one another, denote H or F, $Z^0$ denotes —$C_2H_4$—, —$(CH_2)_4$—, —CH=CH—, —CF=CF—, —$C_2F_4$—, —$CH_2CF_2$—, —$CF_2CH_2$—, —$CH_2O$—, —$OCH_2$—, —COO—, —$CF_2O$— or —$OCF_2$—, in the formulae V and VI also a single bond, and b and c each, independently of one another, denote 0 or 1.

In the compounds of the formulae IV to VIII, $X^0$ preferably denotes F or $OCF_3$, furthermore $OCHF_2$, $CF_3$, $CF_2H$, Cl, OCH=$CF_2$. $R^0$ is preferably straight-chain alkyl or alkenyl, each having up to 6 C atoms.

The compounds of the formula IV are preferably selected from the group consisting of the following formulae:

IVa

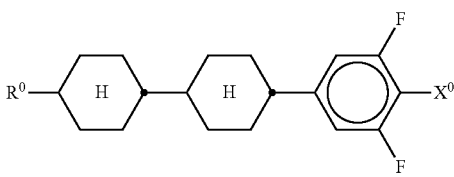

IVb

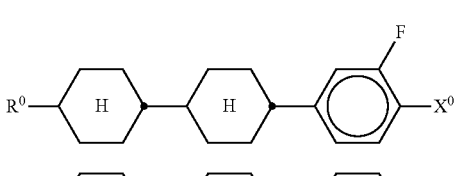

IVc

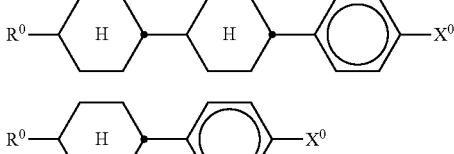

IVd

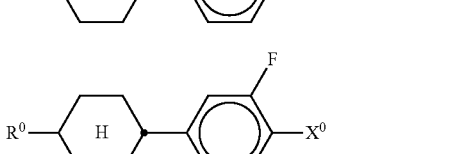

IVe

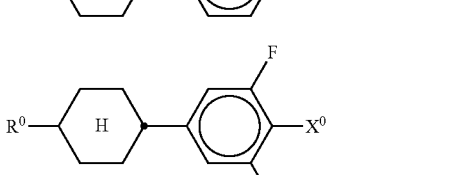

IVf

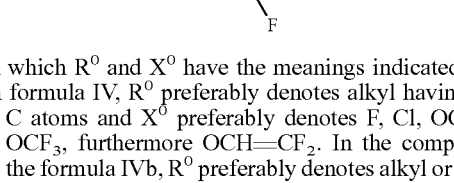

in which $R^0$ and $X^0$ have the meanings indicated above.

In formula IV, $R^0$ preferably denotes alkyl having 1 to 8 C atoms and $X^0$ preferably denotes F, Cl, $OCHF_2$ or $OCF_3$, furthermore OCH=$CF_2$. In the compound of the formula IVb, $R^0$ preferably denotes alkyl or alkenyl. In the compound of the formula IVd, $X^0$ preferably denotes Cl, furthermore F.

The compounds of the formula V are preferably selected from the group consisting of the following formulae:

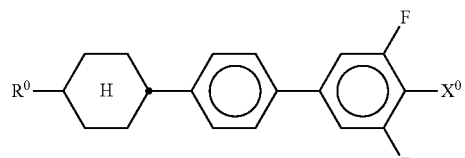
Va

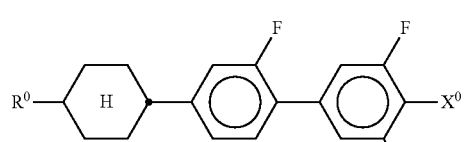
Vb

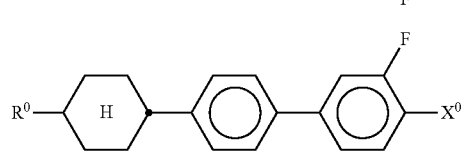
Vc

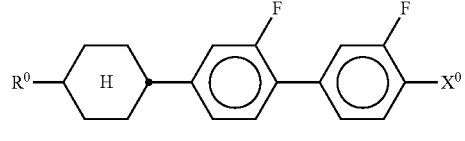
Vd

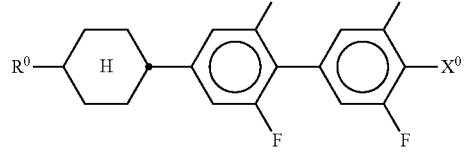
Ve

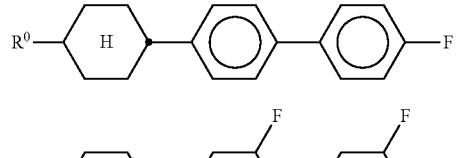
Vf

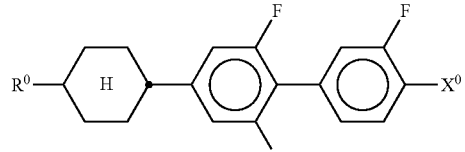
Vg in which $R^0$ and $X^0$ have the meanings indicated above. In formula V, $R^0$ preferably denotes alkyl having 1 to 8 C atoms and $X^0$ preferably denotes F;

LC medium which comprises one or more compounds of the formula VI-1:

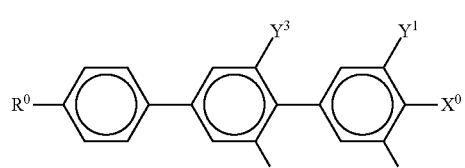
VI-1 particularly preferably those selected from the group consisting of the following formulae:

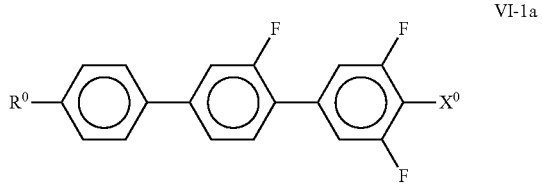
VI-1a

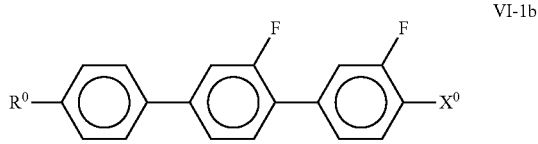
VI-1b

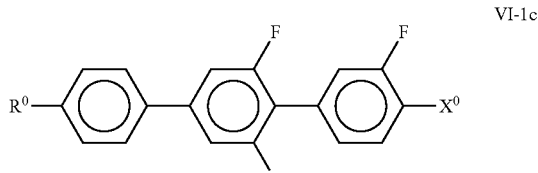
VI-1c

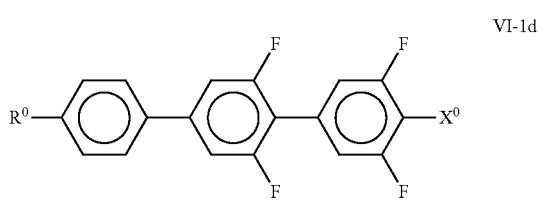
VI-1d in which $R^0$ and $X^0$ have the meanings indicated above. In formula VI, $R^0$ preferably denotes alkyl having 1 to 8 C atoms and $X^0$ preferably denotes F, furthermore $OCF_3$.

LC medium which comprises one or more compounds of the formula VI-2:

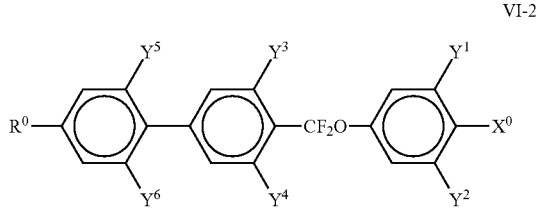
VI-2 particularly preferably those selected from the group consisting of the following formulae:

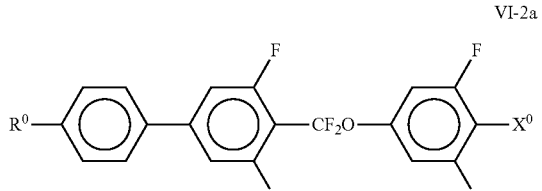
VI-2a

VI-2b
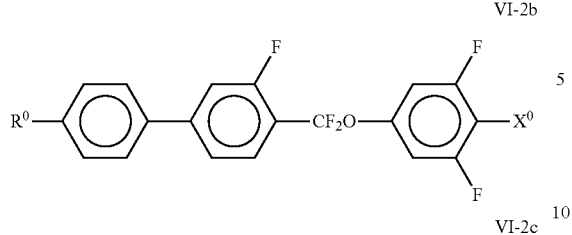

VI-2c
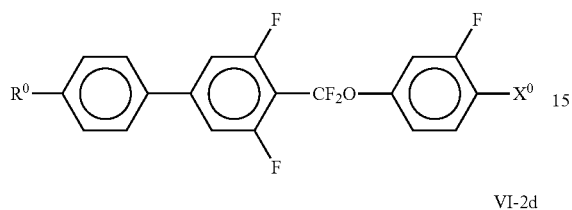

VI-2d
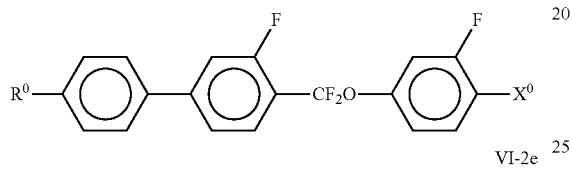

VI-2e
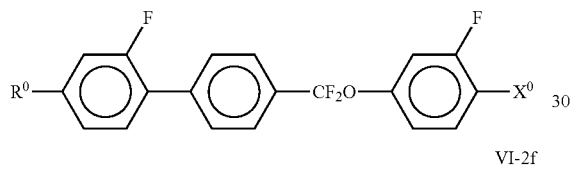

VI-2f
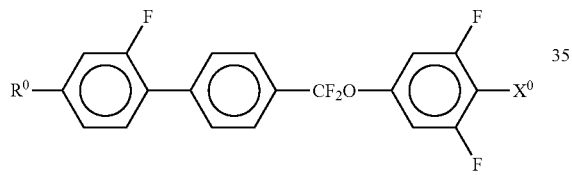

in which $R^0$ and $X^0$ have the meanings indicated above.

In formula VI, $R^0$ preferably denotes alkyl having 1 to 8 C atoms and $X^0$ preferably denotes F;

LC medium which preferably comprises one or more compounds of the formula VII in which $Z^0$ denotes —$CF_2O$—, —$CH_2CH_2$— or —(CO)O—, particularly preferably those selected from the group consisting of the following formulae:

VII-1a
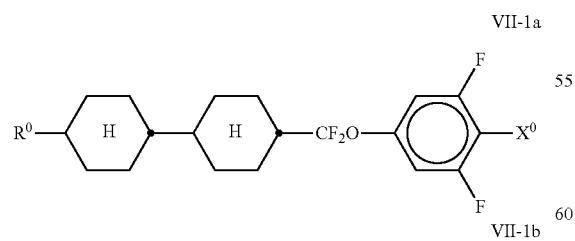

VII-1b
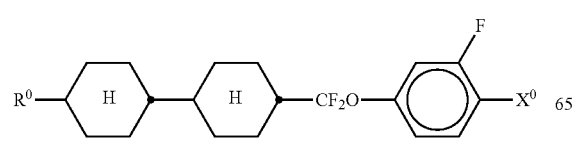

VII-1c
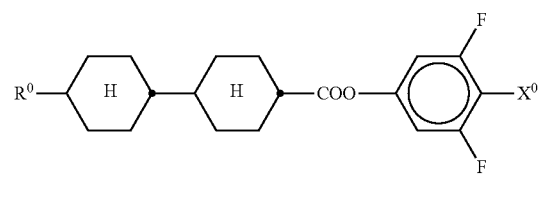

VII-1d
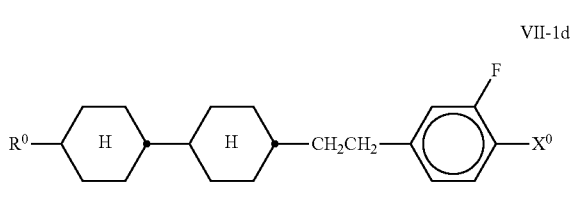

VII-1e
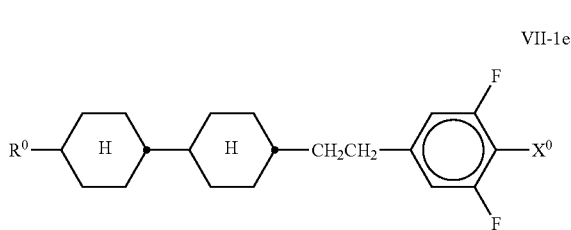

in which $R^0$ and $X^0$ have the meanings indicated above. In formula VII, $R^0$ preferably denotes alkyl having 1 to 8 C atoms and $X^0$ preferably denotes F, furthermore $OCF_3$.

The compounds of the formula VIII are preferably selected from the group consisting of the following formulae:

VIIIa
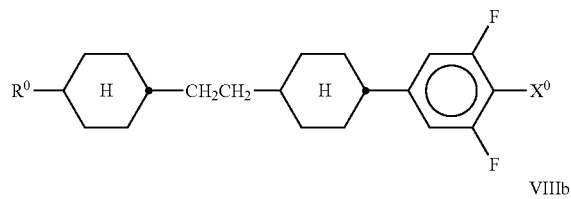

VIIIb
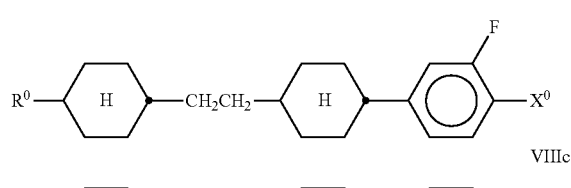

VIIIc
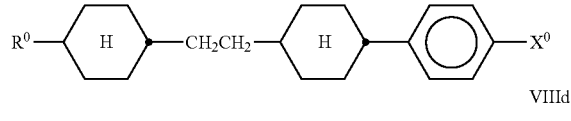

VIIId
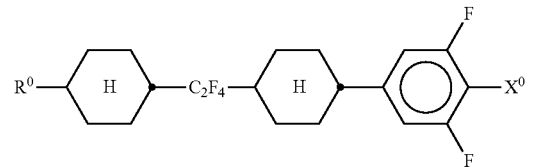

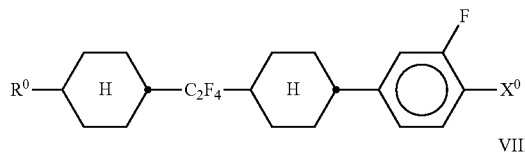

VIIIe

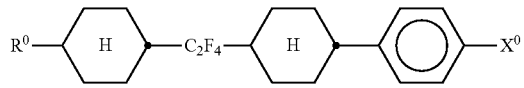

VIIIf in which R⁰ and X⁰ have the meanings indicated above. R⁰ preferably denotes a straight-chain alkyl radical having 1 to 8 C atoms. X⁰ preferably denotes F.

LC medium which additionally comprises one or more compounds of the following formula:

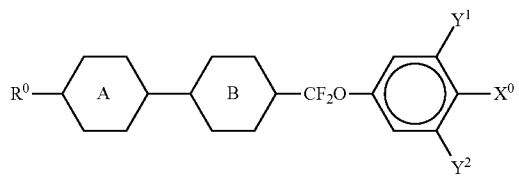

IX in which R⁰, X⁰, Y¹ and Y² have the meanings indicated above, and

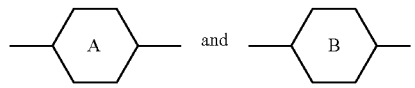

each, independently of one another, denote

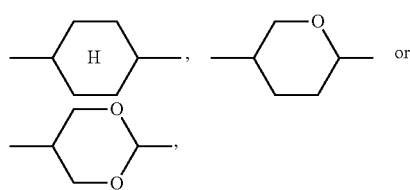

where the rings A and B do not both simultaneously denote cyclohexylene;

The compounds of the formula IX are preferably selected from the group consisting of the following formulae:

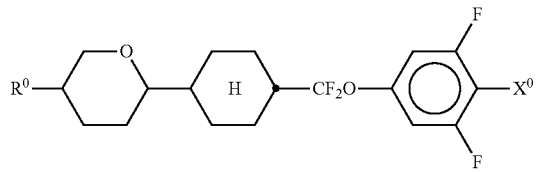

IXa

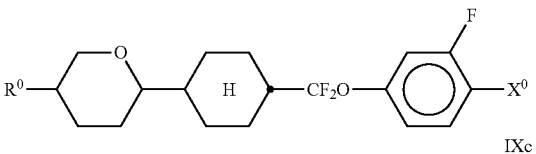

IXb

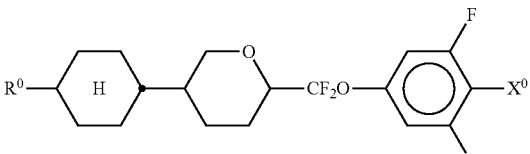

IXc

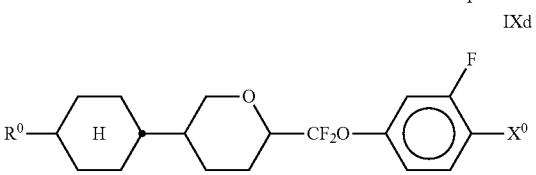

IXd

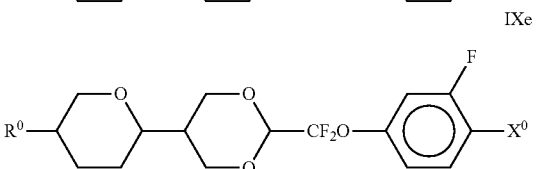

IXe

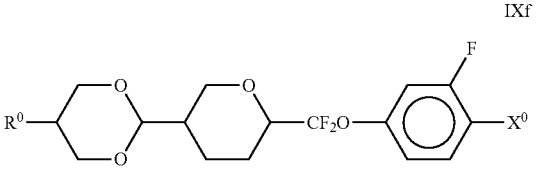

IXf

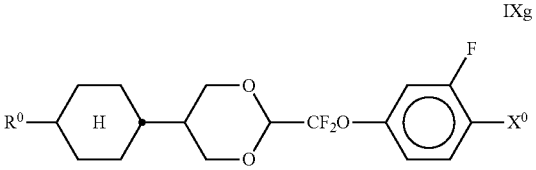

IXg

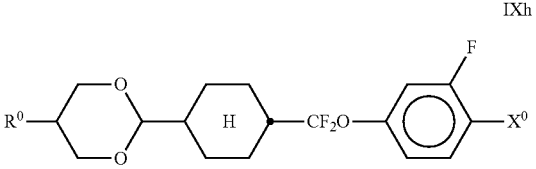

IXh in which R⁰ and X⁰ have the meanings indicated above. R⁰ preferably denotes alkyl having 1 to 8 C atoms and X⁰ preferably denotes F. Particular preference is given to compounds of the formula IXa;

LC medium which additionally comprises one or more compounds selected from the group consisting of the following formulae:

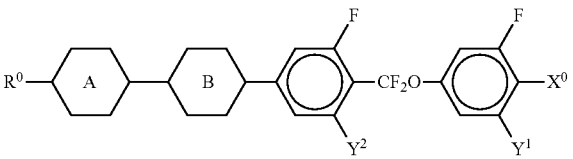

X

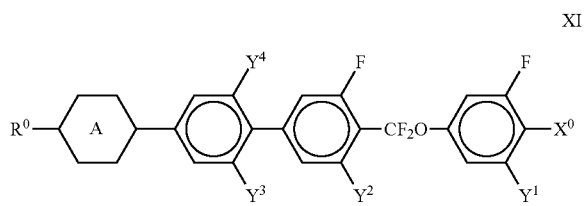

XI in which R⁰, X⁰ and Y¹⁻⁴ have the meanings indicated above, and

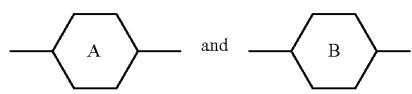

each, independently of one another, denote

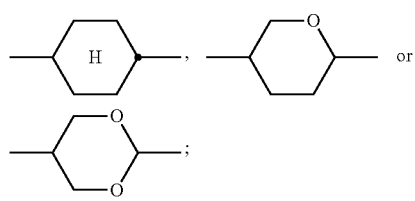

The compounds of the formulae X and XI are preferably selected from the group consisting of the following formulae:

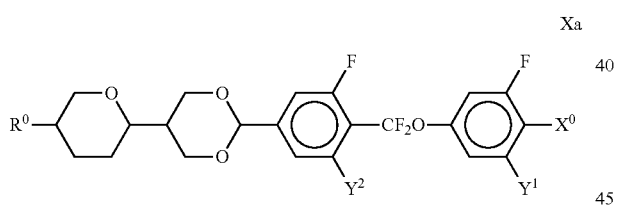

Xa

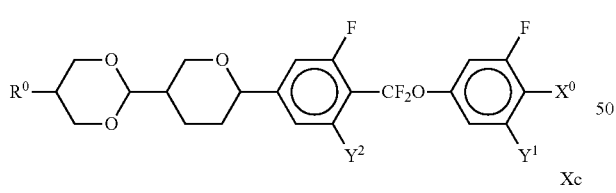

Xb

Xc

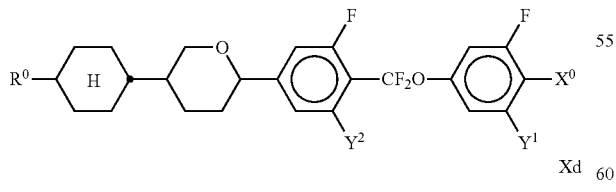

Xd

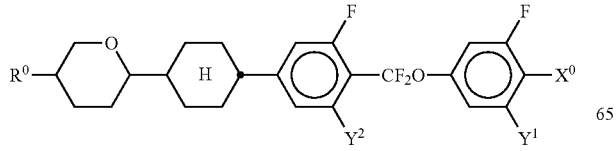

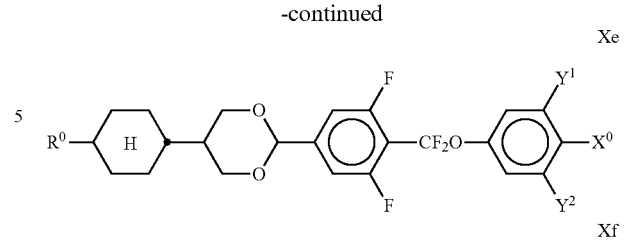

Xe

Xf

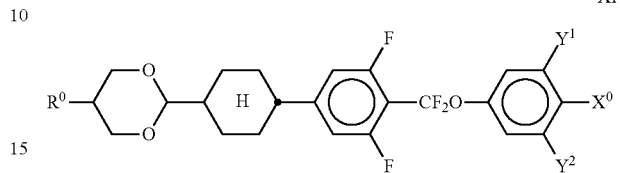

XIa

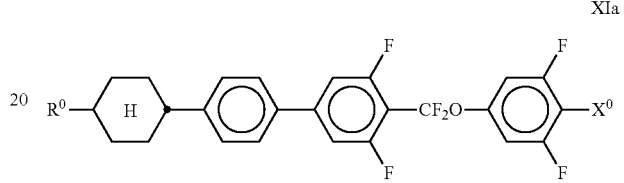

XIb

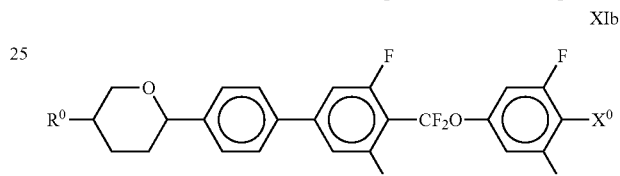

in which R⁰ and X⁰ have the meanings indicated above. R⁰ preferably denotes alkyl having 1 to 8 C atoms and/or X⁰ preferably denotes F. Particularly preferred compounds are those in which Y¹ denotes F and Y² denotes H or F, preferably F;

LC medium which additionally comprises one or more compounds of the following formula XII:

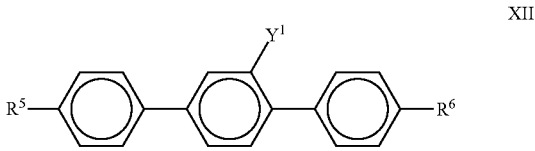

XII in which R⁵ and R⁶ each, independently of one another, denote n-alkyl, alkoxy, oxaalkyl, fluoroalkyl or alkenyl, each having up to 9 C atoms, and preferably each, independently of one another, denote alkyl having 1 to 7 C atoms or alkenyl having 2 to 7 C atoms. Y¹ denotes H or F.

Preferred compounds of the formula XII are those selected from the group consisting of the following formulae:

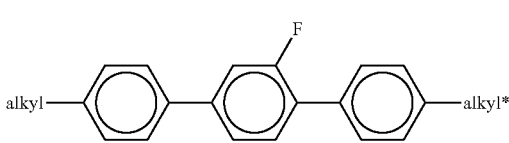

XIIa

-continued

XIIb
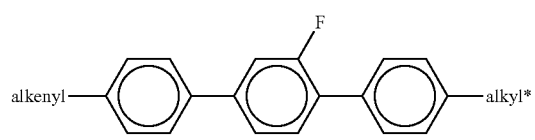

XIIc
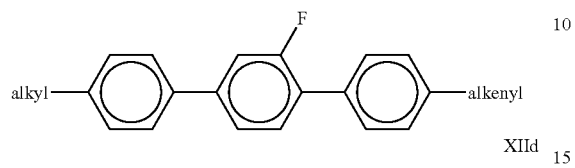

XIId
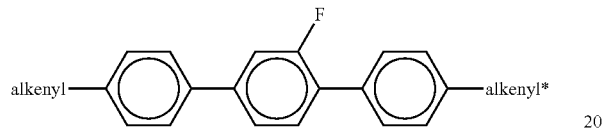

in which
alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

Very particular preference is given to compounds of the following formula:

XIIc1
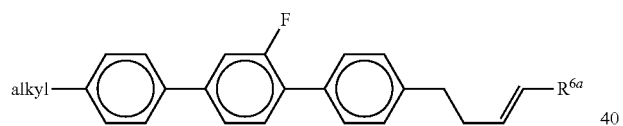

in which alkyl has the meaning indicated above, and $R^{6a}$ denotes H or $CH_3$.

LC medium which additionally comprises one or more compounds selected from the group consisting of the following formulae:

XIII
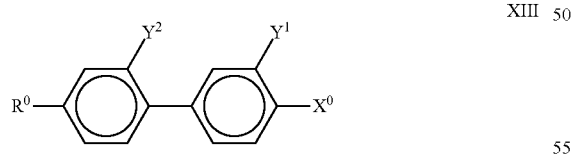

XIV
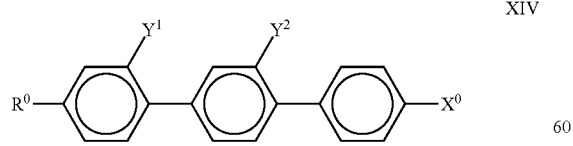

XV
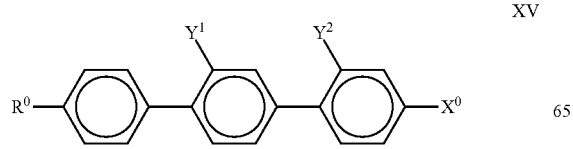

-continued

XVI
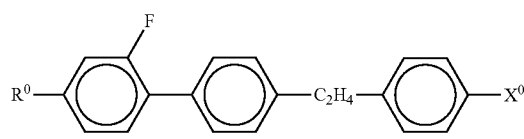

in which $R^0$, $X^0$, $Y^1$ and $Y^2$ have the meanings indicated above. $R^0$ preferably denotes alkyl having 1 to 8 C atoms and $X^0$ preferably denotes F or Cl;

The compounds of the formulae XIII and XIV are preferably selected from the group consisting of the following formulae:

XIIIa
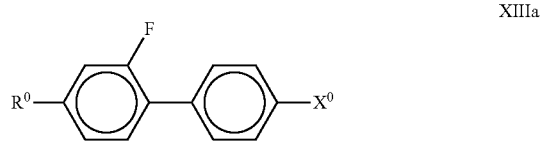

XIVa
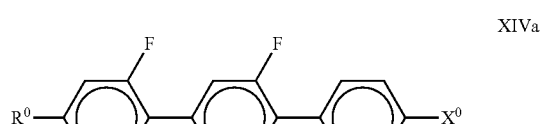

XVa
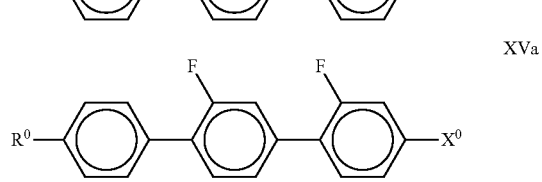

in which $R^0$ and $X^0$ have the meanings indicated above. $R^0$ preferably denotes alkyl having 1 to 8 C atoms. In the compounds of the formula XIII, $X^0$ preferably denotes F or Cl.

LC medium which additionally comprises one or more compounds of the formulae D1 and/or D2:

D1
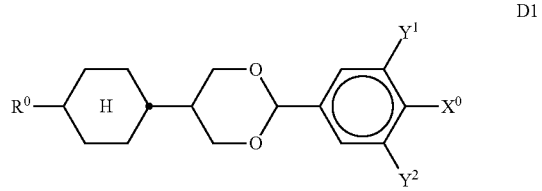

D2
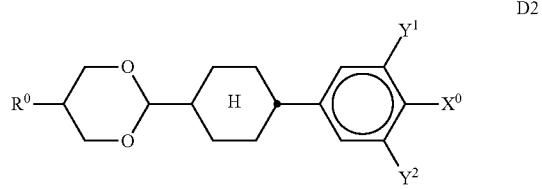

in which $Y^1$, $Y^2$, $R^0$ and $X^0$ have the meanings indicated above. $R^0$ preferably denotes alkyl having 1 to 8 C atoms and $X^0$ preferably denotes F. Particular preference is given to compounds of the following formulae:

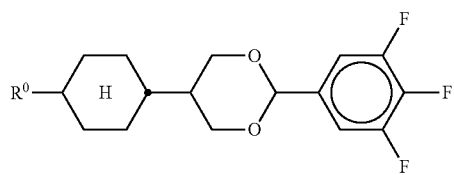

D1-1

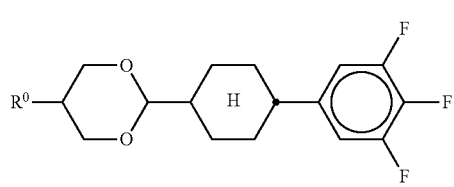

D2-1 in which R⁰ has the meaning indicated above and preferably denotes straight-chain alkyl having 1 to 6 C atoms, in particular $C_2H_5$, n-$C_3H_7$ or n-$C_5H_{11}$.

LC medium which additionally comprises one or more compounds of the following formulae:

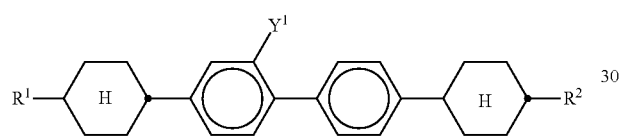

XVIIa

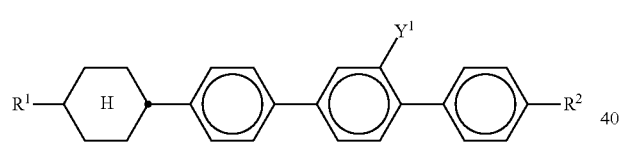

XVIIb in which $Y^1$, $R^1$ and $R^2$ have the meanings indicated above. $R^1$ and $R^2$ preferably each, independently of one another, denote alkyl having 1 to 8 C atoms. $Y^1$ preferably denotes F. Preferred media comprise 1-15% by weight, in particular 1-10% by weight, of these compounds.

LC medium which additionally comprises one or more compounds of the following formula:

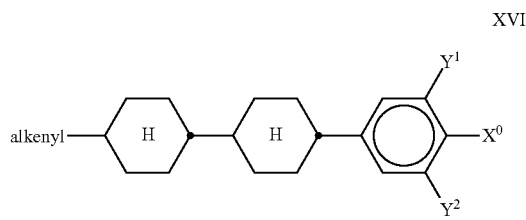

XVIII in which $X^0$, $Y^1$ and $Y^2$ have the meanings indicated above, and "alkenyl" denotes $C_{2-7}$-alkenyl. Particular preference is given to compounds of the following formula:

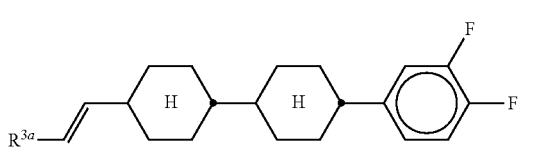

XVIIIa in which $R^{3a}$ has the meaning indicated above and preferably denotes H;

LC medium which additionally comprises one or more tetracyclic compounds selected from the group consisting of the formulae XIX to XXV:

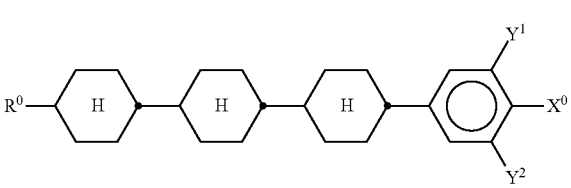

XIX

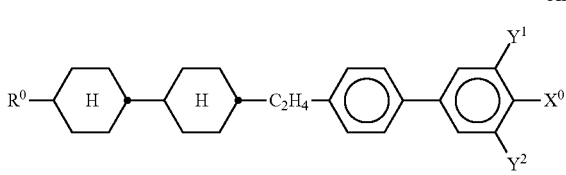

XX

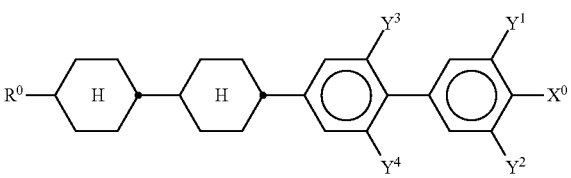

XXI

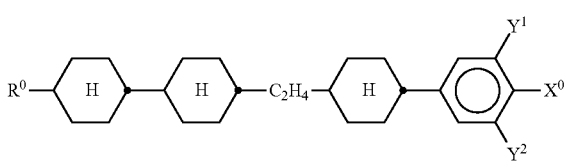

XXII

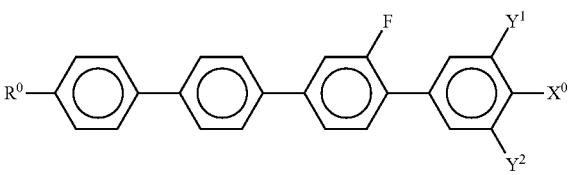

XXIII

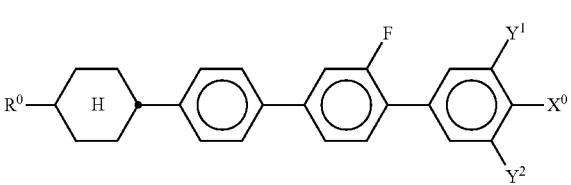

XXIV

-continued

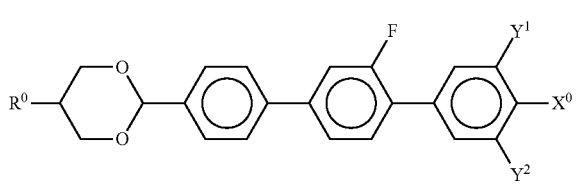
XXV in which $Y^{1-4}$, $R^0$ and $X^0$ each, independently of one another, have one of the meanings indicated above. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 8 C atoms.

LC medium which additionally comprises one or more compounds of the following formula:

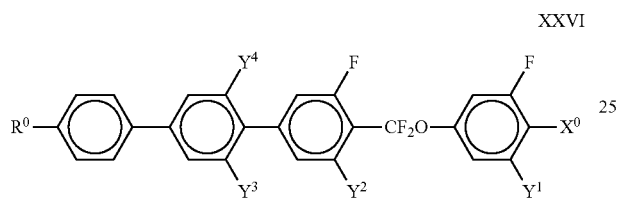
XXVI in which $R^0$, $X^0$ and $Y^{1-4}$ have the meanings indicated above. Particular preference is given to compounds of the following formula:

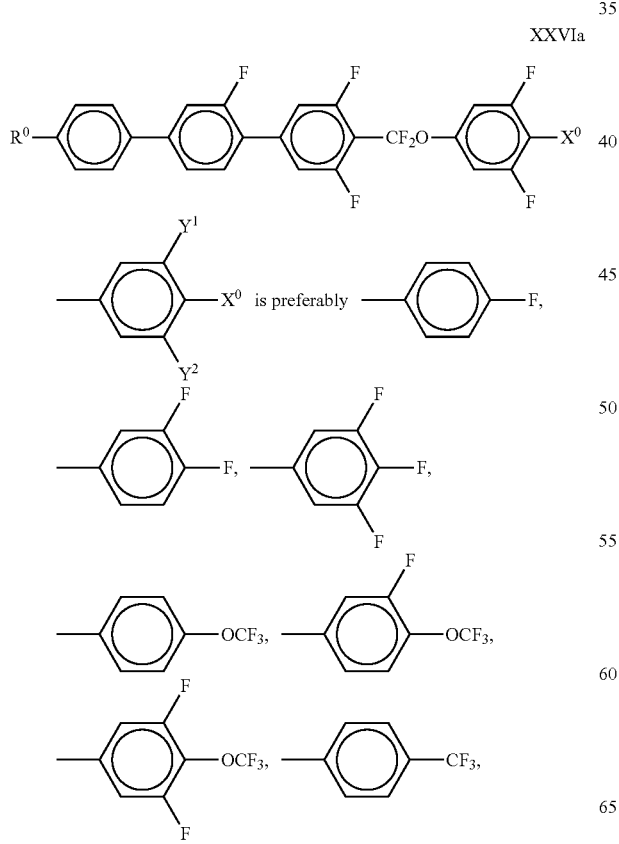
XXVIa

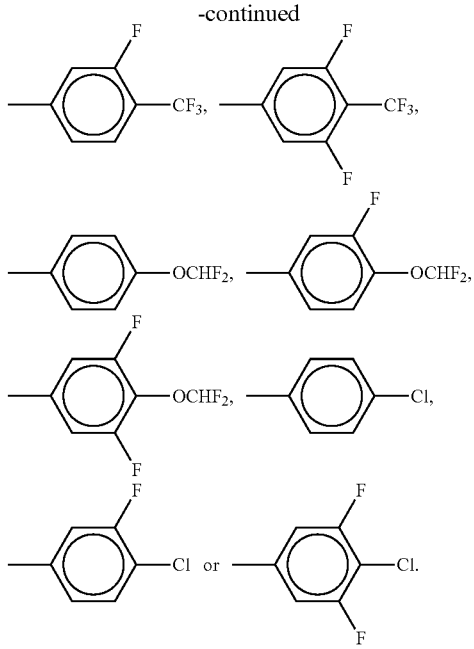

$R^0$ is generally preferably straight-chain alkyl or alkenyl having 2 to 7 C atoms;

$X^0$ is preferably F, furthermore $OCF_3$, Cl or $CF_3$;

the medium preferably comprises one or more compounds selected from the group of the compounds of the formula II;

the medium preferably comprises one or more compounds selected from the group of the compounds of the formulae VI-2, VII-1a, VII-1b, IX, X, XI and XXVI ($CF_2O$-bridged compounds); the total content of compounds of the formulae VI-2, VII-1a, VII-1b, IX, X, XI and XXVI is preferably 35% by weight or more, particularly preferably 40% by weight or more and very particularly preferably 45% by weight or more;

the proportion of compounds of the formulae II-XXVII in the mixture as a whole is preferably 20 to 99% by weight;

the medium preferably comprises 25-80% by weight, particularly preferably 30-70% by weight, of compounds of the formulae II and/or III;

the medium preferably comprises 20-70% by weight, particularly preferably 25-60% by weight, of compounds of the formula IIa;

the medium preferably comprises 2-25% by weight, particularly preferably 3-20% by weight, of compounds selected from the group of the compounds of the formula VI-2;

the medium comprises in total 2-30% by weight, particularly preferably 3-20% by weight, of compounds of the formulae XI and XXVII together;

the medium preferably comprises 1-20% by weight, particularly preferably 2-15% by weight, of compounds of the formula XXIV;

the medium comprises in total 15-65% by weight, particularly preferably 30-55% by weight, of compounds selected from the high-polarity compounds of the formulae VI-2, X, XI and XXV together.

The nematic phase of the dielectrically negative or positive LC medium according to the invention preferably has a nematic phase in a temperature range from 10° C. or less to 60° C. or more, particularly preferably from 0 or less to 70° C. or more.

In the present application and in the examples below, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively; n, m, z and k are integers and preferably denote 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are found in Tables A and B.

TABLE A

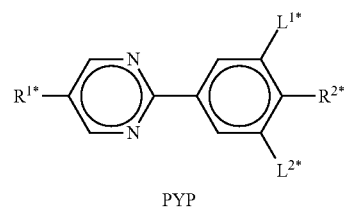

PYP

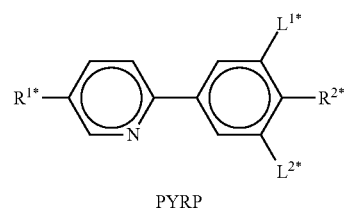

PYRP

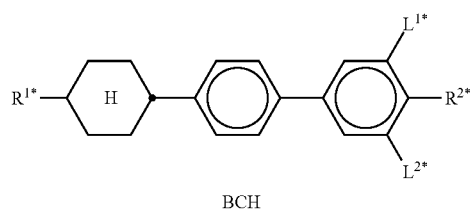

BCH

TABLE A-continued

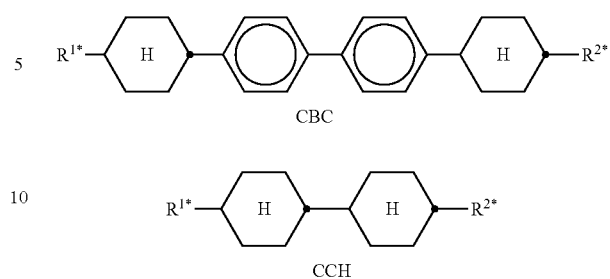

CBC

CCH

TABLE A-continued

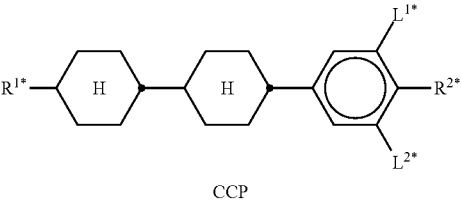

CCP

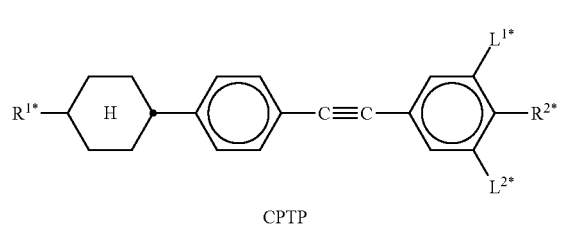

CPTP

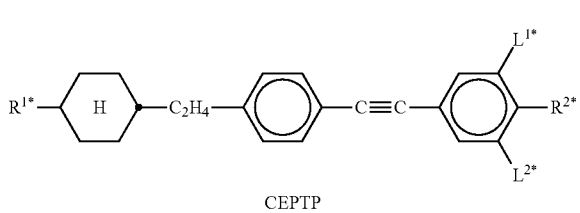

CEPTP

TABLE A-continued
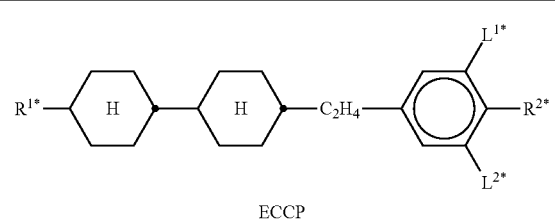
ECCP
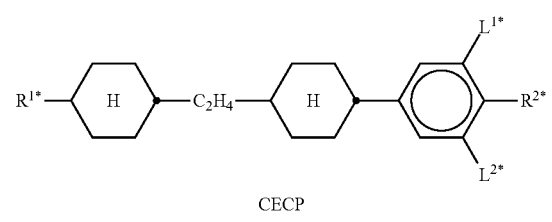
CECP
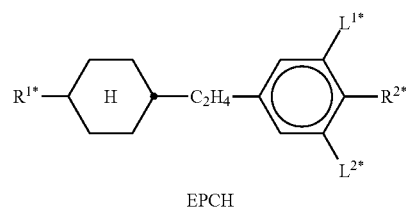
EPCH
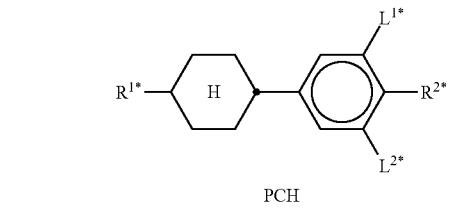
PCH
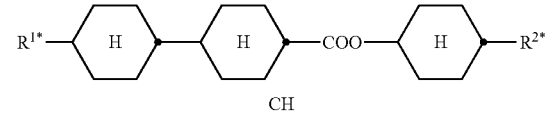
CH
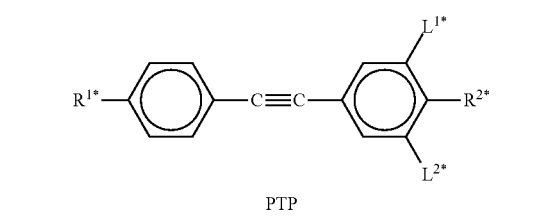
PTP
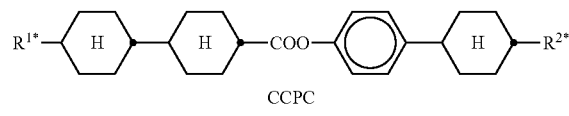
CCPC
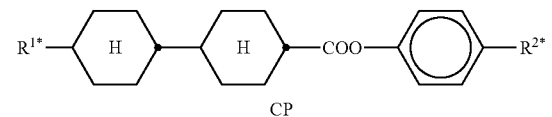
CP
TABLE A-continued
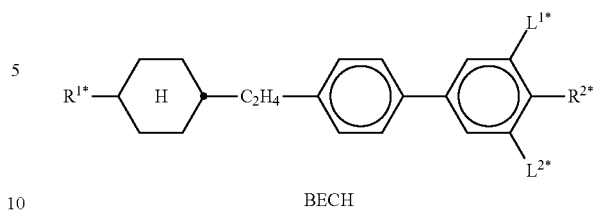
BECH
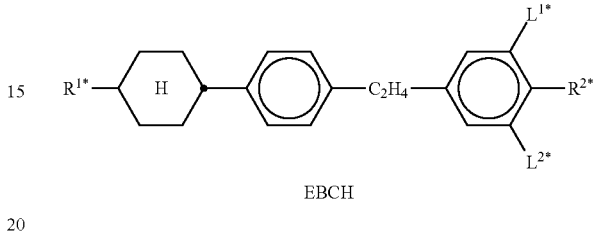
EBCH
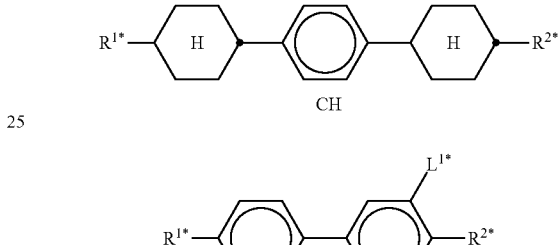
CH
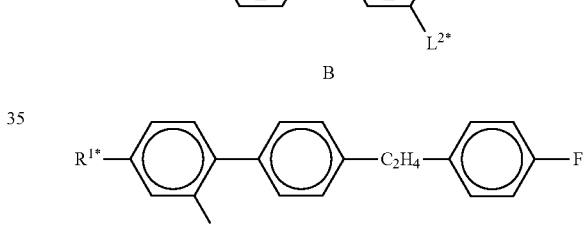
B
FET-nF
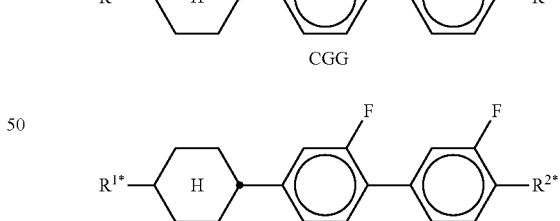
CGG
CGU
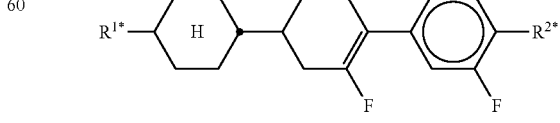
CFU TABLE B
n, m, z, independently of one another, preferably denote 1, 2, 3, 4, 5 or 6.
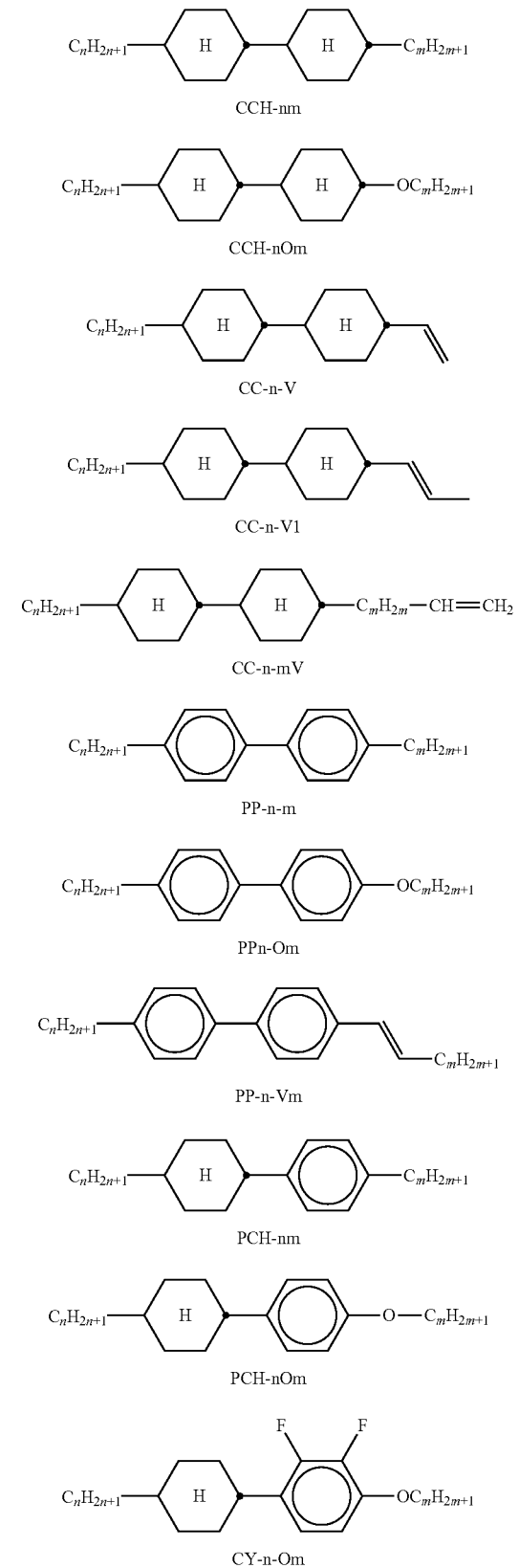

TABLE B-continued
n, m, z, independently of one another, preferably denote 1, 2, 3, 4, 5 or 6.
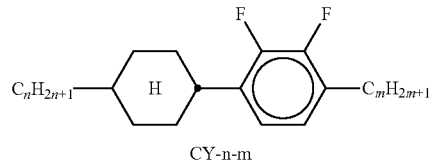
CY-n-m
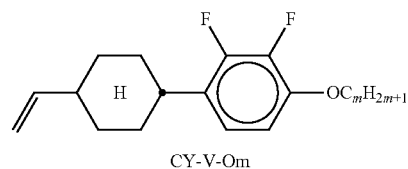
CY-V-Om
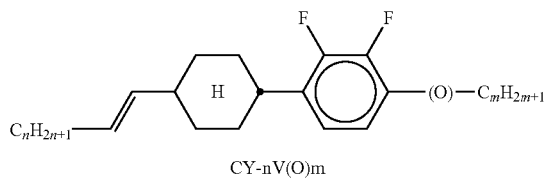
CY-nV(O)m
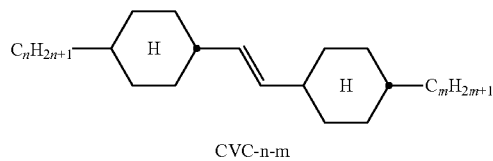
CVC-n-m
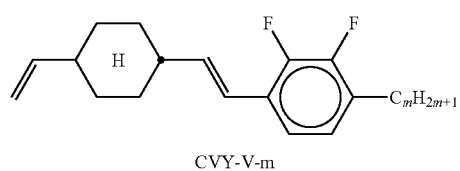
CVY-V-m
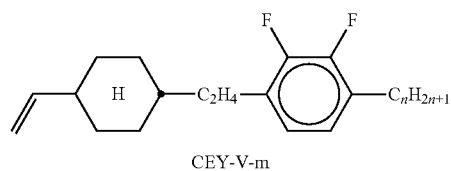
CEY-V-m
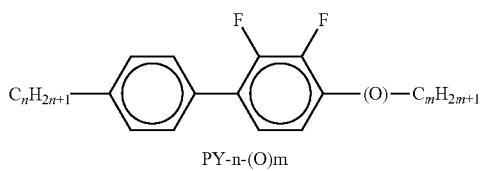
PY-n-(O)m
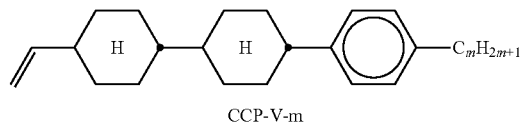
CCP-V-m
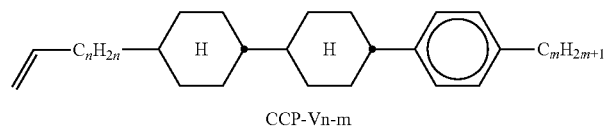
CCP-Vn-m TABLE B-continued
n, m, z, independently of one another, preferably denote 1, 2, 3, 4, 5 or 6.
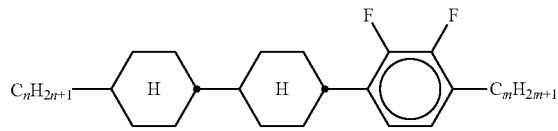
CCY-n-m
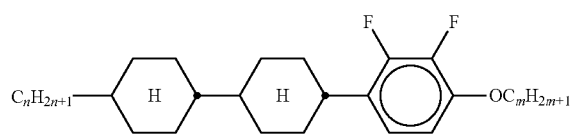
CCY-n-Om
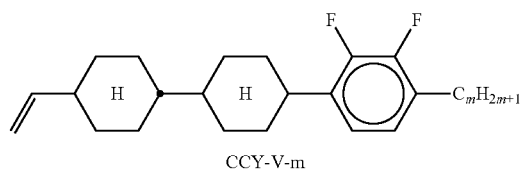
CCY-V-m
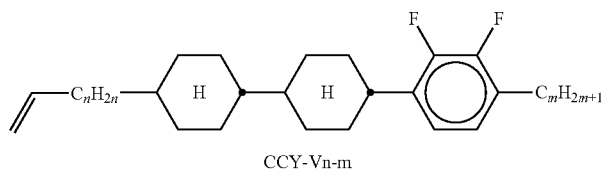
CCY-Vn-m
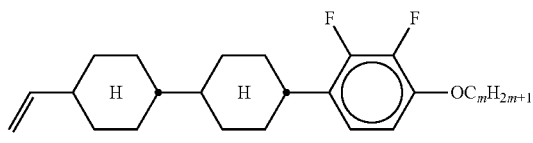
CCY-V-Om
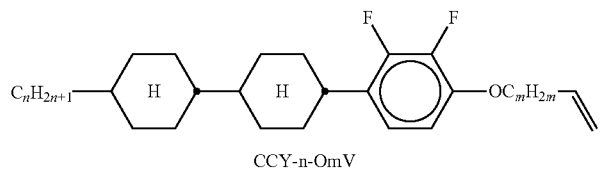
CCY-n-OmV
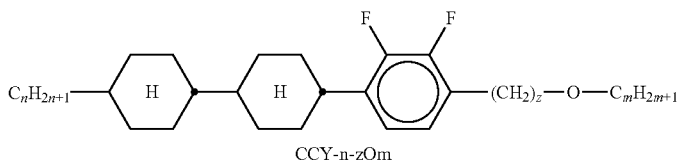
CCY-n-zOm
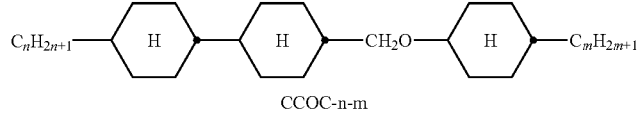
CCOC-n-m
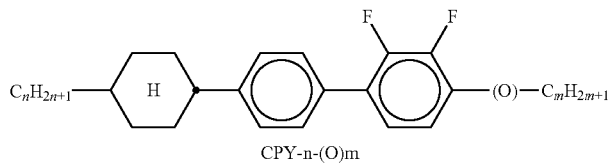
CPY-n-(O)m TABLE B-continued
n, m, z, independently of one another, preferably denote 1, 2, 3, 4, 5 or 6.
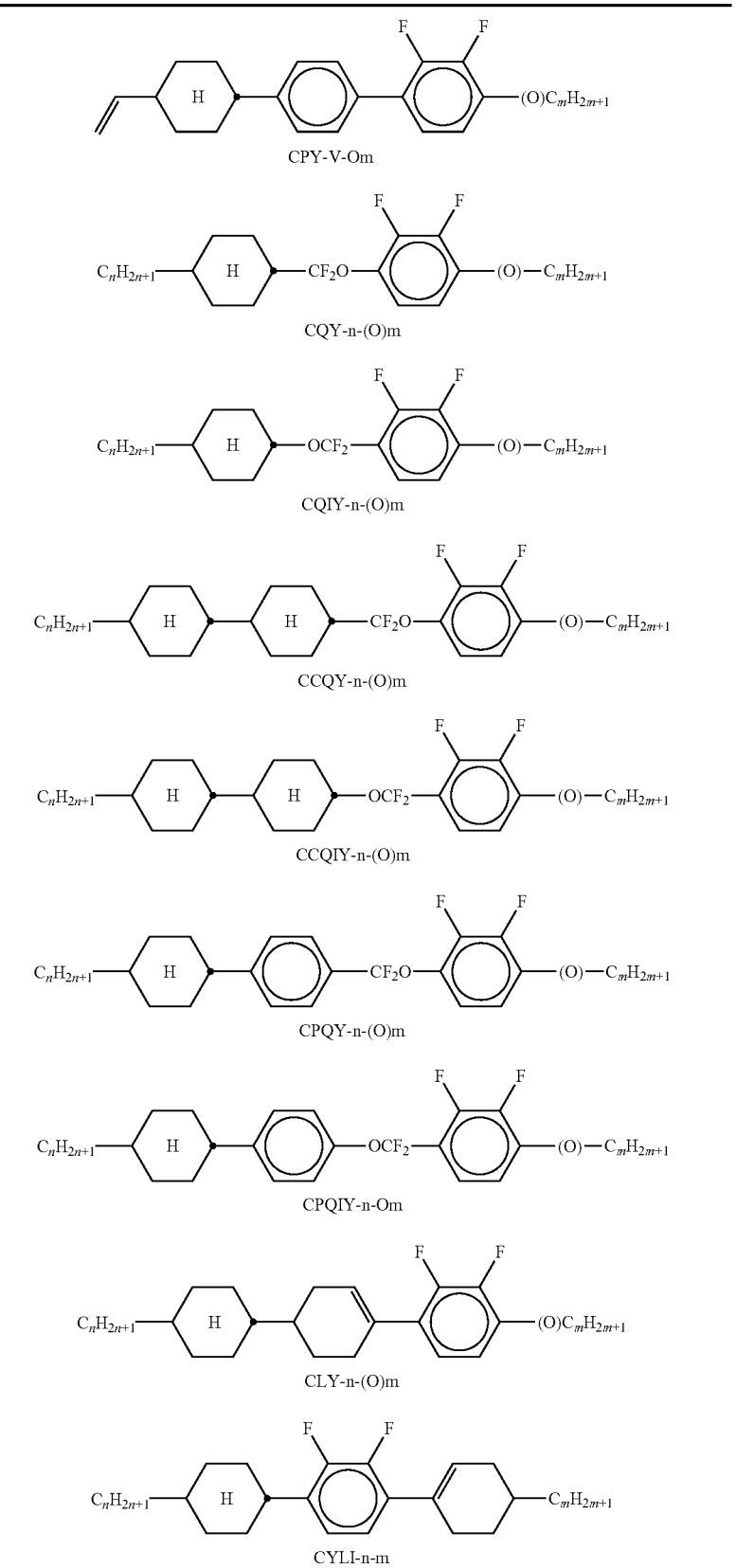

TABLE B-continued
n, m, z, independently of one another, preferably denote 1, 2, 3, 4, 5 or 6.
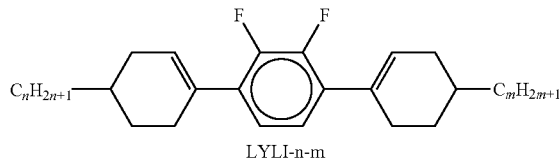
LYLI-n-m
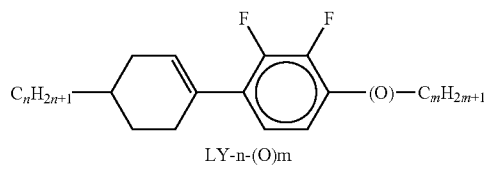
LY-n-(O)m
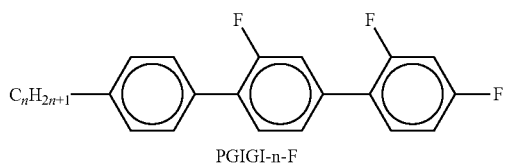
PGIGI-n-F
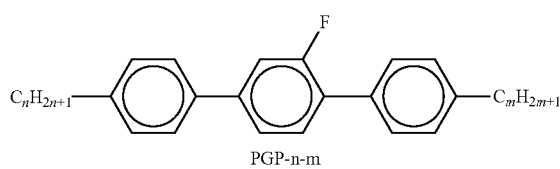
PGP-n-m
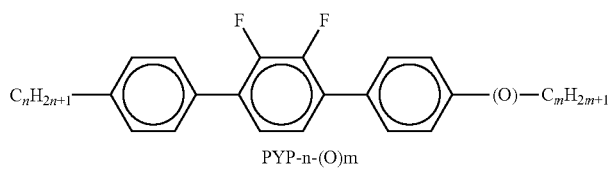
PYP-n-(O)m
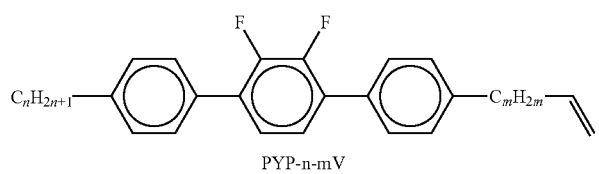
PYP-n-mV
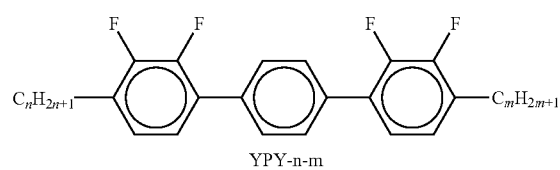
YPY-n-m
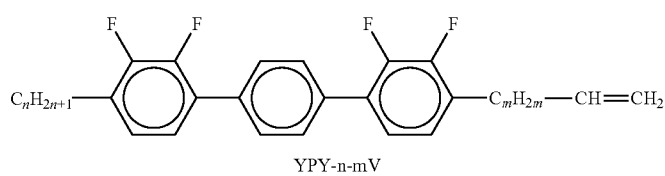
YPY-n-mV
BCH-nm TABLE B-continued
n, m, z, independently of one another, preferably denote 1, 2, 3, 4, 5 or 6.
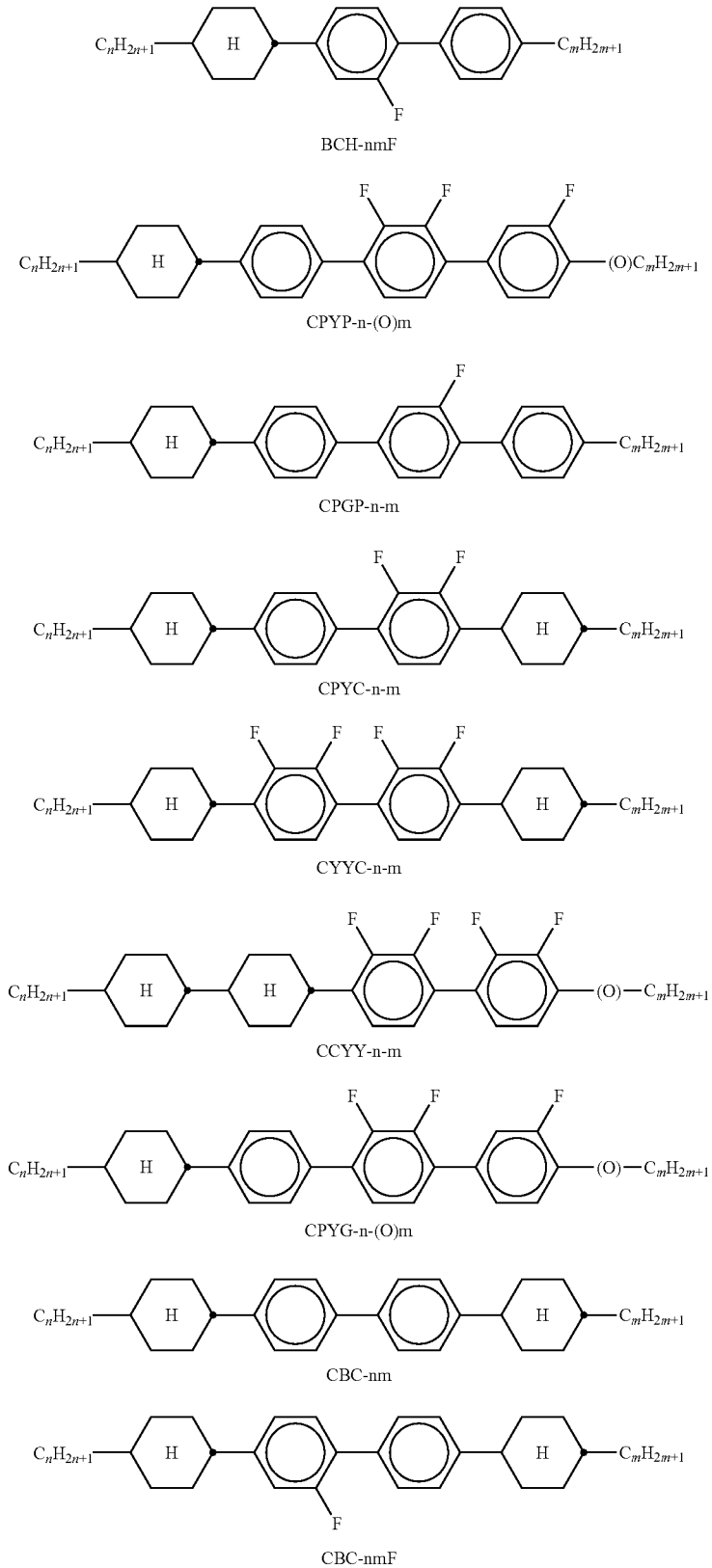

TABLE B-continued
n, m, z, independently of one another, preferably denote 1, 2, 3, 4, 5 or 6.
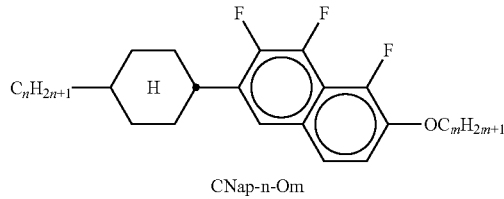
CNap-n-Om
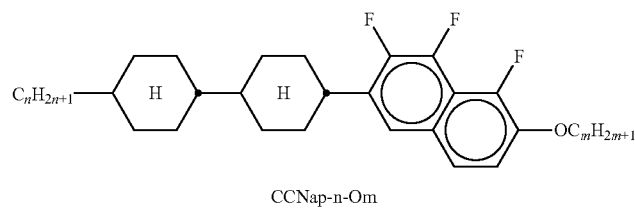
CCNap-n-Om
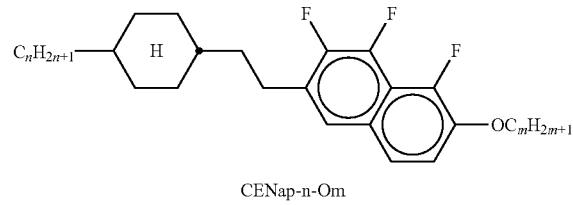
CENap-n-Om
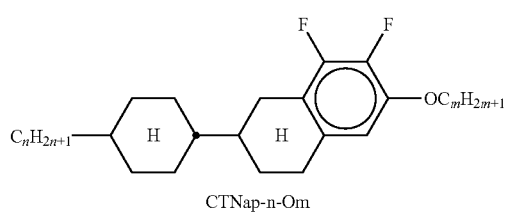
CTNap-n-Om
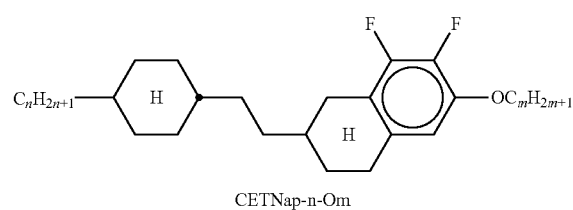
CETNap-n-Om
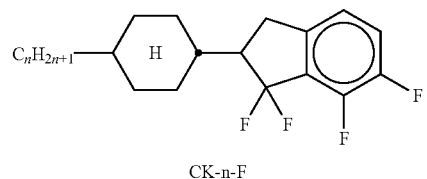
CK-n-F
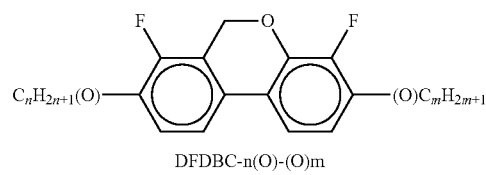
DFDBC-n(O)-(O)m TABLE B-continued
n, m, z, independently of one another, preferably denote 1, 2, 3, 4, 5 or 6.
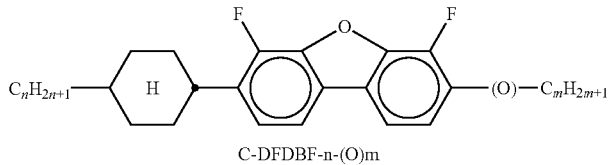
C-DFDBF-n-(O)m
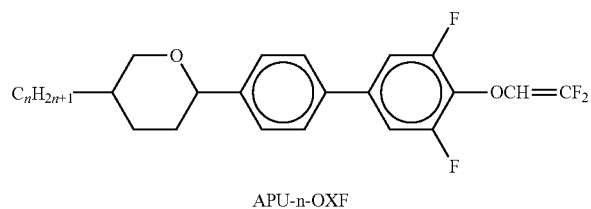
APU-n-OXF
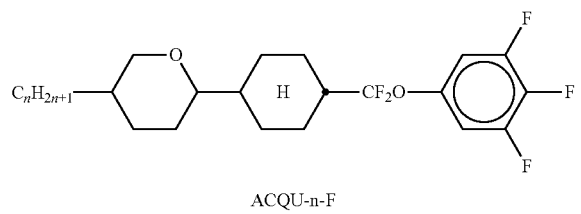
ACQU-n-F
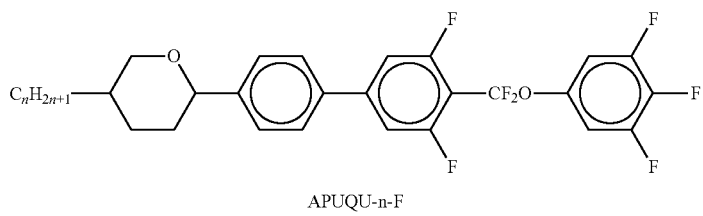
APUQU-n-F
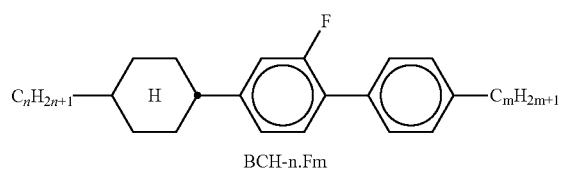
BCH-n.Fm
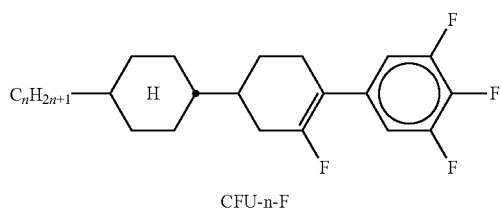
CFU-n-F
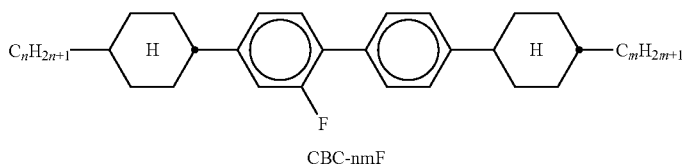
CBC-nmF
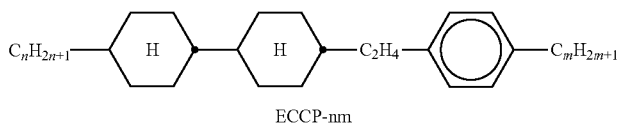
ECCP-nm TABLE B-continued
n, m, z, independently of one another, preferably denote 1, 2, 3, 4, 5 or 6.
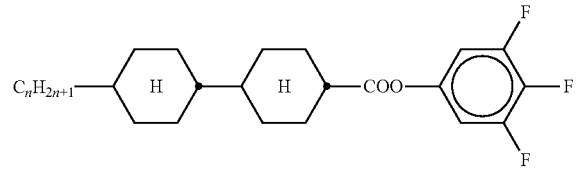
CCZU-n-F
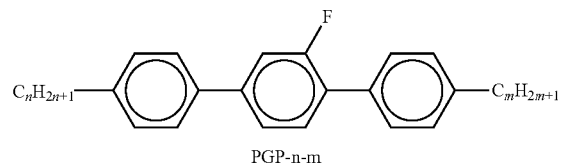
PGP-n-m
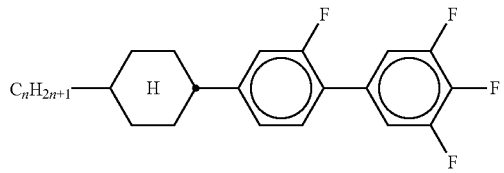
CGU-n-F
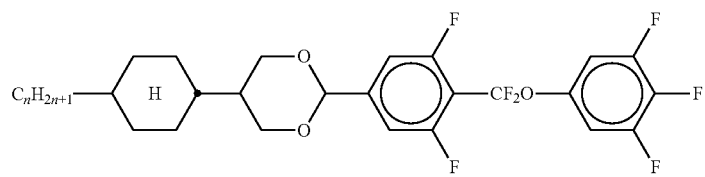
CDUQU-n-F
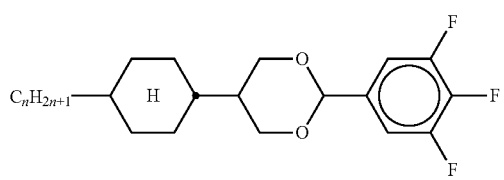
CDU-n-F
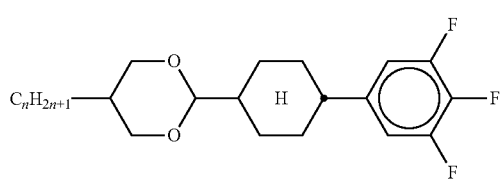
DCU-n-F
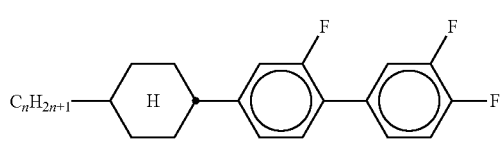
CGG-n-F TABLE B-continued
n, m, z, independently of one another, preferably denote 1, 2, 3, 4, 5 or 6.
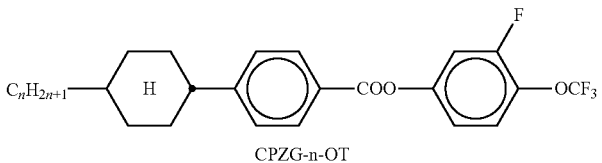
CPZG-n-OT
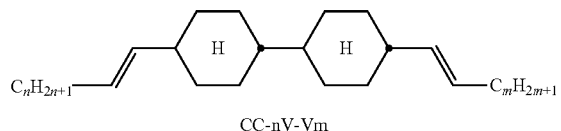
CC-nV-Vm
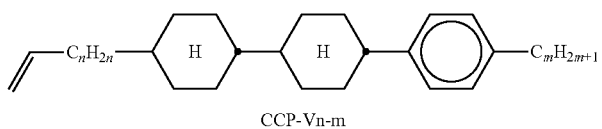
CCP-Vn-m
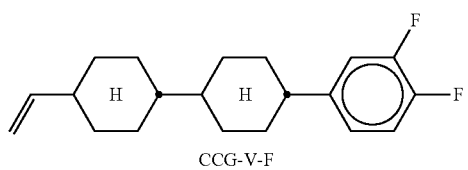
CCG-V-F
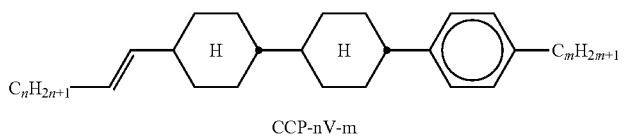
CCP-nV-m
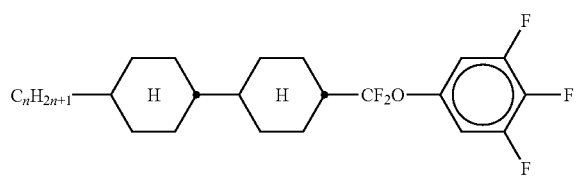
CCQU-n-F
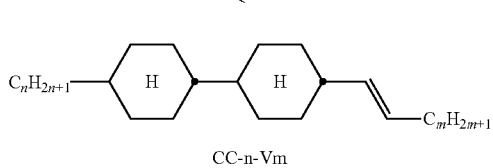
CC-n-Vm
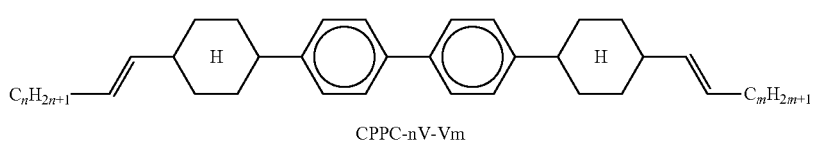
CPPC-nV-Vm
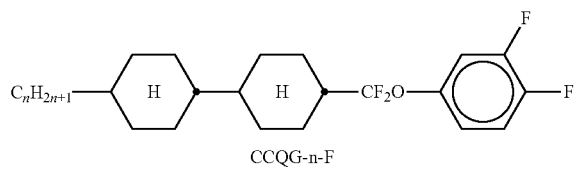
CCQG-n-F TABLE B-continued
n, m, z, independently of one another, preferably denote 1, 2, 3, 4, 5 or 6.
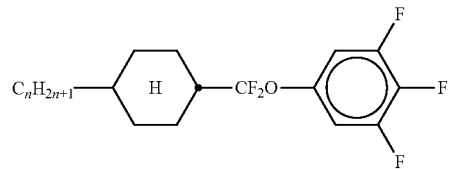
CQU-n-F
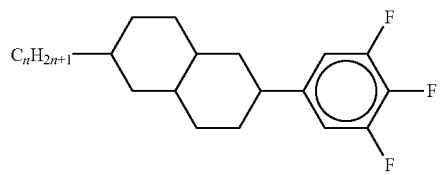
Dec-U-n-F
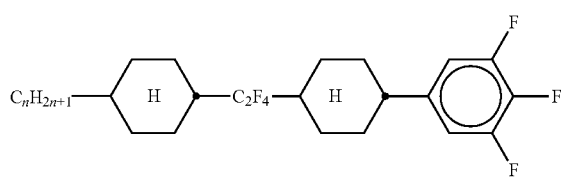
CWCU-n-F
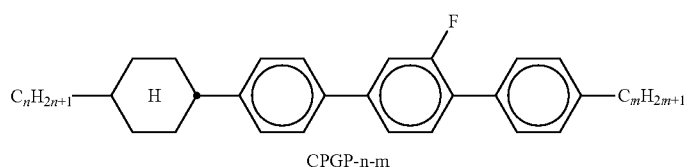
CPGP-n-m
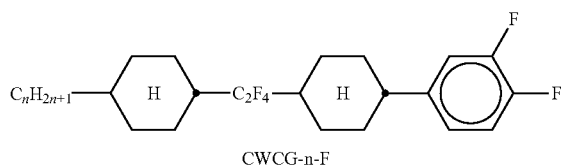
CWCG-n-F
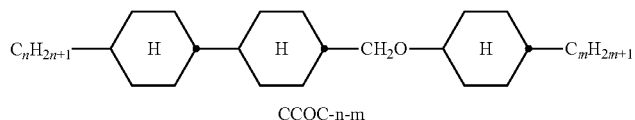
CCOC-n-m
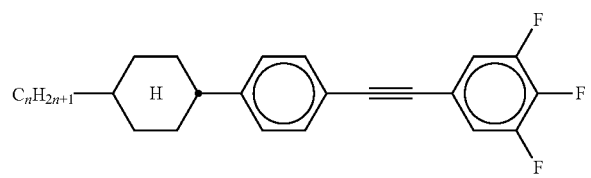
CPTU-n-F
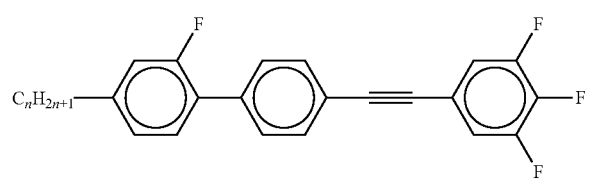
GPTU-n-F TABLE B-continued
n, m, z, independently of one another, preferably denote 1, 2, 3, 4, 5 or 6.
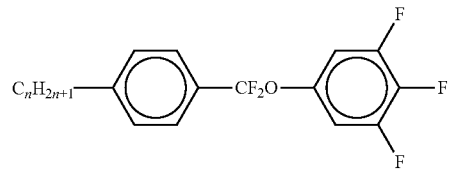
PQU-n-F
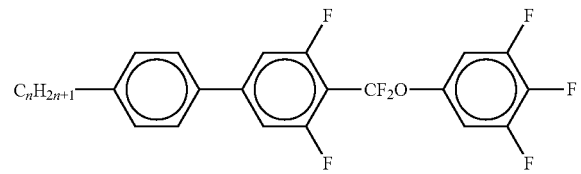
PUQU-n-F
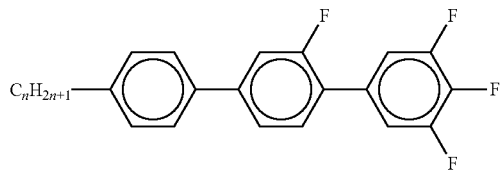
PGU-n-F
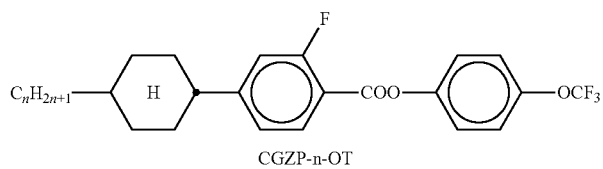
CGZP-n-OT
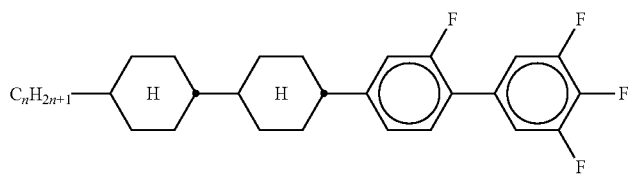
CCGU-n-F
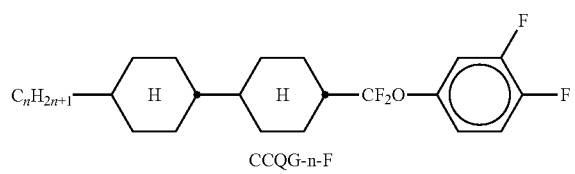
CCQG-n-F
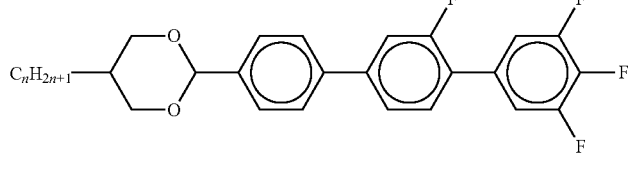
DPGU-n-F TABLE B-continued
n, m, z, independently of one another, preferably denote 1, 2, 3, 4, 5 or 6.
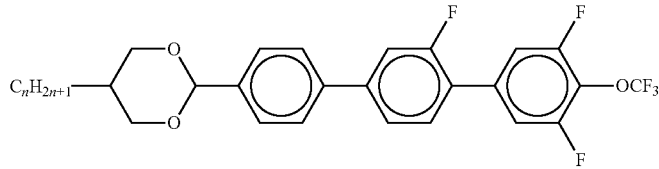
DPGU-n-OT
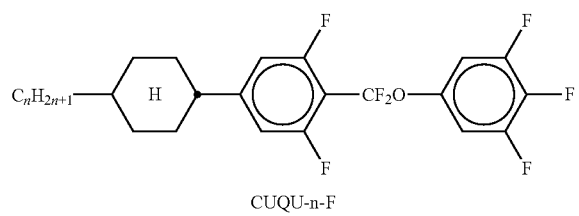
CUQU-n-F
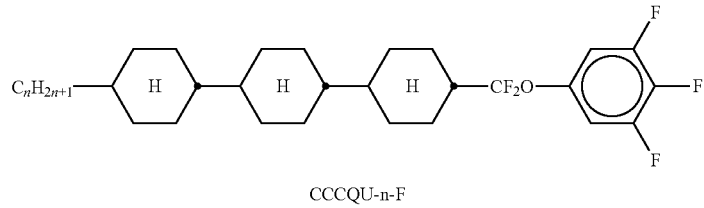
CCCQU-n-F
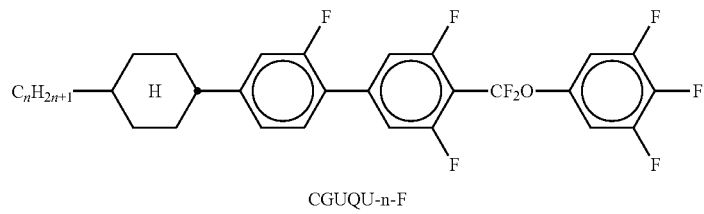
CGUQU-n-F
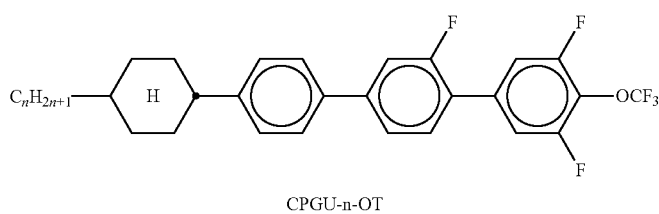
CPGU-n-OT
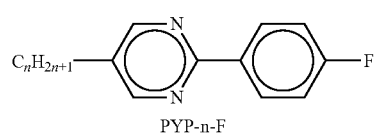
PYP-n-F
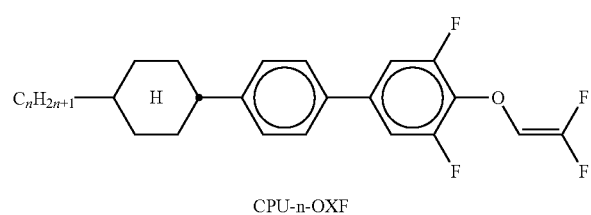
CPU-n-OXF TABLE B-continued
n, m, z, independently of one another, preferably denote 1, 2, 3, 4, 5 or 6.
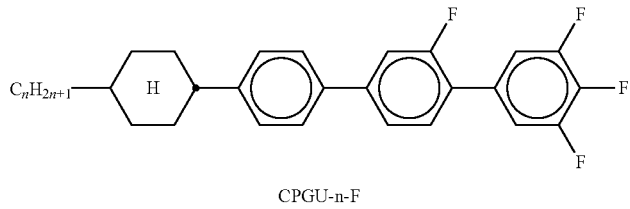
CPGU-n-F
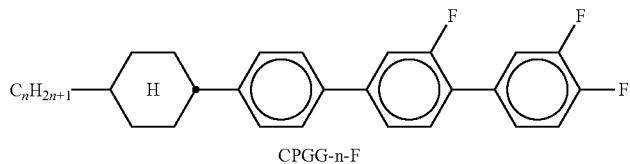
CPGG-n-F
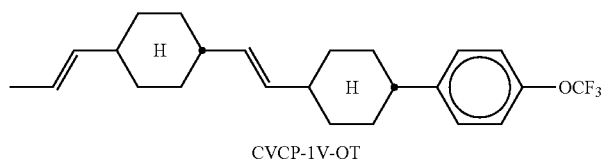
CVCP-1V-OT
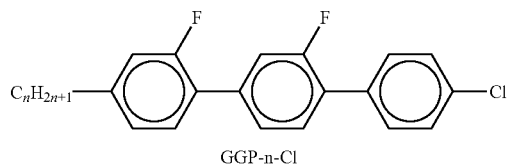
GGP-n-Cl
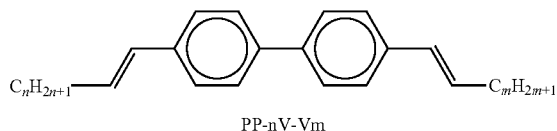
PP-nV-Vm
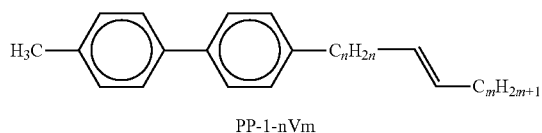
PP-1-nVm
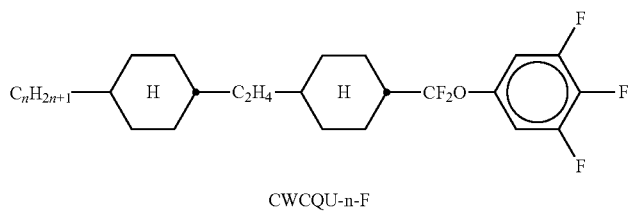
CWCQU-n-F
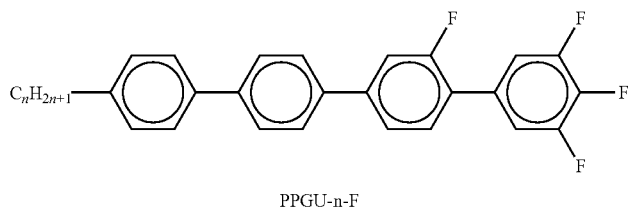
PPGU-n-F TABLE B-continued
n, m, z, independently of one another, preferably denote 1, 2, 3, 4, 5 or 6.
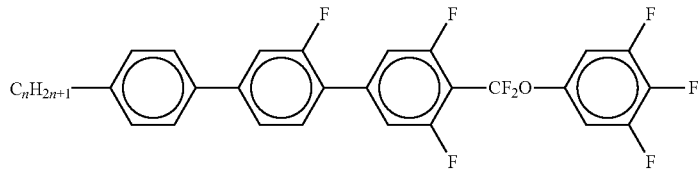
PGUQU-n-F
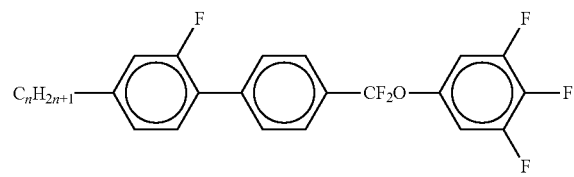
GPQU-n-F
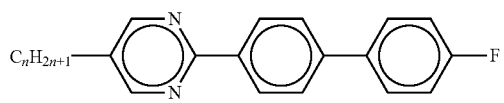
MPP-n-F
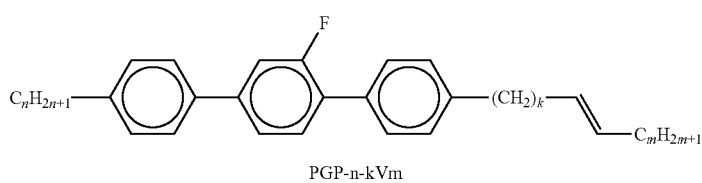
PGP-n-kVm
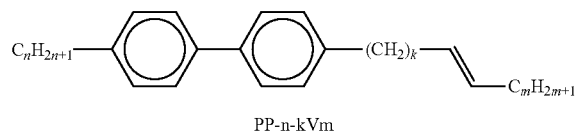
PP-n-kVm
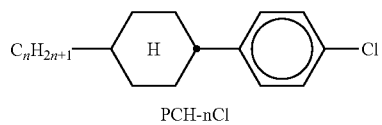
PCH-nCl
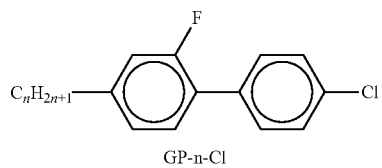
GP-n-Cl
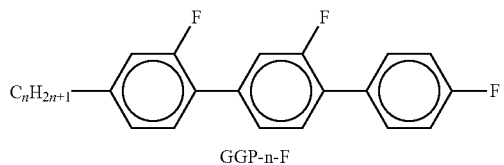
GGP-n-F
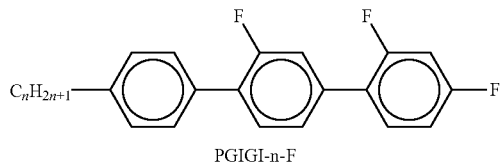
PGIGI-n-F TABLE B-continued n, m, z, independently of one another, preferably denote 1, 2, 3, 4, 5 or 6.

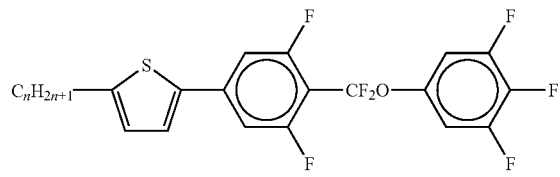

SUQU-n-F

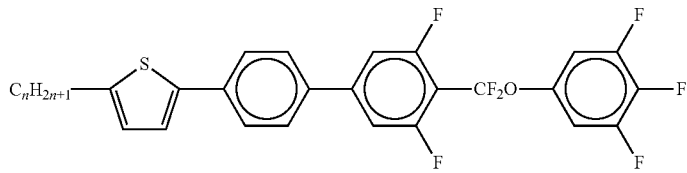

SPUQU-n-F

In a preferred embodiment of the present invention, the LC media according to the invention comprise one or more compounds selected from the group consisting of compounds from Tables A and B.

TABLE C

Table C indicates possible chiral dopants which can be added to the LC media according to the invention.

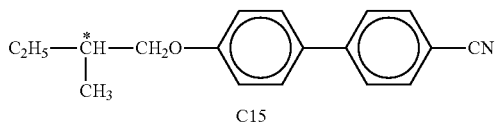

C15

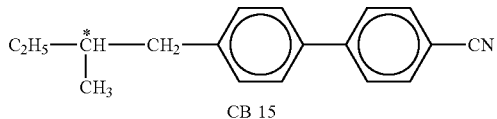

CB 15

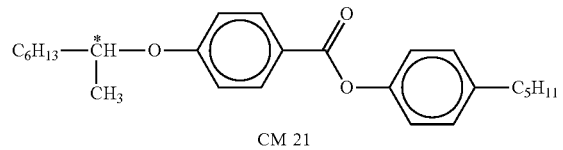

CM 21

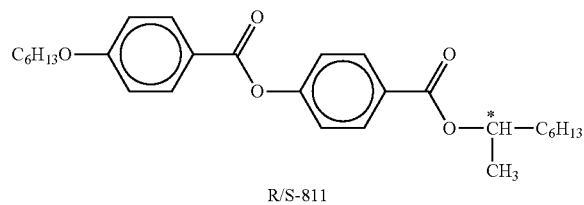

R/S-811

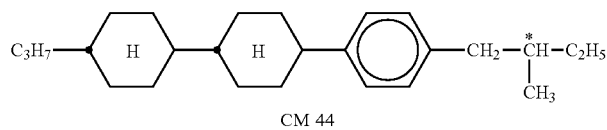

CM 44

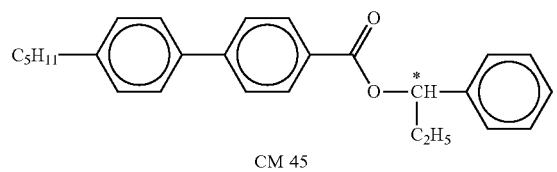

CM 45

TABLE C-continued
Table C indicates possible chiral dopants which can be added to the LC media according to the invention.
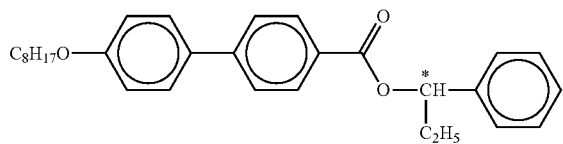
CM 47
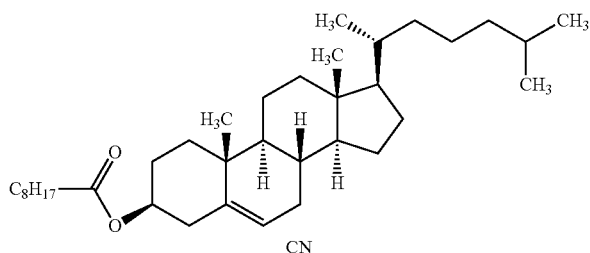
CN
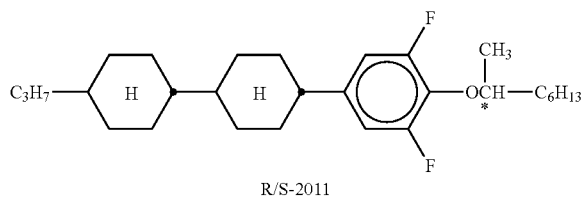
R/S-2011
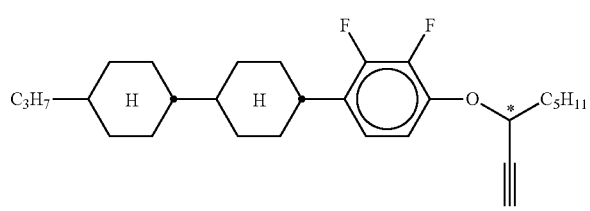
R/S-3011
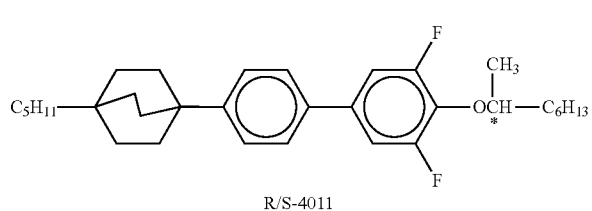
R/S-4011
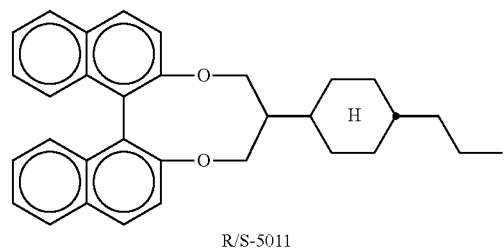
R/S-5011
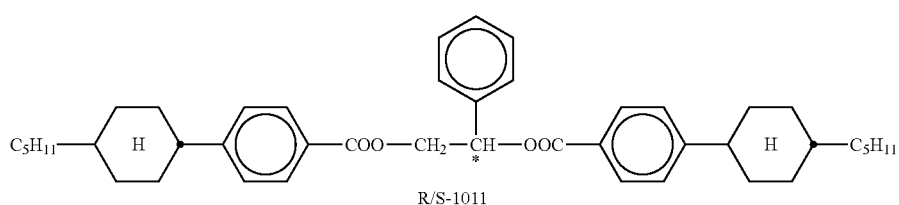
R/S-1011

The LC media optionally comprise 0 to 10% by weight, in particular 0.01 to 5% by weight, particularly preferably 0.1 to 3% by weight, of dopants, preferably selected from the group consisting of compounds from Table C.

TABLE D

Table D indicates possible stabilisers which can be added to the LC media according to the invention.

(n here denotes an integer from 1 to 12, preferably 1, 2, 3, 4, 5, 6, 7 or 8, terminal methyl groups are not shown).

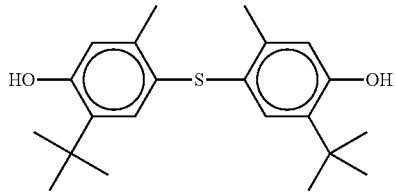

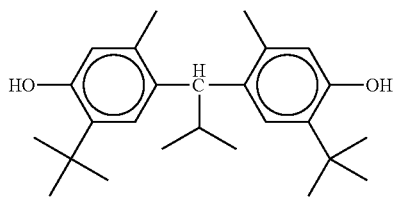

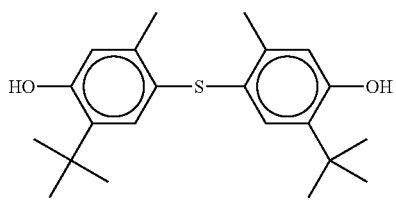

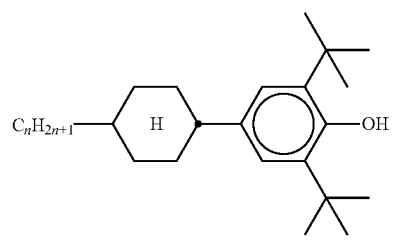

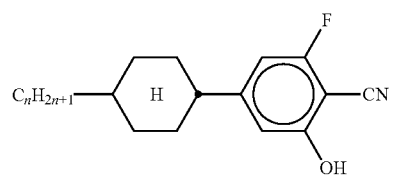

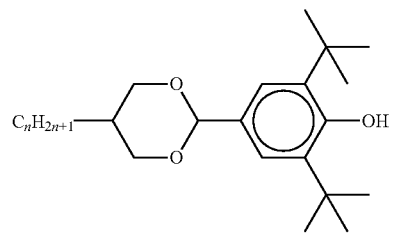

TABLE D-continued
Table D indicates possible stabilisers which can be added to the LC media according to the invention.
(n here denotes an integer from 1 to 12, preferably 1, 2, 3, 4, 5, 6, 7 or 8, terminal methyl groups are not shown).
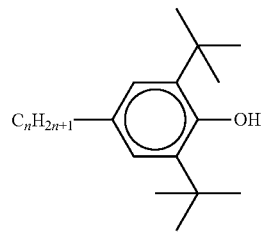
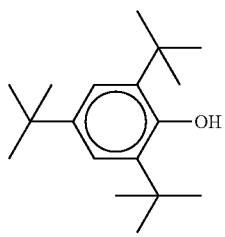
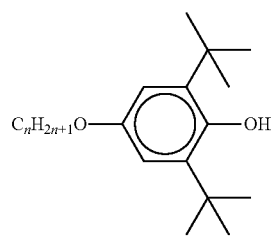
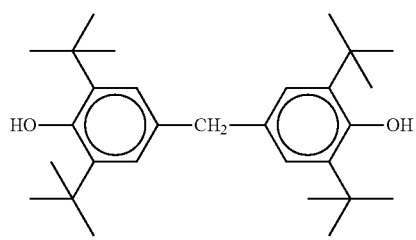
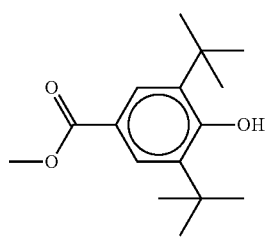
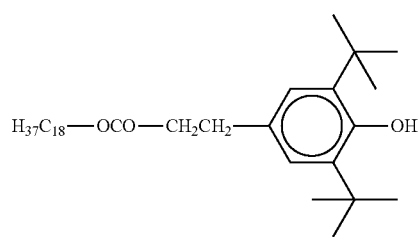

TABLE D-continued
Table D indicates possible stabilisers which can be added to the LC media according to the invention.
(n here denotes an integer from 1 to 12, preferably 1, 2, 3, 4, 5, 6, 7 or 8, terminal methyl groups are not shown).
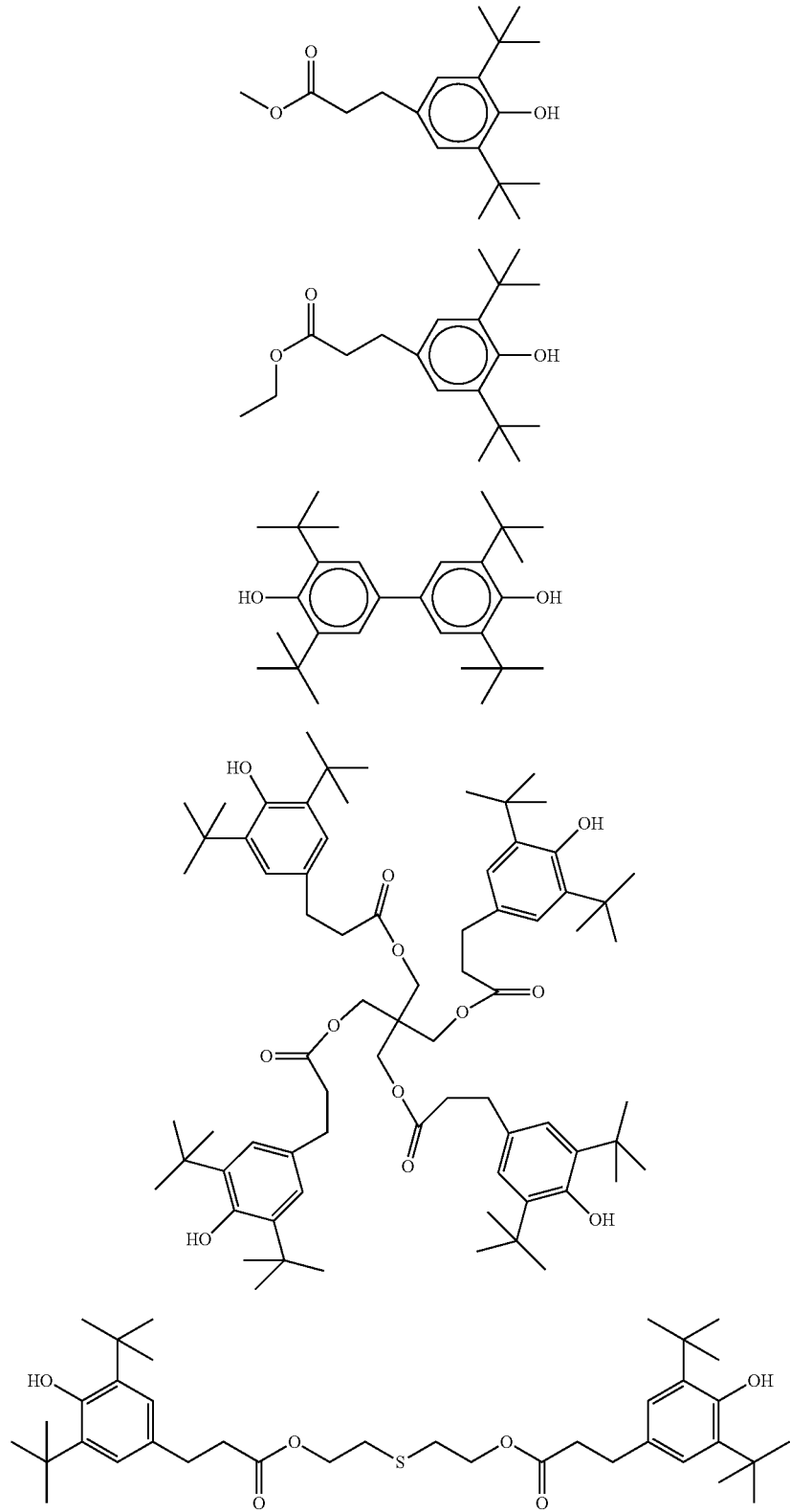

TABLE D-continued
Table D indicates possible stabilisers which can be added to the LC media according to the invention.
(n here denotes an integer from 1 to 12, preferably 1, 2, 3, 4, 5, 6, 7 or 8, terminal methyl groups are not shown).
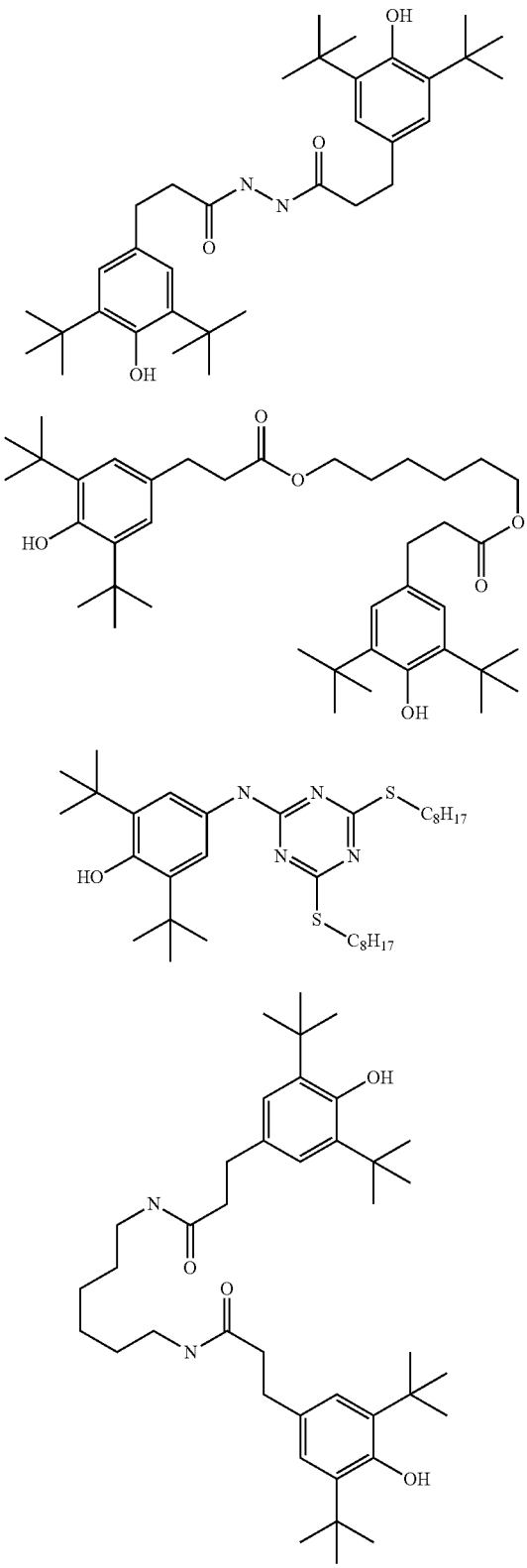

TABLE D-continued
Table D indicates possible stabilisers which can be added to the LC media according to the invention.
(n here denotes an integer from 1 to 12, preferably 1, 2, 3, 4, 5, 6, 7 or 8, terminal methyl groups are not shown).
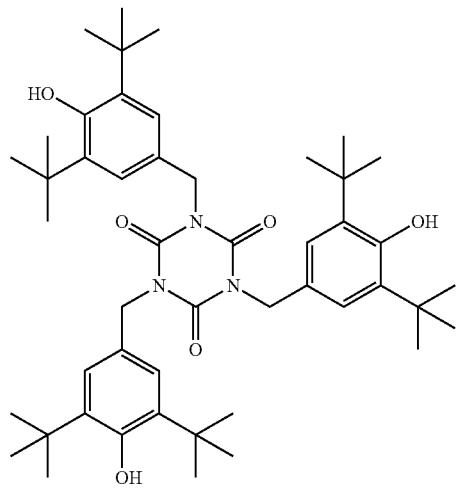 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
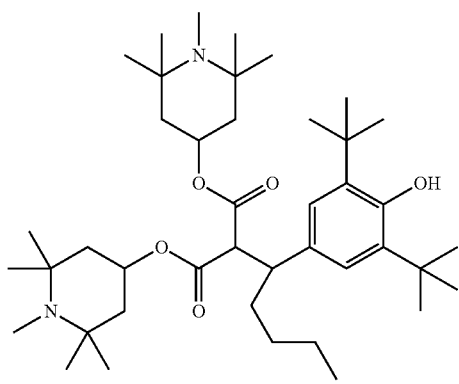 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
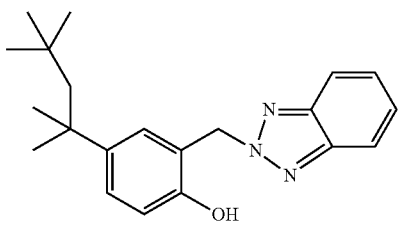 [SMILES: CC(C)(C)CC(C)(C)c1ccc(O)c(Cn2nc3ccccc3n2)c1]
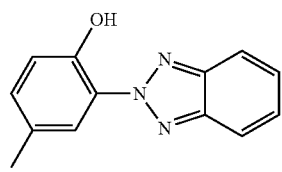 [SMILES: Cc1ccc(O)c(-n2nc3ccccc3n2)c1]
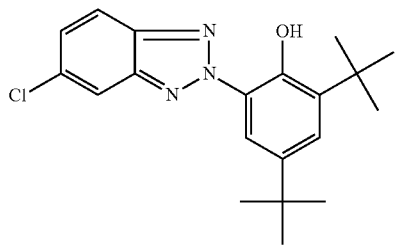 [SMILES: CC(C)(C)c1cc(-n2nc3ccc(Cl)cc3n2)c(O)c(C(C)(C)C)c1]

TABLE D-continued
Table D indicates possible stabilisers which can be added to the LC media according to the invention.
(n here denotes an integer from 1 to 12, preferably 1, 2, 3, 4, 5, 6, 7 or 8, terminal methyl groups are not shown).
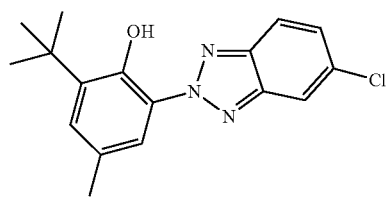 [SMILES: Cc1cc(-n2nc3ccc(Cl)cc3n2)c(O)c(C(C)(C)C)c1]
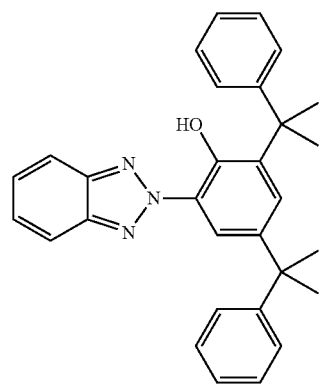 [SMILES: CC(C)(c1ccccc1)c1cc(-n2nc3ccccc3n2)c(O)c(C(C)(C)c2ccccc2)c1]
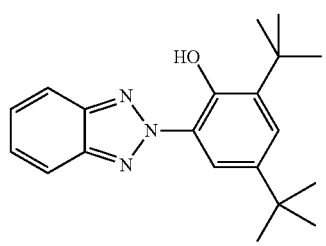 [SMILES: CC(C)(C)c1cc(-n2nc3ccccc3n2)c(O)c(C(C)(C)C)c1]
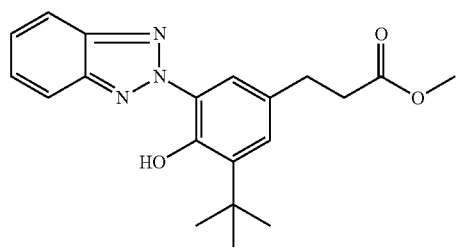 [SMILES: COC(=O)CCc1cc(-n2nc3ccccc3n2)c(O)c(C(C)(C)C)c1]
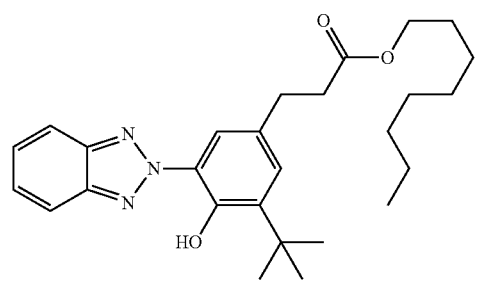 [SMILES: CCCCCCCCOC(=O)CCc1cc(-n2nc3ccccc3n2)c(O)c(C(C)(C)C)c1]

TABLE D-continued
Table D indicates possible stabilisers which can be added to the LC media according to the invention.
(n here denotes an integer from 1 to 12, preferably 1, 2, 3, 4, 5, 6, 7 or 8, terminal methyl groups are not shown).
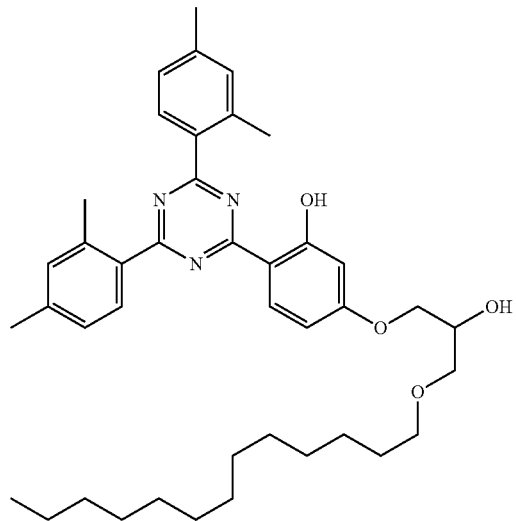 [SMILES: CCCCCCCCCCCCCOCC(O)COc1ccc(-c2nc(-c3ccc(C)cc3C)nc(-c3ccc(C)cc3C)n2)c(O)c1]
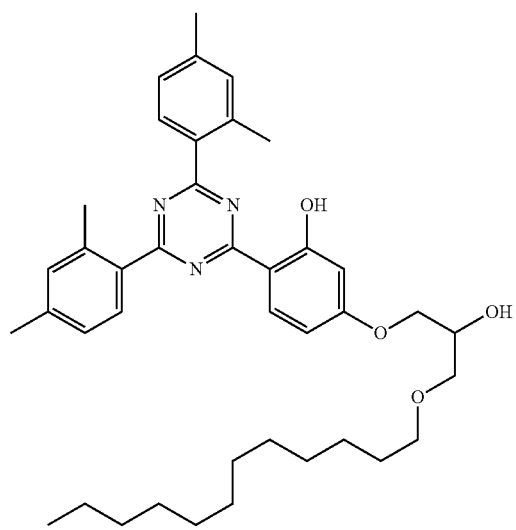 [SMILES: CCCCCCCCCCCCOCC(O)COc1ccc(-c2nc(-c3ccc(C)cc3C)nc(-c3ccc(C)cc3C)n2)c(O)c1]
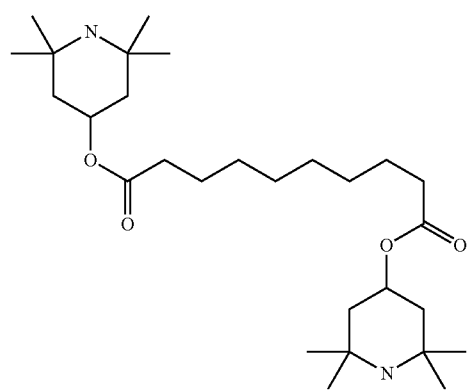

TABLE D-continued

Table D indicates possible stabilisers which can be added to the LC media according to the invention.
(n here denotes an integer from 1 to 12, preferably 1, 2, 3, 4, 5, 6, 7 or 8, terminal methyl groups are not shown).

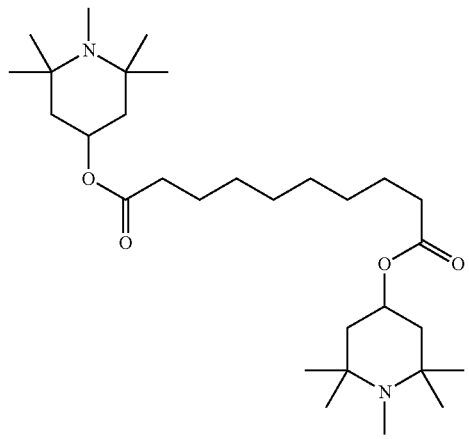

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table D.

TABLE E

Table E shows illustrative compounds which can be used in the LC media in accordance with the present invention, preferably as reactive compounds.

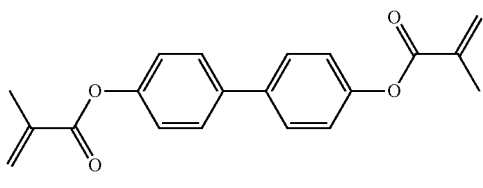 [SMILES: C=C(C)C(=O)Oc1ccc(-c2ccc(OC(=O)C(=C)C)cc2)cc1]

RM-1

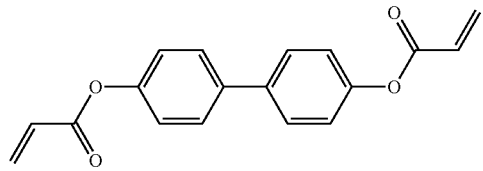 [SMILES: C=CC(=O)Oc1ccc(-c2ccc(OC(=O)C=C)cc2)cc1]

RM-2

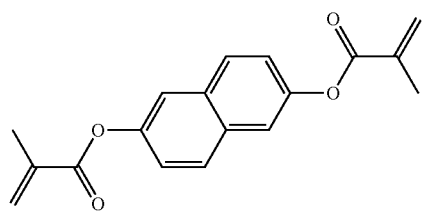 [SMILES: C=C(C)C(=O)Oc1ccc2cc(OC(=O)C(=C)C)ccc2c1]

RM-3

TABLE E-continued
Table E shows illustrative compounds which can be used in the LC media in accordance with the present invention, preferably as reactive compounds.
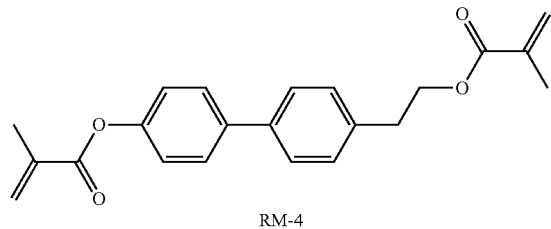
RM-4
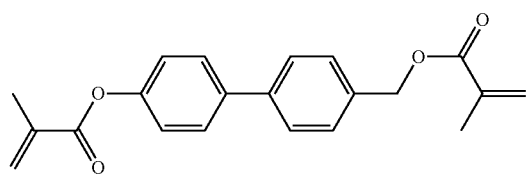 [SMILES: C=C(C)C(=O)OCc1ccc(-c2ccc(OC(=O)C(=C)C)cc2)cc1]
RM-5
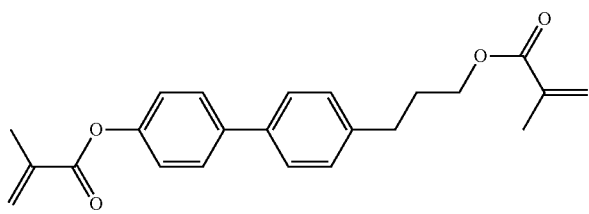 [SMILES: C=C(C)C(=O)OCCCc1ccc(-c2ccc(OC(=O)C(=C)C)cc2)cc1]
RM-6
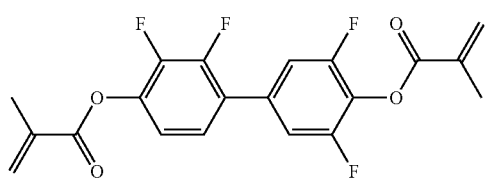 [SMILES: C=C(C)C(=O)Oc1ccc(-c2cc(F)c(OC(=O)C(=C)C)c(F)c2)c(F)c1F]
RM-7
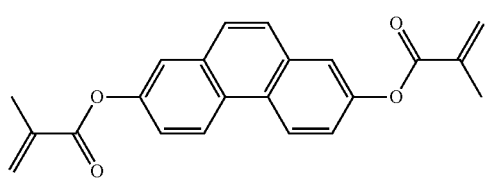 [SMILES: C=C(C)C(=O)Oc1ccc2c(ccc3cc(OC(=O)C(=C)C)ccc32)c1]
RM-8
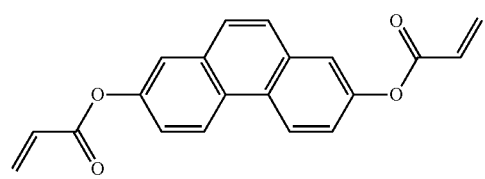 [SMILES: C=CC(=O)Oc1ccc2c(ccc3cc(OC(=O)C=C)ccc32)c1]
RM-9
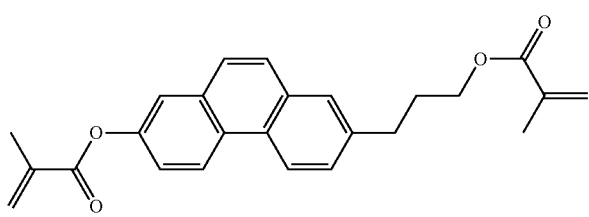 [SMILES: C=C(C)C(=O)OCCCc1ccc2c(ccc3cc(OC(=O)C(=C)C)ccc32)c1]
RM-10

TABLE E-continued
Table E shows illustrative compounds which can be used in the LC media in accordance with the present invention, preferably as reactive compounds.
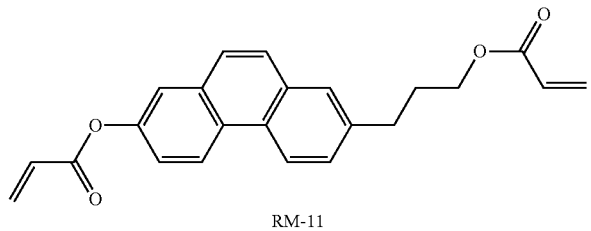
RM-11
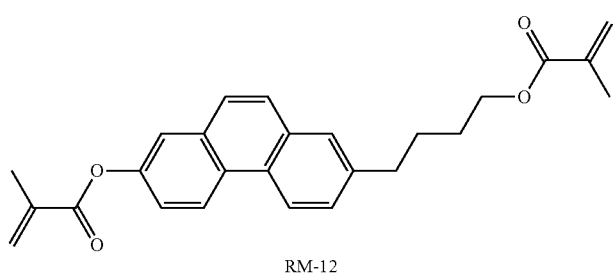
RM-12
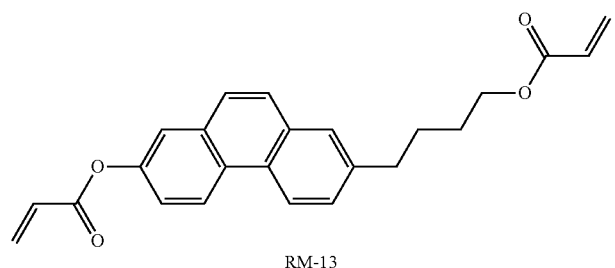
RM-13
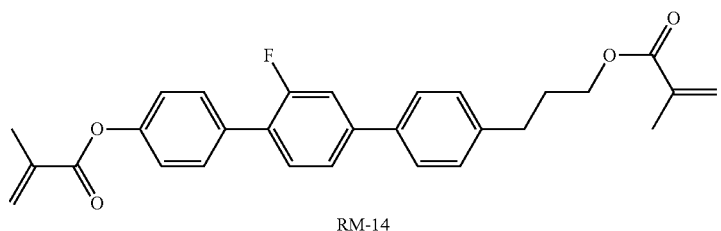
RM-14
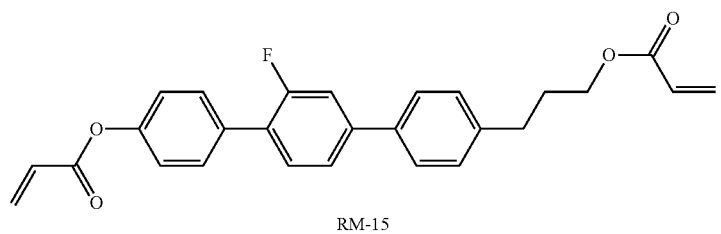
RM-15
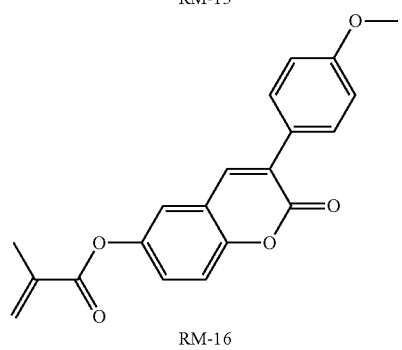
RM-16

TABLE E-continued
Table E shows illustrative compounds which can be used in the LC media in accordance with the present invention, preferably as reactive compounds.
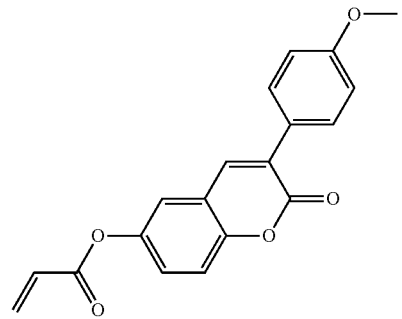 [SMILES: C=CC(=O)Oc1ccc2oc(=O)c(-c3ccc(OC)cc3)cc2c1]
RM-17
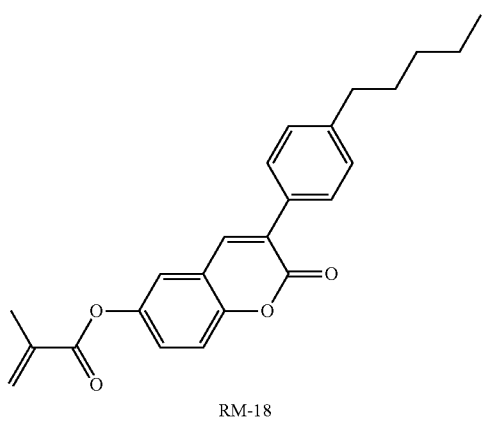
RM-18
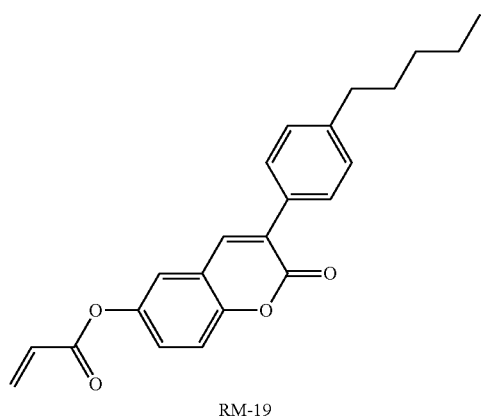
RM-19
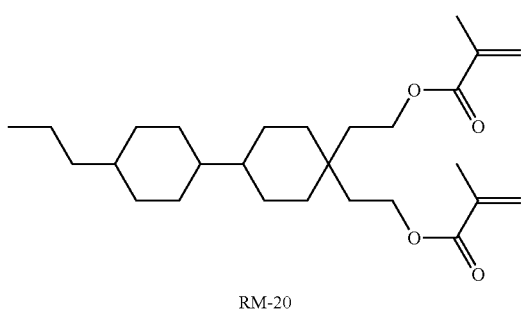
RM-20

TABLE E-continued
Table E shows illustrative compounds which can be used in the LC media in accordance with the present invention, preferably as reactive compounds.
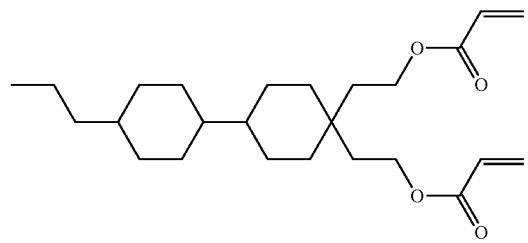 [SMILES: C=CC(=O)OCCC1(CCOC(=O)C=C)CCC(C2CCC(CCC)CC2)CC1]
RM-21
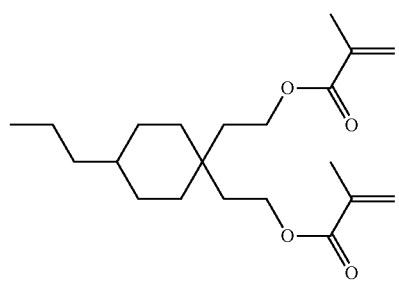 [SMILES: C=C(C)C(=O)OCCC1(CCOC(=O)C(=C)C)CCC(CCC)CC1]
RM-22
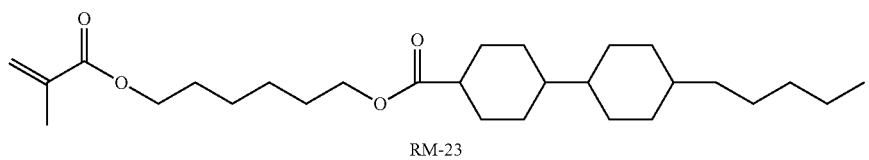
RM-23
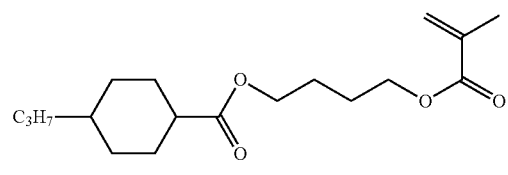
RM-24
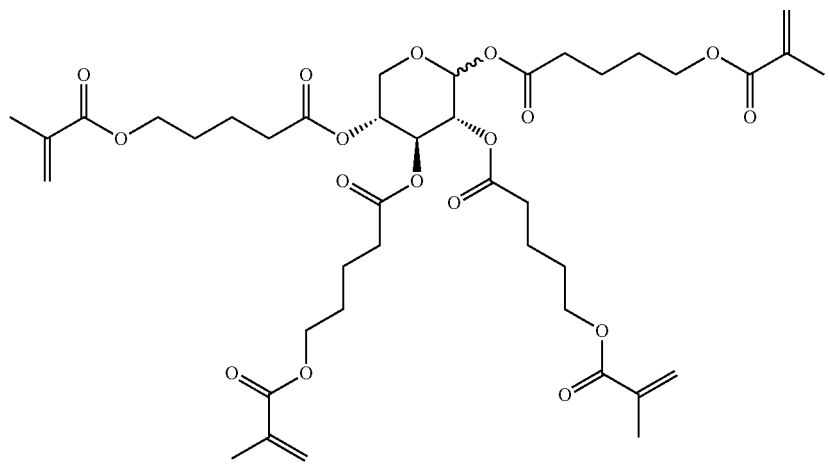 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-25

TABLE E-continued

Table E shows illustrative compounds which can be used in the LC media
in accordance with the present invention, preferably as reactive compounds.

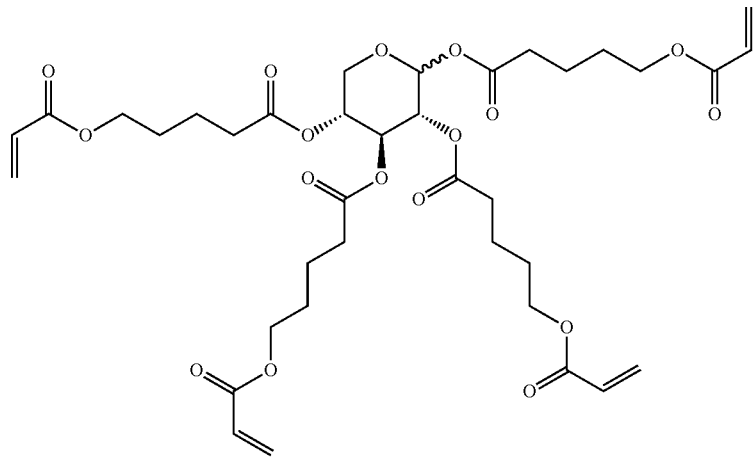 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]

RM-26

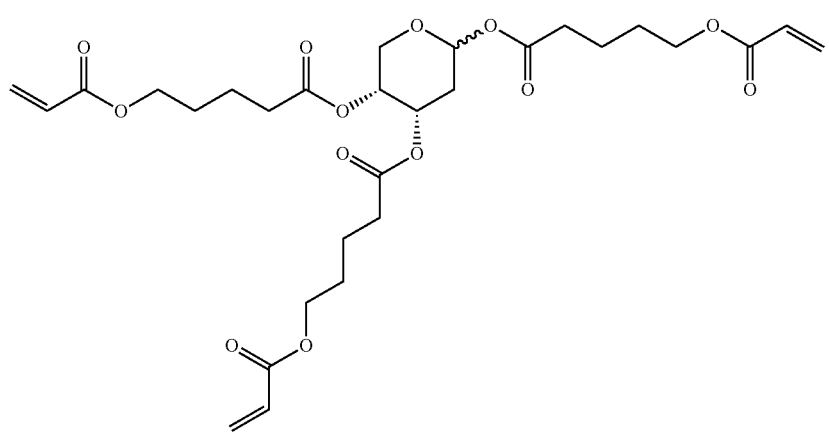 [SMILES: C=CC(=O)OCCCCC(=O)OC1C[C@H](OC(=O)CCCCOC(=O)C=C)[C@H](OC(=O)CCCCOC(=O)C=C)CO1]

RM-27

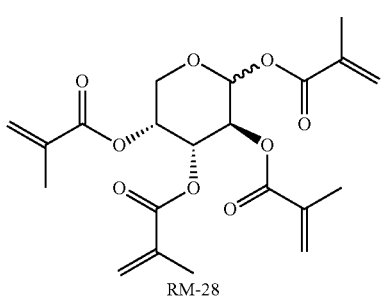

RM-28

In a preferred embodiment of the present invention, the mesogenic media comprise one or more compounds selected from the group of the compounds from Table E.

In the present application, the term "compounds", also written as "compound(s)", denotes, unless explicitly indicated otherwise, both one and also a plurality of compounds. Conversely, the term "compound" generally also encompasses a plurality of compounds, if this is possible according to the definition and is not indicated otherwise. The same applies to the terms LC media and LC medium. The term "component" in each case encompasses one or more substances, compounds and/or particles.

In addition, the following abbreviations and symbols are used:

$n_e$ extraordinary refractive index at 20° C. and 589 nm,
$n_o$ ordinary refractive index at 20° C. and 589 nm,
Δn optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
Δε dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole comprising all solid or liquid-crystalline components, without solvents.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The polymerisable compounds are polymerised in the display or test cell by irradiation with UVA light (usually 365 nm) of defined intensity for a pre-specified time, with a voltage optionally being applied simultaneously to the display (usually 10 to 30 V alternating current, 1 kHz). In the examples, unless indicated otherwise, a 100 mW/cm² mercury vapour lamp is used, and the intensity is measured using a standard UV meter (Ushio UNI meter) fitted with a 320 nm band-pass filter.

The following examples explain the present invention without intending to restrict it in any way. However, the physical properties make clear to the person skilled in the art what properties can be achieved and in what ranges they can be modified. In particular, the combination of the various properties which can preferably be achieved is thus well defined for the person skilled in the art.

Further combinations of the embodiments and variants of the invention in accordance with the description also arise from the claims.

EXAMPLES

The compounds employed, if not commercially available, are synthesised by standard laboratory procedures. The LC media originate from Merck KGaA, Germany.

SYNTHESIS EXAMPLES

Example 1: N-[2-(2'-fluoro-4-propyl-[1,1';4',1"]terphenyl-4"-yloxy)ethyl]-ethane-1,2-diamine 1.1 4-Bromo-3-fluoro-4'-methoxybiphenyl

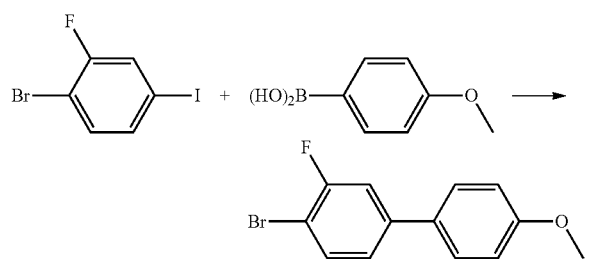

49.0 g (0.163 mol) of 1-bromo-2-fluoro-4-iodobenzene and 24.7 g (0.163 mol) of 4-methoxybenzeneboronic acid are dissolved in a mixture of 325 ml of toluene, 165 ml of water and 165 ml of ethanol, and, after addition of 1.9 g (1.64 mmol) of tetrakis(triphenylphosphine)palladium and 34.9 g (0.33 mol) of sodium carbonate, the mixture is heated under reflux overnight. The org. phase is separated off, dried over sodium sulfate and evaporated. The residue is filtered through silica gel with heptane/toluene (1:1), and the crude product is recrystallised from ethanol, giving 4-bromo-3-fluoro-4'-methoxybiphenyl as a colourless solid.

1.2 2'-Fluoro-4"-methoxy-4-propyl-[1,1';4',1"]terphenyl

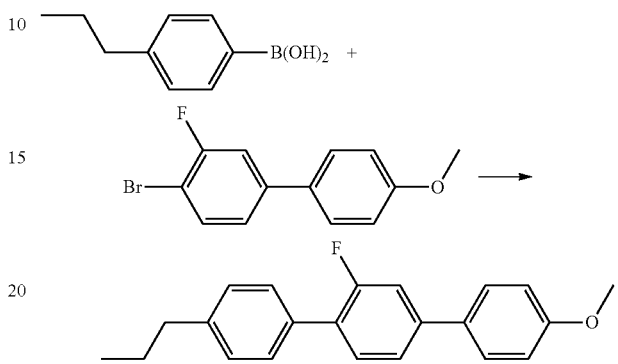

28.0 g (99.0 mmol) of 4-bromo-3-fluoro-4'-methoxybiphenyl, 28.8 g (99.2 mmol) of sodium metaborate octahydrate and 1.4 g (1.96 mmol) of bis(triphenylphosphine)palladium(II) chloride are initially introduced in 75 ml of water and 100 ml of THF, 0.1 ml of hydrazine hydrate is added, and, after addition of a solution of 16.3 g (99.0 mmol) of 4-propylbenzeneboronic acid, the mixture is heated under reflux overnight. The org. phase is separated off, evaporated in vacuo, filtered through silica gel with heptane/toluene, and the crude product is recrystallised from ethanol/toluene (14:1), giving 2'-fluoro-4"-methoxy-4-propyl-[1,1';4',1"]terphenyl as colourless crystals.

1.3 2'-Fluoro-4-propyl-[1,1';4',1"]terphenyl-4"-ol

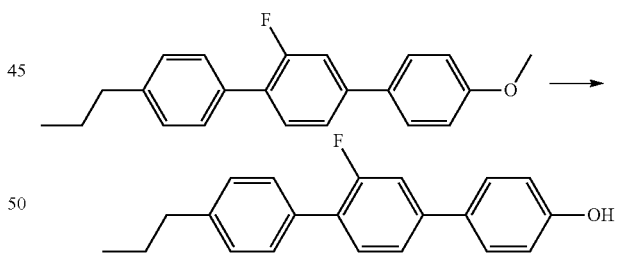

27.2 g (85 mmol) of 2'-fluoro-4"-methoxy-4-propyl-[1,1'; 4',1"]terphenyl are initially introduced in 400 ml of dichloromethane at −10° C., and 100 ml (100 mmol) of a 1 M solution of boron tribromide in hexane are added dropwise. The cooling is removed, and the batch is left to stir at room temp. for 3 h. The batch is subsequently hydrolysed using 200 ml of water with cooling, the precipitated product is dissolved by addition of 800 ml of warm dichloromethane, and the aqueous phase is separated off. The org. phase is washed with water and sat. sodium hydrogencarbonate soln. and dried over sodium sulfate, giving 2'-fluoro-4-propyl-[1, 1';4',1"]terphenyl-4"-ol as a colourless solid, which is employed in the next step without further purification.

1.4 4"-(2-Benzyloxyethoxy)-2'-fluoro-4-propyl-[1,1';4',1"]terphenyl

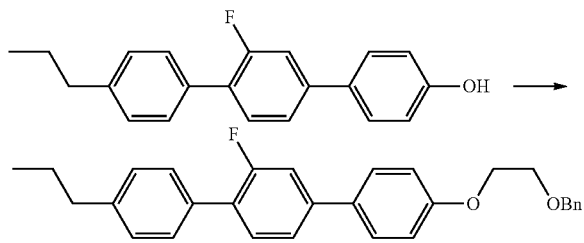

The crude product from step 1.4 is dissolved in 300 ml of ethyl methyl ketone, 23.9 g (173 mmol) of potassium carbonate and 20.0 g (90 mmol) of 2-benzyloxyethyl bromide are added, and the mixture is heated under reflux overnight. The batch is filtered, the filtrate is evaporated, and the residue is filtered through silica gel with toluene. Crystallisation of the crude product from ethanol/toluene (6:1) gives 4"-(2-benzyloxyethoxy)-2'-fluoro-4-propyl-[1,1';4',1"]terphenyl as a colourless solid.

1.5 2-(2'-Fluoro-4-propyl-[1,1';4',1"]terphenyl-4"-yloxy)ethanol

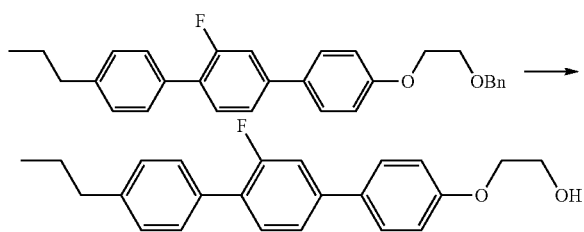

24.5 g (56 mmol) of 4"-(2-benzyloxyethoxy)-2'-fluoro-4-propyl-[1,1';4',1"]terphenyl are hydrogenated to completion on palladium/carbon in THF. The catalyst is filtered off, the filtrate is evaporated, and the crude product is recrystallised from ethanol/toluene (8:1), giving 2-(2'-fluoro-4-propyl-[1,1';4',1"]terphenyl-4"-yloxy)ethanol as colourless needles.

1.6 2-(2'-Fluoro-4-propyl-[1,1';4',1"]terphenyl-4"-yloxy)ethyl toluene-4-sulfonate

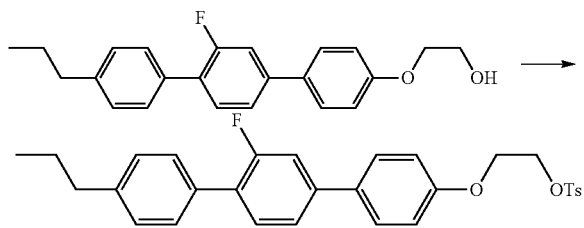

7.0 g (20 mmol) of 2-(2'-fluoro-4-propyl-[1,1';4',1"]terphenyl-4"-yloxy)ethanol are dissolved in 200 ml of dichloromethane, 3.3 ml (40 mmol) of pyridine and 120 mg of DMAP are added, and the mixture is cooled to 10° C. After addition of 4.6 g (24 mmol) of tosyl chloride, the batch is stirred at room temperature overnight, and 500 ml of water are subsequently added. The aqueous phase is separated off and extracted with dichloromethane. The combined org. phases are washed with dil. hydrochloric acid and with sat. sodium hydrogencarbonate solution and dried over sodium sulfate. The solvent is removed in vacuo, and the residue is purified by chromatography on silica gel with toluene, giving 2-(2'-fluoro-4-propyl-[1,1';4',1"]terphenyl-4"-yloxy)ethyl toluene-4-sulfonate as a colourless solid.

1.7 N-[2-(2'-Fluoro-4-propyl-[1,1';4',1"]terphenyl-4"-yloxy)ethyl]ethane-1,2-diamine

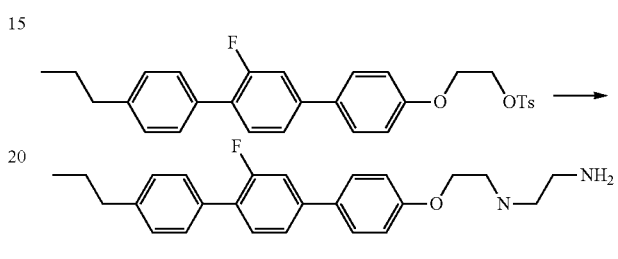

1.00 g (1.98 mmol) of 2-(2'-fluoro-4-propyl-[1,1';4',1"]terphenyl-4"-yloxy)ethyl toluene-4-sulfonate is warmed at 60° C. overnight in 20 ml of ethylenediamine. The amine is subsequently removed in vacuo, and the residue is filtered through silica gel with dichloromethane/methanol/25 percent ammonia (80:20:2), giving N-[2-(2'-fluoro-4-propyl-[1,1';4',1"]terphenyl-4"-yloxy)ethyl]ethane-1,2-diamine as a colourless solid.

$^1$H-NMR (300 MHz, CDCl$_3$)

δ=0.98 ppm (t, J=7.4 Hz, 3H, CH$_3$), 1.56 (s, br., 2H, NH$_2$), 1.69 (sext., J=7.4 Hz, 2H, CH$_2$CH$_2$CH$_3$), 2.64 (t, J=7.4 Hz, 2H, —CH$_2$Et), 2.76 (t, J=5.8 Hz, 2H, —CH$_2$NH$_2$), 2.85 (t, J=5.8 Hz, 2H, CH$_2$—CH$_2$NH$_2$), 3.05 (t, J=5.2 Hz, 2H, OCH$_2$CH$_2$—), 4.13 (t, J=5.8 Hz, 2H, —OCH$_2$—), 6.99 (AB-d, J=8.7 Hz, 2H, Ar—H), 7.26 (d, J=8.5 Hz, 2H, Ar—H), 7.33 (dd, J=1.7 Hz, J=12.1 Hz, 1H, Ar—H), 7.38 (dd, J=1.7 Hz, J=8.0 Hz, 1H, Ar—H), 7.50 (m$_e$, 2 H, Ar—H), 7.54 (AB-d, J=8.7 Hz, 2H, Ar—H).

Example 2: N-[2-(2'-fluoro-4-propyl-[1,1';4',1"]terphenyl-4"-yloxy)ethyl]-propane-1,3-diamine

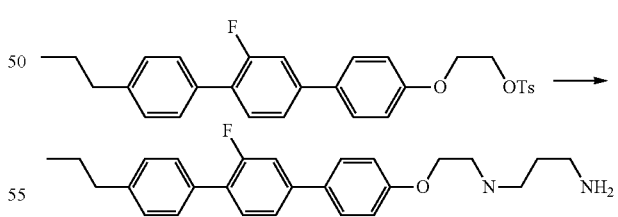

Analogously to Example 1, 2-(2'-fluoro-4-propyl-[1,1';4',1"]terphenyl-4"-yloxy)ethyl toluene-4-sulfonate and 1,3-diaminopropane give N-[2-(2'-fluoro-4-propyl-[1,1';4',1"]terphenyl-4"-yloxy)ethyl]propane-1,3-diamine.

$^1$H-NMR (300 MHz, CDCl$_3$)

δ=0.98 ppm (t, J=7.3 Hz, 3H, CH$_3$), 1.55-1.90 (m, 6H, in which: 1.67 (quint., J=7.1 Hz, —NH—CH$_2$—CH$_2$—CH$_2$NH$_2$); s, br., NH2; CH$_3$CH$_2$CH$_2$—), 2.63 (dd, J=7.3 Hz, J=8.0 Hz, 2H, Ar—CH$_2$Et), 2.75 (t, J=7.1 Hz, 2H, —CH$_2$NH$_2$), 2.78 (t, J=6.9 Hz, 2H, —NH—CH$_2$—(CH$_2$)

$_2NH_2$), 3.01 (t, J=5.3 Hz, 2H, —OCH$_2$CH$_2$—NH), 3.41 (s, 1H, —NH—), 4.11 (t, J=5.3 Hz, 2H, —O—CH$_2$—), 6.98 (AB-d, J=8.8 Hz, 2H, Ar—H), 7.26 (d, J=8.2 Hz, 2H, Ar—H), 7.32 (dd, J=1.8 Hz, J=12.2 Hz, 1H, Ar—H), 7.37 (dd, J=1.8 Hz, J=8.0 Hz, 1H, Ar—H), 7.43-7.56 (m, 5H, Ar—H).

Example 3: [2-(2'-fluoro-4-propyl-[1,1';4',1"]terphenyl-4"-yloxy)ethyl]-(2-methoxyethyl)amine

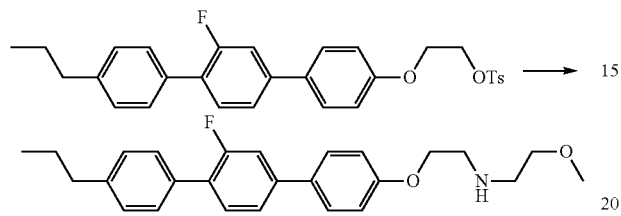

Analogously to Example 1, 2-(2'-fluoro-4-propyl-[1,1';4',1"]terphenyl-4"-yloxy)ethyl toluene-4-sulfonate and 2-methoxy-1-ethylamine give [2-(2'-fluoro-4-propyl-[1,1';4',1"]terphenyl-4"-yloxy)ethyl]-(2-methoxyethyl)amine as a colourless solid.

$^1$H-NMR (400 MHz, CDCl$_3$)

δ=0.98 ppm (t, J=7.3 Hz, 3H, CH$_3$), 1.69 (sext., J=7.5 Hz, 2H, CH$_3$CH$_2$CH$_2$—), 1.74 (s, br., NH), 2.64 (dd, J=6.7 Hz, J=8.6 Hz, 2H, —CH$_2$-Et), 2.89 (t, J=5.3 Hz, 2H, —CH$_2$—NH—), 3.06 (t, 5.3 Hz, 2H, —CH$_2$—NH—), 3.38 (s, 3H, OCH$_3$), 3.54 (dd, J=5.3, J=5.3 Hz, 2H, —O—CH$_2$—), 4.13 (t, 5.3 Hz, 2H, —O—CH$_2$—), 7.00 (AB-d, J=8.7 Hz, 2H, Ar—H), 7.26 (d, J=8.3 Hz, 2H, Ar—H), 7.32 (dd, J=1.7 Hz, J=12.2 Hz, 1H, Ar—H), 7.39 (dd, J=1.8 Hz, J=8.0 Hz, 1H, Ar—H), 7.44-7.57 (m, 5H, Ar—H).

Example 4: 2'-fluoro-4"-[2-(2-methoxyethoxy)ethoxy]-4-propyl-[1,1';4',1"]-terphenyl

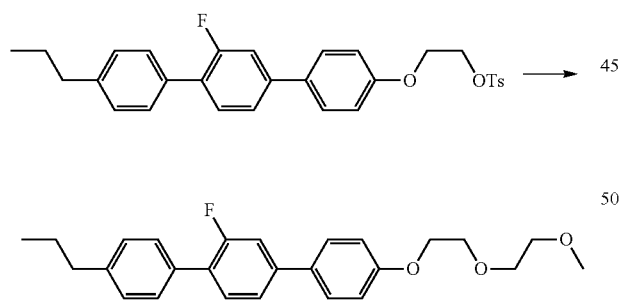

735 mg (18.4 mmol) of a 60 percent dispersion of sodium hydride in mineral oil are washed with pentane under nitrogen and dried in vacuo. 30 ml of THF and 1.21 g (15.9 mmol) of ethylene glycol monomethyl ether are subsequently added, and the mixture is left to stir at room temp. until the evolution of gas is complete. After addition of a solution of 5.00 g (12.2 mmol) of 2-(2'-fluoro-4-propyl-[1,1';4',1"]terphenyl-4"-yloxy)ethyl toluene-4-sulfonate in 10 ml of THF, the batch is left to stir at room temperature for 3 d, and excess sodium hydride is then decomposed by addition of methanol. The solution is added to water, acidified using 2 M hydrochloric acid and extracted three times with MTB ether. The combined org. phases are dried over sodium sulfate and evaporated in vacuo. The crude product is filtered through silica gel with dichloromethane and recrystallised from toluene, giving 2'-fluoro-4"-[2-(2-methoxyethoxy)ethoxy]-4-propyl-[1,1';4',1"]terphenyl as colourless crystals.

Example 5: N-{2-[(3S,5S,8R,9S,10S,13R,14S,17R)-17-((R)-1,5-dimethylhexyl)-10,13-dimethylhexadecahydrocyclopenta[a]phenanthren-3-yloxy]-ethyl}ethane-1,2-diamine 5.1 tert-Butyl-{2-[(3S,5S,8R,9S,10S,13R,14S,17R)-17-((R)-1,5-dimethylhexyl)-10,13-dimethylhexadecahydrocyclopenta[a]phenanthren-3-yloxy]ethoxy}dimethylsilane

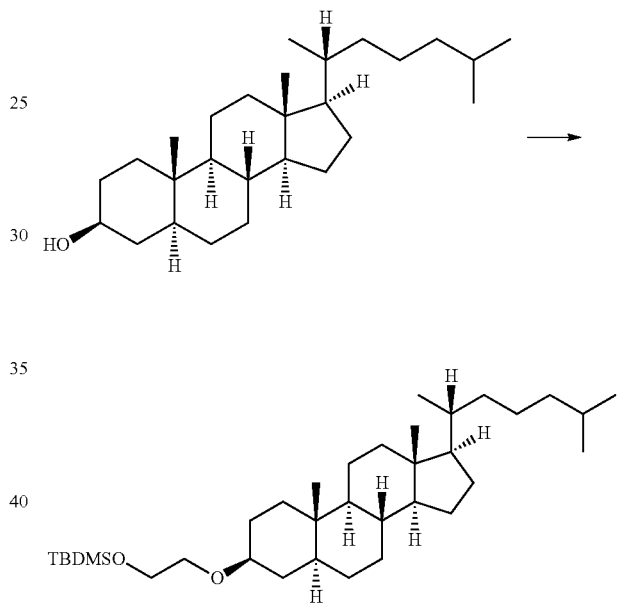

1.15 g (28.8 mmol) of a 60 percent suspension of sodium hydride in paraffin oil are initially introduced in 70 ml of THF, and a solution of 9.0 g (23.2 mmol) of (3S,5S,8R,9S,10S,13R,14S,17R)-17-((R)-1,5-dimethylhexyl)-10,13-dimethylhexadecahydrocyclopenta[a]phenanthren-3-ol in 60 ml of THF is added dropwise. The batch is heated at 70° C. for 2 h, a solution of 10 ml (49 mmol) of (2-bromoethoxy)-tert-butyldimethylsilane in 50 ml of THF is added, and the mixture is stirred at 70° C. overnight. The mixture is subsequently hydrolysed using 300 ml of water and extracted three times with MTB ether. The combined org. phases are washed with water and dried over sodium sulfate. The solvent is removed in vacuo, and the residue is chromatographed on silica gel with toluene, giving tert-butyl-{2-[(3S,5S,8R,9S,10S,13R,14S,17R)-17-((R)-1,5-dimethylhexyl)-10,13-dimethylhexadecahydrocyclopenta[a]phenanthren-3-yloxy]ethoxy}dimethylsilane as colourless crystals.

5.2 2-[(3S,5S,8R,9S,10S,13R,14S,17R)-17-((R)-1,5-Dimethylhexyl)-10,13-dimethylhexadecahydrocyclopenta[a]phenanthren-3-yloxy]ethanol

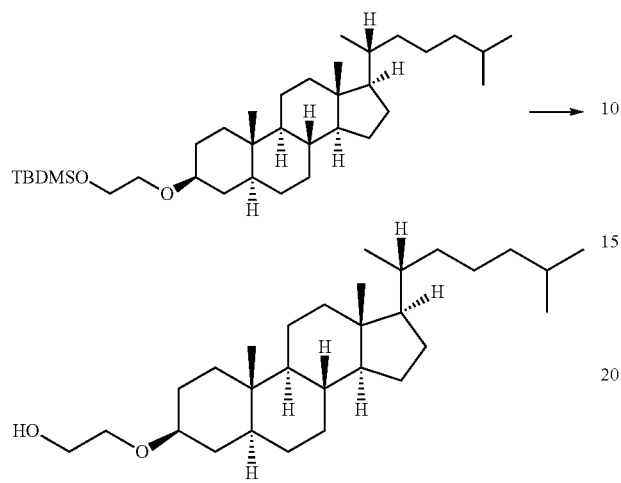

1.90 g (3.47 mmol) of tert-butyl-{2-[(3S,5S,8R,9S,10S,13R,14S,17R)-17-((R)-1,5-dimethylhexyl)-10,13-dimethylhexadecahydrocyclopenta[a]phenanthren-3-yloxy]ethoxy}dimethylsilane are dissolved in 20 ml of THF, and 3.8 ml (38 mmol) of a 1 M solution of tetrabutylammonium fluoride in THF are added dropwise with ice cooling. The cooling is removed, the batch is left to stir at room temp. for 15 min and added to water. The aqueous phase is separated off and extracted with MTB ether. The combined org. phases are washed with sat. sodium chloride soln., dried over sodium sulfate, and the solvent is removed in vacuo, giving 2-[(3S,5S,8R,9S,10S,13R,14S,17R)-17-((R)-1,5-dimethylhexyl)-10,13-dimethylhexadecahydrocyclopenta[a]phenanthren-3-yloxy]ethanol as a viscous yellow oil, which is employed in the next step without further purification.

5.3 2-[(3S,5S,8R,9S,10S,13R,14S,17R)-17-((R)-1,5-Dimethylhexyl)-10,13-dimethylhexadecahydrocyclopenta[a]phenanthren-3-yloxy]ethyl toluene-4-sulfonate

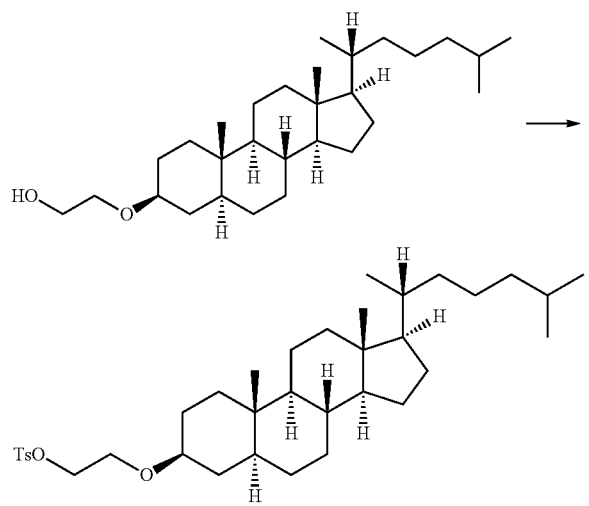

Analogously to Example 1, 2-[(3S,5S,8R,9S,10S,13R,14S,17R)-17-((R)-1,5-dimethylhexyl)-10,13-dimethylhexadecahydrocyclopenta[a]phenanthren-3-yloxy]ethanol gives 2-[(3S,5S,8R,9S,10S,13R,14S,17R)-17-((R)-1,5-dimethylhexyl)-10,13-dimethylhexadecahydrocyclopenta[a]phenanthren-3-yloxy]ethyl toluene-4-sulfonate as a viscous oil.

5.4 N-{2-[(3S,5S,8R,9S,10S,13R,14S,17R)-17-((R)-1,5-Dimethylhexyl)-10,13-dimethylhexadecahydrocyclopenta[a]phenanthren-3-yloxy]ethyl}-ethane-1,2-diamine

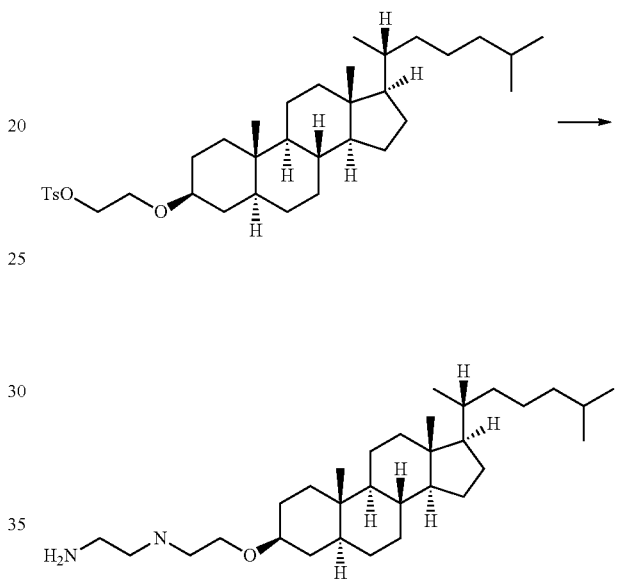

Analogously to Example 1, 2-[(3S,5S,8R,9S,10S,13R,14S,17R)-17-((R)-1,5-dimethylhexyl)-10,13-dimethylhexadecahydrocyclopenta[a]phenanthren-3-yloxy]ethyl toluene-4-sulfonate gives N-{2-[(3S,5S,8R,9S,10S,13R,14S,17R)-17-((R)-1,5-dimethylhexyl)-10,13-dimethylhexadecahydrocyclopenta[a]phenanthren-3-yloxy]ethyl}ethane-1,2-diamine as a colourless viscous oil.

$^1$H-NMR (500 MHz, CDCl$_3$)

δ=0.65 (s, 3H, —CH$_3$), 0.75-0.89 (m, 46H, in which: 0.79 (s, 3H, —CH$_3$), 0.86 (d, J=2.1 Hz, 3H, —CH$_3$), 0.87 (d, J=2.1 Hz, 3H, —CH$_3$), 0.90 (d, J=6.5 Hz, 3H, —CH$_3$), alkyl-H, —NH—, —NH$_2$), 1.96 (ddd, J=12.6 Hz, J=3.2 Hz, J=3.2 Hz, 1H), 2.69 (t, J=6.0 Hz, 2H, —CH$_2$NH$_2$), 2.77 (dd, J=5.4 Hz, J=5.4 Hz, 2H, —OCH$_2$CH$_2$NH—), 2.81 (t, J=6.0 Hz, 2H, —NHCH$_2$CH$_2$NH$_2$), 3.22 (dddd, J=4.7 Hz, J=4.7 Hz, J=4.7 Hz, J=4.7 Hz, 1H, >CH—O—), 3.58 (m$_c$, 2 H, —CH$_2$O—).

The following compounds for use in LC media are prepared analogously or in accordance with a literature procedure (in some cases also commercially available):

| Example No. | Structural formula |
|---|---|
| 6. | 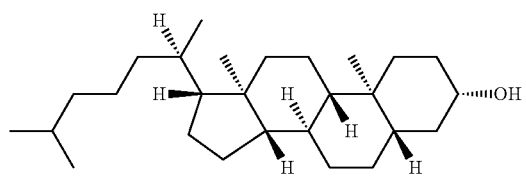 |
| 7. | 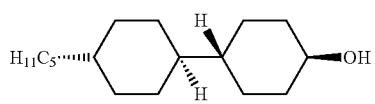 |
| 8. | 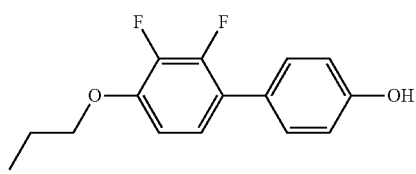 |
| 9. | 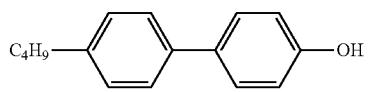 |
| 10. | 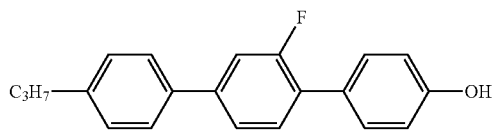 |
| 11. | 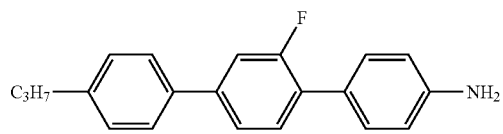 |
| 12. | 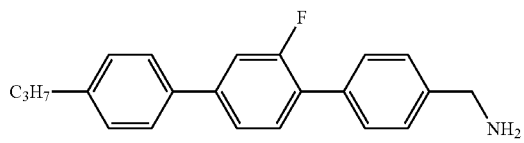 |
| 13. | 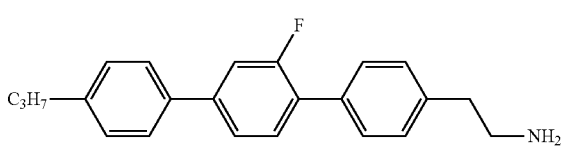 |
| 14. | 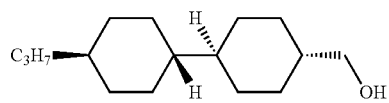 |
| 15. | 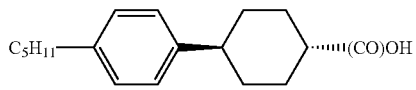 |
| 16. | 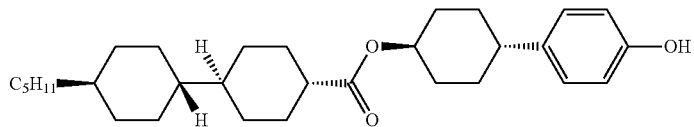 |

-continued

| Example No. | Structural formula |
|---|---|
| 17. | C₃H₇–[cyclohexyl]–O–C(=O)–[cyclohexyl]–CH₂CH₂CH₂CH₂CH₂–OH |
| 18. | C₃H₇–[cyclohexyl]–OH |
| 19. | C₄H₉–[phenyl]–OH |
| 20. | C₃H₇–[cyclohexyl]–(CO)OH |
| 21. | C₃H₇–[cyclohexyl]–[cyclobutyl]=[cyclobutyl]–OH |
| 22. | C₃H₇–[cyclohexyl]–[cyclobutyl]–OH |

MIXTURE EXAMPLES

For the preparation of LC media according to the invention, the following liquid-crystalline mixtures consisting of low-molecular-weight components in the stated percentage proportions by weight are used.

TABLE 1

| Nematic LC medium M1 ($\Delta\varepsilon < 0$) | | | |
|---|---|---|---|
| CY-3-O4 | 14% | Cl.p. | +80° C. |
| CCY-3-O2 | 9% | $\Delta n$ | 0.090 |
| CCY-3-O3 | 9% | $\Delta\varepsilon$ | −3.3 |
| CPY-2-O2 | 10% | $\varepsilon_\parallel$ | 3.4 |
| CPY-3-O2 | 10% | $K_3/K_1$ | 0.97 |
| CCY-3-1 | 8% | | |
| CCH-34 | 9% | | |
| CCH-35 | 6% | | |
| PCH-53 | 10% | | |
| CCH-301 | 6% | | |
| CCH-303 | 9% | | |

TABLE 2

| Nematic LC medium M2 ($\Delta\varepsilon > 0$) | | | |
|---|---|---|---|
| CC-4-V | 10% | Cl.p. | +77° C. |
| CC-5-V | 13.5% | $\Delta n$ | 0.113 |
| PGU-3-F | 6.5% | $\Delta\varepsilon$ | 19.2 |
| ACQU-2-F | 10% | $\varepsilon_\parallel$ | 23.8 |
| ACQU-3-F | 12% | $K_3/K_1$ | 0.97 |
| PUQU-3-F | 11% | | |
| CCP-V-1 | 12% | | |
| APUQU-2-F | 6% | | |
| APUQU-3-F | 7% | | |
| PGUQU-3-F | 8% | | |
| CPGU-3-OT | 4% | | |

Mixture Example 1

The compound from Synthesis Example 5 (0.2% by weight) is added to a nematic LC medium M1 of the VA type ($\Delta\varepsilon<0$) as shown in Table 1, and the mixture is homogenised.

Use in test cells without pre-alignment layer:

The resultant mixture is introduced into a test cell (without polyimide alignment layer, layer thickness d≈4.0 μm, ITO coating on both sides, no passivation layer). The LC medium has spontaneous homeotropic (vertical) alignment to the substrate surfaces. This alignment remains stable up to 70° C. In the temperature-stable range, the VA cell can be switched reversibly between crossed polarisers by application of a voltage of between 0 and 30 V.

Mixture Example 2

The compound from Synthesis Example 5 (0.5% by weight) is added to a nematic LC medium M2 of the VA-IPS type ($\Delta\varepsilon>0$) as shown in Table 2, and the mixture is homogenised.

Use in test cells without pre-alignment layer:

The resultant mixture is introduced into a test cell (without polyimide alignment layer, layer thickness d≈10 μm, ITO interdigital electrodes arranged on a substrate surface, glass on the opposite substrate surface, no passivation layer). The LC medium has spontaneous homeotropic (vertical) alignment to the substrate surfaces. This alignment remains stable up to 70° C. In the temperature-stable range, the VA-IPS cell can be switched reversibly between crossed polarisers by application of a voltage of between 0 and 20 V.

Mixture Examples 3-17

The compounds of Synthesis Examples 1, 2, 3 and Examples 6-17 are added analogously to Mixture Example 1 to a nematic LC medium M1 (Δε<0) as shown in Table 1, and the mixture is homogenised. The proportions by weight of the compounds in the medium are indicated in Table 3. The resultant LC medium is in each case introduced into a test cell without pre-alignment layer and has spontaneous homeotropic (vertical) alignment to the substrate surfaces. In the temperature-stable range, the VA cell can be switched reversibly between crossed polarisers by application of a voltage of between 0 and 30 V.

TABLE 3

Proportions by weight for doping in M1 and alignment of the resultant LC mixture at 25° C. and 70° C. Test cell of the VA type

| Mixture Example | Compound Example No. | Proportion by weight | Alignment at 25° C./switchable | Alignment at 70° C./switchable |
|---|---|---|---|---|
| 3 | 1 | 0.25% | homeotropic/yes | homeotropic/yes |
| 4 | 2 | 0.15% | homeotropic/yes | homeotropic/yes |
| 5 | 3 | 5.0% | homeotropic/yes | homeotropic/yes |
| 6 | 6 | 1.0% | homeotropic/yes | homeotropic/yes |
| 7 | 7 | 1.5% | homeotropic/yes | homeotropic/yes |
| 8 | 8 | 2.5% | homeotropic/yes | homeotropic/yes |
| 9 | 9 | 2.5% | homeotropic/yes | homeotropic/yes |
| 10 | 10 | 2.5% | homeotropic/yes | homeotropic/yes |
| 11 | 11 | 2.5% | homeotropic/yes | homeotropic/yes |
| 12 | 12 | 0.5% | homeotropic/yes | homeotropic/yes |
| 13 | 13 | 0.5% | homeotropic/yes | homeotropic/yes |
| 14 | 14 | 2.0% | homeotropic/yes | homeotropic/yes |
| 15 | 15 | 0.7% | homeotropic/yes | homeotropic/yes |
| 16 | 16 | 1.0% | homeotropic/yes | homeotropic/yes |
| 17 | 17 | 2.0% | homeotropic/yes | homeotropic/yes |
| 18 | 18 | 2.0% | homeotropic/yes | |
| 19 | 19 | 2.0% | homeotropic/yes | |
| 20 | 20 | 1.0% | homeotropic/yes | |
| 21 | 21 | 0.7% | homeotropic/yes | |
| 22 | 22 | 0.5% | homeotropic/yes | |

Mixture Examples 22-26

The compounds of Synthesis Example 1 and Examples 6, 7, 10, 11 are added analogously to Mixture Example 2 to a nematic LC medium M2 (Δε>0) as shown in Table 2, and the mixture is homogenised. The proportions by weight of the compounds in the medium are indicated in Table 4. The resultant LC medium is in each case introduced into a test cell without pre-alignment layer and has spontaneous homeotropic (vertical) alignment to the substrate surfaces. In the temperature-stable range, the VA-IPS cell can be switched reversibly between crossed polarisers by application of a voltage of between 0 and 20 V.

TABLE 4

Proportions by weight for doping in M2 and alignment of the resultant LC mixture at 25° C. and 60° C. Test cell of the VA-IPS type

| Mixture Example No. | Compound Example No. | Proportion by weight | Alignment at 25° C./switchable | Alignment at 60° C./switchable |
|---|---|---|---|---|
| 22 | 1 | 0.5% | homeotropic/yes | homeotropic/yes |
| 23 | 6 | 3.0% | homeotropic/yes | planar |
| 24 | 7 | 1.0% | homeotropic/yes | homeotropic/yes |
| 25 | 10 | 1.7% | homeotropic/yes | planar |
| 26 | 11 | 2.5% | homeotropic/yes | planar |
| 27 | 18 | 2.0% | homeotropic/yes | |
| 28 | 19 | 2.0% | homeotropic/yes | |
| 29 | 20 | 1.0% | homeotropic/yes | |

TABLE 4-continued

Proportions by weight for doping in M2 and alignment of the resultant LC mixture at 25° C. and 60° C. Test cell of the VA-IPS type

| Mixture Example No. | Compound Example No. | Proportion by weight | Alignment at 25° C./switchable | Alignment at 60° C./switchable |
|---|---|---|---|---|
| 30 | 21 | 0.7% | homeotropic/yes | |
| 31 | 22 | 0.5% | homeotropic/yes | |

Mixture Example 32 (Polymer Stabilisation of Mixture Example 6)

A polymerisable compound (RM-1, 0.5% by weight) and a self-aligning compound (6, 1.0% by weight) are added to a nematic LC medium M1 (Δε<0) as shown in Table 1, and the mixture is homogenised.

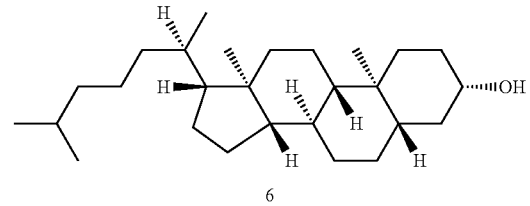

6

Use in test cells without pre-alignment layer:

The resultant mixture is introduced into a test cell (without polyimide alignment layer, layer thickness d≈4.0 μm, ITO coating on both sides, no passivation layer). The LC medium has spontaneous homeotropic (vertical) alignment to the substrate surfaces. The cell is irradiated with UV light of intensity 100 mW/cm² at 40° C. for 15 min with application of a voltage greater than the optical threshold voltage. This causes polymerisation of the monomeric, polymerisable compound. The homeotropic alignment is thus additionally stabilised, and a pretilt is established. The resultant PSA-VA cell can be switched reversibly at up to 70° C. with application of a voltage of between 0 and 30 V. The response times are shortened compared with the unpolymerised cell.

Mixture Example 33 (Polymer Stabilisation of Mixture Example 7)

A polymerisable compound (RM-1, 0.5% by weight) and a self-aligning compound (7, 1.7% by weight) are added to a nematic LC medium M1 (Δε<0) as shown in Table 1, and the mixture is homogenised.

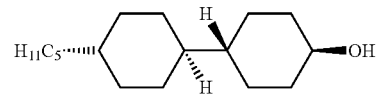

7

Use in test cells without pre-alignment layer:

The resultant mixture is introduced into a test cell (without polyimide alignment layer, layer thickness d≈4.0 μm, ITO coating on both sides, no passivation layer). The LC medium has spontaneous homeotropic (vertical) alignment to the substrate surfaces. The cell is irradiated with UV light of intensity 100 mW/cm² at 40° C. for 15 min with application of a voltage greater than the optical threshold voltage. This causes polymerisation of the monomeric compound. The homeotropic alignment is thus additionally stabilised, and a pretilt is established. The resultant PSA-VA cell can be switched reversibly at up to 70° C. by application of a voltage of between 0 and 30 V. The response times are shortened compared with the unpolymerised cell.

The invention claimed is:

1. A LC medium comprising a low-molecular-weight liquid-crystalline component and one or more organic compounds, where the organic compound contains at least one polar anchor group and at least one ring group, the polar anchor group of the organic compound contains at least one OH structure or an N atom in a primary or secondary or tertiary amino group, and wherein the anchor group is not comprised of a OH group which is a screened OH group as in 2,6-di-tert-butylphenol, said LC medium being nematic.

2. The LC medium according to claim 1, additionally comprising a polymerizable or polymerized component, where the polymerized component is obtainable by polymerization of a polymerizable component.

3. The LC medium according to claim 1, wherein the organic compound has a relative molar mass of greater than 100 g/mol.

4. The LC medium according to claim 1, wherein the polar anchor group of the organic compound denotes a group of the formula $R^2$, where
$R^2$ denotes straight-chain, branched or cyclic alkyl having 1 to 25 C atoms, in which, in addition, one or more non-adjacent $CH_2$ groups may be replaced by —NR⁰—, —O—, —S—, —CO—, —CO—O—, —O—CO—, —O—CO—O— in such a way that N, O and/or S atoms are not linked directly to one another, and in which, in addition, one or more tertiary carbon atoms (CH groups) may be replaced by N, and in which, in addition, one or more H atoms may be replaced by F or Cl,
with the proviso that the radical $R^2$ contains one or more heteroatoms selected from N, S and/or O.

5. The LC medium according claim 1, wherein organic compound encompasses a compound of the formula MES-$R^2$,
in which
MES denotes a mesogenic group containing at least one ring system, and
$R^2$ denotes a polar anchor group.

6. The LC medium according to claim 1, wherein the organic compound encompasses a compound of the formula I:

in which
$A^1$ and $A^2$ each, independently of one another, denote an aromatic, heteroaromatic, alicyclic or heterocyclic group, which may also contain fused rings, and which may also be mono- or polysubstituted by a group L,
L in each case, independently of one another, denotes —OH, —(CH₂)ₙ₁—OH, F, Cl, Br, I, —CN, —NO₂, —NCO, —NCS, —OCN, —SCN, —C(=O)N(R⁰)₂, —C(=O)R⁰, —N(R⁰)₂, —(CH₂)ₙ₁—N(R⁰)₂, optionally substituted silyl, optionally substituted aryl or cycloalkyl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl,
$Z^2$ in each case, independently of one another, denotes —O—, —S—, —CO—, —CO—O—, —OCO—, —O—CO—O—, —OCH₂—, —CH₂O—, —SCH₂—, —CH₂S—, —CF₂O—, —OCF₂—, —CF₂S—, —SCF₂—, —(CH₂)ₙ₁—, —CF₂CH₂—, —CH₂CF₂—, —(CF₂)ₙ₁—, —CH=CH—, —CF=CF—, —C≡C—, —CH=CH—COO—, —OCO—CH=CH—, CR⁰R⁰⁰ or a single bond,
R⁰ and R⁰⁰ each, independently of one another, denote H or alkyl having 1 to 12 C atoms,
$R^1$, $R^2$, independently of one another, denote H, halogen, straight-chain, branched or cyclic alkyl having 1 to 25 C atoms, in which, in addition, one or more non-adjacent $CH_2$ groups may be replaced by —NR⁰—, —O—, —S—, —CO—, —CO—O—, —O—CO—, —O—CO—O— in such a way that N, O and/or S atoms are not linked directly to one another, and in which, in addition, one or more tertiary carbon atoms (CH groups) may be replaced by N, and in which, in addition, one or more H atoms may be replaced by F or Cl,
with the proviso that at least the radical $R^2$ contains one or more heteroatoms selected from N, S and/or O,
m1 denotes 0, 1, 2, 3, 4 or 5, and
n1 denotes 1, 2, 3 or 4.

7. The LC medium according to claim 6, wherein $Z^2$ denotes a single bond.

8. The LC medium according to claim 5, wherein the group $R^2$ encompasses a group of the sub-formula (A1)

in which
Sp denotes a spacer group or a single bond,
$X^1$ denotes a group —NH₂, —NHR¹¹, —NR¹¹₂, —OH, —(CO)OH or a group of the formula

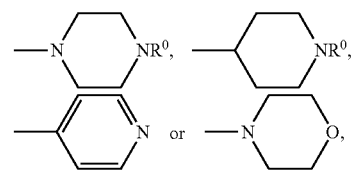

R⁰ denotes H or alkyl having 1 to 12 C atoms,
$X^2$ in each case independently denotes —NH—, —NR¹¹—, —O— or a single bond,
$Z^3$ in each case independently denotes an alkylene group having 1-15 C atoms, carbocyclic rings having 5 or 6 C atoms, or combinations of one or more rings and alkylene groups, in each of which hydrogen may be replaced by —OH, —OR¹¹, —(CO)OH, —NH₂, —NHR¹¹, —NR¹¹₂ or halogen (preferably F, Cl),
$R^{11}$ in each case independently denotes a halogenated or unsubstituted alkyl radical having 1 to 15 C atoms, where, in addition, one or more $CH_2$ groups in this radical may each be replaced, independently of one another, by —C≡C—, —CH=CH—, —(CO)O—, —O(CO)—, —(CO)— or —O— in such a way that O atoms are not linked directly to one another, and where two radicals $R^{11}$ may be linked to one another to form a ring, and
k denotes 0, 1, 2 or 3.

9. The LC medium according to claim 6, comprising the compounds of the formula I in a concentration of less than 10% by weight.

10. The LC medium according to claim 2, wherein the polymerizable or polymerized component is one or more polymerizable compounds of the formula M or a polymerized component which comprises one or more compounds of the formula M in polymerized form:

$$P^a-(Sp^a)_{s1}-A^2-(Z^1-A^1)_n-(Sp^b)_{s2}-P_b \quad M$$

in which the individual radicals have the following meanings:
$P^a$, $P^b$ each, independently of one another, denote a polymerizable group,
$Sp^a$, $Sp^b$ on each occurrence, identically or differently, denote a spacer group,
s1, s2 each, independently of one another, denote 0 or 1,
$A^1$, $A^2$ each, independently of one another, denote a radical selected from the following groups:
a) the group consisting of trans-1,4-cyclohexylene, 1,4-cyclohexenylene and 4,4'-bicyclohexylene, in which, in addition, one or more non-adjacent CH$_2$ groups may be replaced by —O— and/or —S— and in which, in addition, one or more H atoms may be replaced by F,
b) the group consisting of 1,4-phenylene and 1,3-phenylene, in which, in addition, one or two CH groups may be replaced by N and in which, in addition, one or more H atoms may be replaced by L,
c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L,
d) the group consisting of saturated, partially unsaturated or fully unsaturated, and optionally substituted, polycyclic radicals having 5 to 20 cyclic C atoms, one or more of which may, in addition, be replaced by heteroatoms, where, in addition, one or more H atoms in these radicals may be replaced by L,
n denotes 0, 1, 2 or 3,
$Z^1$ in each case, independently of one another, denotes —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^c$R$^d$)—, —CH$_2$CF$_2$—, —CF$_2$CF$_2$— or a single bond, and R$^c$R$^d$ are both independently H or C$_{1-6}$-alkyl,
L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms.

11. The LC medium according to claim 6, wherein the compound of the formula I contains one or more polymerizable groups.

12. A LC display comprising an LC cell having two substrates and at least two electrodes, where at least one substrate is transparent to light and at least one substrate has one or two electrodes, and a layer of an LC medium according to claim 1 located between the substrates.

13. The LC display according to claim 12, wherein the substrates have no alignment layers for homeotropic alignment.

14. The LC display according to claim 12, wherein the substrates have unrubbed alignment layers on one or both sides.

15. The LC display according to claim 12, that is a VA display containing an LC medium having negative dielectric anisotropy and electrodes arranged on opposite substrates.

16. The LC display according to claim 12, that is a VA-IPS display containing an LC medium having positive dielectric anisotropy and interdigital electrodes arranged on at least one substrate.

17. A process for the preparation of an LC medium, comprising mixing one or more organic compounds containing at least one polar anchor group and at least one ring group or one or more compounds of the formula I according to claim 1 are mixed with a low-molecular-weight liquid-crystalline component, and optionally adding one or more polymerizable compounds and/or additives.

18. A compound of formula I $$R^1-A^1-(Z^2-A^2)_{m1}-R^2 \quad (I)$$

in which:
$R^2$ denotes a group of the formula (A2)

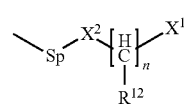

(A2)

in which
Sp denotes a spacer group or a single bond,
$X^1$ denotes a group —NH$_2$, —NHR$^{11}$, —NR$^{11}_2$, —OH, —(CO)OH or a group of the formula

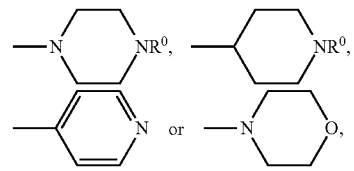

$R^0$ denotes H or alkyl having 1 to 12 C atoms,
$X^2$ in each case independently denotes —NH—, —NR$^{11}$—, —O— or a single bond,
$R^{12}$ denotes H, F, Cl, CN, —OH, —NH$_2$, or a halogenated or unsubstituted alkyl radical having 1 to 15 C atoms, where, in addition, one or more CH$_2$ groups in this radical may each be replaced, independently of one another, by —C≡C—, —CH=CH—, —(CO)O—, —O(CO)—, —(CO)—, —O—, —NH— or —NR$^1$— in such a way that O and N atoms are not linked directly to one another,
n denotes 1, 2 or 3,
$R^{11}$ in each case independently denotes a halogenated or unsubstituted alkyl radical having 1 to 15 C atoms, where, in addition, one or more CH$_2$ groups in this radical may each be replaced, independently of one another, by —C≡C—, —CH=CH—, —(CO)O—, —O(CO)—, —(CO)— or —O— in such a way that O atoms are not linked directly to one another, and where two radicals $R^{11}$ may be linked to one another to form a ring,
$A^1$ and $A^2$ each, independently of one another, denote an aromatic, heteroaromatic, alicyclic or heterocyclic group, which may also contain fused rings, and which may also be mono- or polysubstituted by a group L,
L in each case, independently of one another, denotes —OH, —(CH$_2$)$_{n1}$—OH, F, Cl, Br, I, —CN, —NO$_2$, —NCO, —NCS, —OCN, —SCN, —C(=O)N(R$^0$)$_2$, —C(=O)R$^0$, —N(R$^0$)$_2$, —(CH$_2$)$_n$—N(R$^0$)$_2$, in which n1 is 1-4, optionally substituted silyl, optionally substituted aryl or alicyclyl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, $Z^2$ in each case, independently of one another, denotes a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, in which n1 is 1, 3 or 4, —CF$_2$CH$_2$—, —CH$_2$CF$_2$—, —(CF$_2$)$_{n1}$—, in which n1 is 1-4, —CH=CH—, —CF=CF—, —C≡C—, —CH=CH—COO—, —OCO—CH=CH— or CR$^0$R$^{00}$, $R^0$ and $R^{00}$ each, independently of one another, denote H or alkyl having 1 to 12 C atoms, $R^1$ denotes H, halogen, straight-chain, branched or cyclic alkyl having 1 to 25 C atoms, in which, in addition, one or more non-adjacent CH$_2$ groups may be replaced by —NR$_2$, —NR—, —O—, —S—, —CO—, —CO—O—, —O—CO—, —O—CO—O— in such a way that O and/or S atoms are not linked directly to one another, and in which, in addition, one or more H atoms may be replaced by F or Cl, and m1 denotes 2, 3 or 4.

19. A compound according to claim 18, wherein
m1 denotes 2 or 3, and
$A^1$ and $A^2$ independently denote 1,4-phenylene or cyclohexane-1,4-diyl.

20. A method for effecting homeotropic alignment with respect to a surface delimiting an LC medium, said method comprising adding at least one organic compound containing at least one polar anchor group and at least one ring group, according to claim 1, as an additive for said LC media.

21. A process for the production of an LC display comprising an LC cell having two substrates and at least two electrodes, where at least one substrate is transparent to light and at least one substrate has one or two electrodes, comprising:
filling of the cell with an LC medium comprising a low-molecular-weight liquid-crystalline component, a polymerizable component and an organic compound containing at least one polar anchor group according to claim 1 which is suitable for effecting homeotropic (vertical) alignment of the LC medium with respect to the substrate surfaces, and optionally
polymerization of the polymerizable component, optionally with application of a voltage to the cell or under the action of an electric field.

22. The liquid crystalline medium according to claim 10, wherein the saturated, partially unsaturated or fully unsaturated, optionally substituted polycyclic radicals having 5 to 20 cyclic C atoms, one or more of which may be replaced by heteroatoms, are bicyclo[1.1.1]pentane-1,3-diyl, bicyclo[2.2.2]octane-1,4-diyl, spiro[3.3]heptane-2,6-diyl,

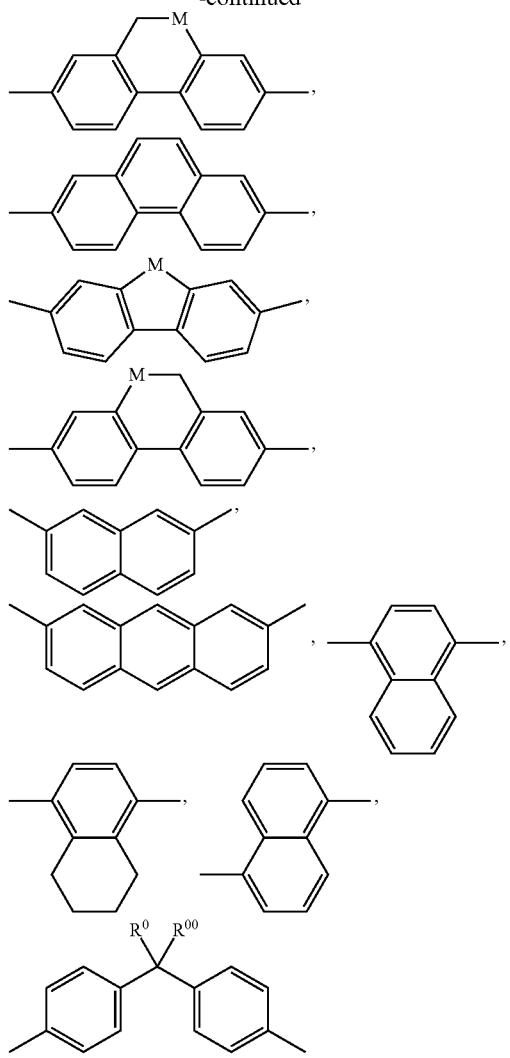

where, in addition, one or more H atoms in these radicals may be replaced by L, and/or one or more double bonds may be replaced by single bonds, and/or one or more CH groups may be replaced by N, $R^0$, $R^{00}$ each, independently of one another, denote H, F or straight-chain or branched alkyl having 1 to 12 C atoms, in which, in addition, one or more H atoms may be replaced by F, M denotes —O—, —S—, —CH$_2$—, —CHY$^1$— or —CY$^1$Y$^2$—, and $Y^1$ and $Y^2$ each, independently of one another, have one of the meanings indicated above for $R^0$ or denote Cl or CN.

23. The liquid crystalline medium according to claim 1, wherein the polar anchor group is H, halogen, straight-chain, branched or cyclic alkyl having 1 to 25 C atoms, in which, in addition, one or more non-adjacent CH$_2$ groups may be replaced by —NR$^0$—, —O—, —S—, —CO—, —CO—O—, —O—CO—, —O—CO—O— in such a way that N, O and/or S atoms are not linked directly to one another, and in which, in addition, one or more tertiary carbon atoms (CH groups) may be replaced by N, and in which, in addition, one or more H atoms may be replaced by F or Cl, with the proviso that at least the radical $R^2$ contains one or more heteroatoms selected from N, S and/or O.

24. The liquid crystalline medium according to claim 23, wherein the polar anchor group is —(CH$_2$)$_n$—OH or —O—(CH$_2$)$_n$—OH, and n is 1-11.

25. The liquid crystalline medium according to claim 1, further comprising one or more compounds of the formula A, B or C,

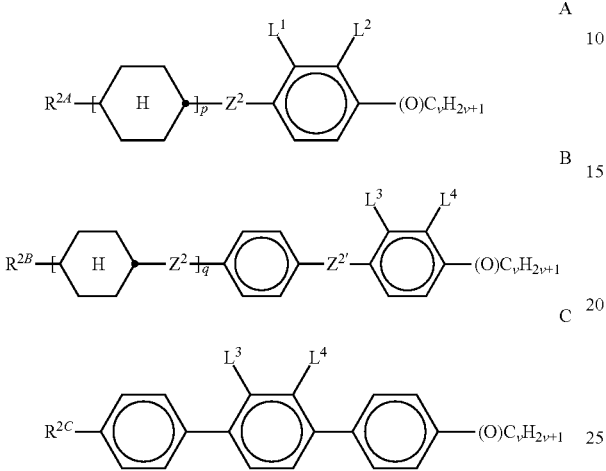

in which
R$^{2A}$, R$^{2B}$ and R$^{2C}$ each, independently of one another, denote H, an alkyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

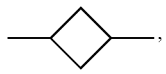

—C≡C—, —CF$_2$O—, —OCF$_2$—, —OC—O— or —O—CO— in such a way that O atoms are not linked directly to one another, L$^{1-4}$ each, independently of one another, denote F, Cl, CF$_3$ or CHF$_2$, Z$^2$ and Z$^{2'}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O—, p denotes 1 or 2,
q denotes 0 or 1, and
v denotes 1 to 6.

26. The liquid crystalline medium according to claim 1, further comprising one or more compounds of formula ZK

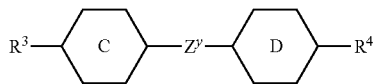

in which the individual radicals have the following meanings:

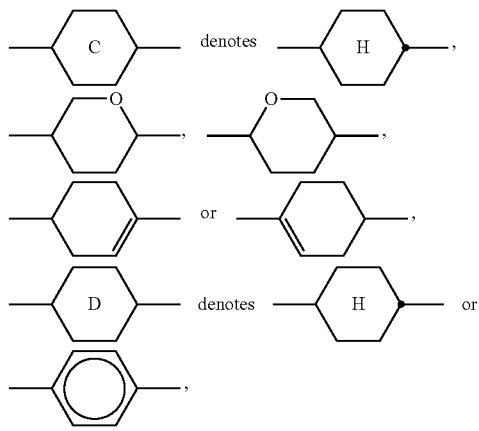

R$^3$ and R$^4$ each, independently of one another, denote alkyl having 1 to 12 C atoms, in which, in addition, one or two non-adjacent CH$_2$ groups may be replaced by —O—, —CH=CH—, —CO—, —O—CO— or —CO—O— in such a way that O atoms are not linked directly to one another, Z$^y$ denotes —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond.

27. The LC medium according to claim 1, wherein the polar anchor group of the organic compound denotes a group of the formula R$^2$, where R$^2$ denotes straight-chain, branched or cyclic alkyl having 2 to 15 C atoms, in which, in addition, one or more non-adjacent CH$_2$ groups may be replaced by —NR$^0$—, —O—, —S—, —CO—, —CO—O—, —O—CO—, —O—CO—O— in such a way that N, O and/or S atoms are not linked directly to one another, and in which, in addition, one or more tertiary carbon atoms (CH groups) may be replaced by N, and in which, in addition, one or more H atoms may be replaced by F or Cl, with the proviso that the radical R$^2$ contains one or more heteroatoms selected from N, S and/or O.

* * * * *